United States Patent
Kuge et al.

(10) Patent No.: US 11,696,125 B2
(45) Date of Patent: Jul. 4, 2023

(54) TERMINAL DEVICE AND COMMUNICATION METHOD FOR TERMINAL DEVICE

(71) Applicant: SHARP KABUSHIKI KAISHA, Sakai (JP)

(72) Inventors: Yoko Kuge, Sakai (JP); Masafumi Aramoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/740,750

(22) PCT Filed: Jun. 29, 2016

(86) PCT No.: PCT/JP2016/069245
§ 371 (c)(1),
(2) Date: Dec. 28, 2017

(87) PCT Pub. No.: WO2017/002843
PCT Pub. Date: Jan. 5, 2017

(65) Prior Publication Data
US 2018/0199262 A1    Jul. 12, 2018

(30) Foreign Application Priority Data

Jun. 29, 2015 (JP) .................................. 2015-129423

(51) Int. Cl.
*H04W 12/06* (2021.01)
*H04W 8/00* (2009.01)
(Continued)

(52) U.S. Cl.
CPC ............. *H04W 12/06* (2013.01); *H04W 8/00* (2013.01); *H04W 8/005* (2013.01); *H04W 12/08* (2013.01);
(Continued)

(58) Field of Classification Search
CPC ..... H04W 88/04; H04W 8/005; H04W 92/18; H04W 48/04; H04W 64/003
(Continued)

(56) References Cited

U.S. PATENT DOCUMENTS

2002/0187779 A1* 12/2002 Freeny, Jr. ........... G06Q 20/327
455/422.1
2015/0029866 A1* 1/2015 Liao ...................... H04W 4/023
370/241
(Continued)

OTHER PUBLICATIONS

Intel (Title: Security for Remote UE to UE-Network Relay Proximity-based Services (ProSe) Direct Communication for Public Safety Use).*
(Continued)

*Primary Examiner* — Inder P Mehra
(74) *Attorney, Agent, or Firm* — Birch, Stewart, Kolasch & Birch, LLP

(57) ABSTRACT

A communication system implemented providing a service based on ProSe under the management of a network operator. Processing based on a discovery request procedure for discovering a proximity terminal is performed based on authentication of a server device operated by the network
(Continued)

operator. In addition, the network operator updates the processing based on the discovery request procedure in accordance with a policy of the network operator.

4 Claims, 18 Drawing Sheets

(51) Int. Cl.
| | |
|---|---|
| H04W 12/08 | (2021.01) |
| H04W 48/04 | (2009.01) |
| H04W 76/14 | (2018.01) |
| H04W 88/04 | (2009.01) |
| H04W 92/18 | (2009.01) |
| H04W 12/50 | (2021.01) |
| H04W 12/61 | (2021.01) |
| H04W 64/00 | (2009.01) |

(52) U.S. Cl.
CPC ........... *H04W 48/04* (2013.01); *H04W 76/14* (2018.02); *H04W 88/04* (2013.01); *H04W 92/18* (2013.01); *H04W 12/50* (2021.01); *H04W 12/61* (2021.01); *H04W 64/003* (2013.01)

(58) Field of Classification Search
USPC ......... 455/456.4, 26.1, 528, 68, 7, 11.1, 7.4, 455/41.3; 370/315, 463; 340/524
See application file for complete search history.

(56) References Cited

U.S. PATENT DOCUMENTS

| | | | |
|---|---|---|---|
| 2015/0326738 A1* | 11/2015 | Li | ................ H04L 12/1403 455/406 |
| 2015/0339718 A1* | 11/2015 | Walton | ................ G06Q 20/387 705/14.58 |
| 2016/0345222 A1* | 11/2016 | Axmon | ............. H04W 36/0016 |
| 2018/0199262 A1* | 7/2018 | Kuge | .................... H04W 12/06 |

OTHER PUBLICATIONS

HTC (Title: Resolve FFS for the Restricted Direct Discovery for Model B in clause 5.2.).*
Ericsson, (Title: "Change of ProSe Application ID to ProSe Service ID," S2-140931, 3GPP, Mar. 18, 2014, paragraph 4.6.4.2.*
Ericsson, (Title: "Change of ProSe Application ID to ProSe Service ID," S2-140931,3GPP, Mar. 18, 2014, paragraph 4.6.4.2 (Year: 2014).*
HTC (Title: Resolve FFS for the Restricted Direct Discovery for Model B in clause 5.2.), (Year: 2015).*
3GPP TS 23.303 V12.5.0; 3rd Generation Partnership Project; Technical Specification Group Services and System Aspects; Proximity-based Services (ProSe); Stage 2 (Release 12); Jun. 2015, 63 pages.
3GPP TS 23.303 V13.0.0; 3rd Generation Partnership Project; Technical Specification Group Services and System Aspects; Proximity-based Services (ProSe); Stage 2 (Release 13), Jun. 2015, 97 pages.
Ericsson, "Change of ProSe Application ID to ProSe Service ID", S2-140931, 3GPP TSG SA WG2 Meeting #102, St. Julian's, Malta, Mar. 24-28, 2014, 15 pages.
HTC, "Resolve FFS for the Restricted Direct Discovery for Model B in clause 5.2", S2-150143, 3GPP SA WG2 Meeting #107, Sorrento, Italy, Jan. 26-30, 2015, 8 pages.
Intel, "Security for Remote UE to UE-Network Relay Proximity-based Services (ProSe) Direct Communication for Public Safety Use", S3-151809, 3GPP TSG SA WG3 (Security) Meeting #80, Tallinn, Estonia, Apr. 20-30, 2015, 5 pages.
"Corrections on ProSe Relay"; SA WG2 Meeting #101bis; S2-140668; San Jose Del Cabo, Mexico, Feb. 17-21, 2014, pp. 1-6.
"pCR to TR 33.833—Expanding section 8.1.1 on UE-to-Network relay discovery"; 3GPP TSG SA WG3 (Security) Meeting #79, S3-151498, Nanjing, China, Apr. 20-24, 2015, 3 pages.

* cited by examiner

FIG. 4A

| IMSI |
|---|
| EMM State |
| GUTI |
| ME Identity |
| ProSe ability |
| ProSe UE ID |

FIG. 4B

| PDN connection ID |
|---|
| PDN connection type |
| Application ID |
| ProSe Application User ID |
| APN |
| IP Address |
| IP Address for remote UE |
| Default Bearer |
| Group ID |
| ProSe Relay UE ID |
| Relay Service Code |
| Timer |

FIG. 4C

| TRANSFER PATH IDENTIFICATION INFORMATION |
|---|
| Transaction ID |

FIG. 6A

| |
|---|
| IMSI |
| EMM State |
| GUTI |
| ME Identity |
| ProSe ability |

FIG. 6B

| |
|---|
| PDN connection ID |
| PDN connection type |
| Application ID |
| ProSe Application User ID |
| APN |
| IP Address |
| Default Bearer |
| Group ID |
| ProSe Remote UE ID |
| Relay Service Code |
| Timer |

FIG. 6C

| |
|---|
| TRANSFER PATH IDENTIFICATION INFORMATION |
| Transaction ID |

FIG. 8A

| IMSI |
|---|
| GUTI |
| ME Identity |
| ProSe ability |

FIG. 8B

| Application ID |
|---|
| Discovery authorization info |
| Group ID |
| Relay Service Code |
| Timer |
| Relay/Remote UE info |

FIG. 10A

| |
|---|
| IMSI |
| MSISDN |
| IMEI / IMEISV |
| Access Restriction |
| ProSe capability |
| PLMN list |

FIG. 10B

| |
|---|
| Context ID |
| PDN Address |
| PDN Type |
| PDN Connection Type |
| Access Point Name (APN) |
| PDN GW ID |

FIG. 12A

| Application Layer User ID |
| ProSe Function ID |
| Application ID |
| ProSe Application User ID(PAUID) |
| permission info |

FIG. 12B

|  | Remote UE FUNCTION | ProSe Relay UE FUNCTION |
| --- | --- | --- |
| PAUID(A) | NOT PERMITTED | PERMITTED |
| PAUID(B) | PERMITTED | NOT PERMITTED |

TERMINAL DEVICE AND COMMUNICATION METHOD FOR TERMINAL DEVICE

TECHNICAL FIELD

The present invention relates to a terminal device and the like.

BACKGROUND ART

The 3rd Generation Partnership Project (3GPP), which undertakes activities for standardizing recent mobile communication systems, is in the process of creating specifications for the Evolved Packet System (EPS), which realizes an all-IP architecture. In 3GPP, an access system connected to EPS is under study while taking into consideration not only a case of LTE but also a case of wireless LAN.

Furthermore, in 3GPP, a Proximity based Service (ProSe), as described in NPL 1, has been studied in the process of creating the specifications for EPS. ProSe is aimed at providing a service in which a function for User Equipment (UE) as a communication terminal to detect another proximity communication terminal (discovery), a function to establish direct communication between pieces of UE without passing through a core network, a base station or the like (direct communication), and the like are given.

In ProSe, since direct communication can be made between terminals without passing through a base station, a core network to which an access network is connected, or the like, concentration on the access network, the core network, or the like can be prevented (congestion prevention) so that an offloading effect can be expected.

Furthermore, in ProSe, in order for a terminal outside a communication range of a base station to access the network, a UE-to-NW Relay in which a terminal inside the communication range becomes a relay terminal for the terminal outside the communication range is also under study now.

To be specific, the UE-to-NW Relay is a service achieved by the terminal inside the communication range and the terminal outside the communication range of the base station establishing a direct communication path.

Note that, a terminal device having a function of connecting to the network by a PDN connection, even from the outside of the communication range, is referred to as Remote UE, and a terminal device configured to provide the PDN connection to the Remote UE by a relay is referred to as Relay UE.

To establish a direct communication path between proximity terminal devices, ProSe needs a service in which a terminal device seeks and detects a terminal device as a communication target in the direct communication. To rephrase, a function for a terminal device to detect a proximity terminal device (discovery) is needed. In ProSe, as an example of this type of detection method, a detection method in which Relay UE transmits an announcing signal to Remote UE to notify the Remote UE that the Relay UE has a Relay function while the Remote UE monitors the announcing signal has been studied. This type of detection method is defined as a "Model A".

Further in ProSe, as an example of a detection method, a detection method in which the Remote UE transmits a Solicitation signal to the Relay UE and the Relay UE having received the Solicitation message from the Remote UE replies a Response whereby the Remote UE detects the Relay UE has been studied. This type of detection method is defined as a "Model B". Note that the Solicitation signal may be an announcing signal and the Relay UE may receive the announcing signal from the Remote UE by monitoring.

Moreover, as a direct communication path between pieces of UE, usage of two schemes are being considered in ProSe. The first one is a method using an LTE access technique. The second one is a method using a Wireless LAN (WLAN) access technique.

Furthermore, non-Public Safety and Public Safety are defined in ProSe. The non-Public Safety assumes a commercial service by a mobile network operator, and is available only in a case of UE being positioned within a communication range of an LTE base station. On the other hand, the Public Safety assumes usage by a disaster prevention radio system, and is available not only in a case of UE being positioned within a communication range of the LTE base station but also a case of UE not positioned within the communication range of the LTE base station (eNB).

CITATION LIST

Non Patent Literature

NPL 1: 3GPP TR 23.303 Technical Specification Group Services and System Aspects, Proximity-based Services (ProSe), Stage 2 (Release 12)

SUMMARY OF INVENTION

Technical Problem

In ProSe, such a method is under study that provides a function to detect proximity UE (discovery), a function to establish direct communication between pieces of UE without passing through a core network, a base station or the like (direct communication), and the like.

In addition, to provide a function for Remote UE to detect Relay UE in its proximity, the following functions are under study: an announcing function for the Relay UE to notify proximity UE of the position of the Relay UE itself; a monitoring function for the Remote UE to detect the Relay UE by receiving the notification based on the announcing function; a function for the Remote UE to transmit a Solicitation message to the Relay UE and receive a Response message; a function for the Relay UE to receive the Solicitation message from the Remote UE and transmit the Response message to the Remote UE; and the like.

Pieces of UE (the Relay UE and the Remote UE) perform a Model A discovery procedure by the announcing and monitoring, and a Model B discovery procedure by the Solicitation and the Response while using a Relay Service Code, which is a code indicating a connection service providing a relay of the network.

The Relay Service Code may correspond to a connection service to PDN provided by the Relay UE, and needs to be regularly or irregularly updated from a security standpoint.

As such, UE needs to assume that a server device notifies UE of multiple Relay Service Codes corresponding to the same service.

Accordingly, in a case where UE obtains different multiple Relay Service Codes for the same service and/or sets different multiple Relay Service Codes for the same service, UE needs to determine a timing at which the use of an old Relay Service Code is stopped and a timing at which the use of a new Relay Service Code is started.

Unfortunately, any specific method for determining these timings has not been disclosed yet.

In consideration of the above circumstances, an object of the present invention is to provide a preferable method for controlling a stop timing, a start timing, and the like of a relay connection service by Relay UE, Remote UE, and the like based on ProSe in order to achieve a function in which UE present outside coverage of a base station detects UE inside another coverage being positioned in proximity (discovery).

Solution to Problem

To achieve the above object, a terminal device of an aspect of the present invention includes: a transmission/reception unit configured to transmit a first service authorization request message, to request permission for the terminal device to be directly detected by a proximity terminal device positioned in proximity as a relay terminal device or for the terminal device to perform direct communication with the proximity terminal device, to a device equipped with a ProSe function, and receive an authorization message for the first service authorization request message from the device equipped with the ProSe function; and a control unit configured to start, based on receiving a timer included in the authorization message and indicating a period of time during which the first service authorization is valid, counting of the timer.

A device equipped with a ProSe function of an aspect of the present invention includes a transmission/reception unit configured to receive a first service authorization request message from the terminal device and transmit an authorization message for the first service authorization request message to the terminal device. The first service authorization request message is a message transmitted to request permission for the terminal device to be directly detected by a proximity terminal device positioned in proximity as a relay terminal device or performing direct communication with the proximity terminal device. The authorization message includes a timer indicating a period of time during which the first service authorization is valid.

A communication control method for a terminal device of an aspect of the present invention includes the steps of: transmitting a first service authorization request message, to request permission for the terminal device to be directly detected by a proximity terminal device positioned in proximity as a relay terminal device or performing direct communication with the proximity terminal device, to a device equipped with a ProSe function; receiving an authorization message for the first service authorization request message from the device equipped with the ProSe function; and starting counting of a timer based on receiving a period of time during which the first service authorization is valid, the period of time being included in the authorization request message.

A communication control method for a device equipped with a ProSe function includes the steps of: receiving a first service authorization request message from a terminal device; and transmitting an authorization message for the first service authorization request message to the terminal device. The first service authorization request message is a message transmitted to request permission for the terminal device to be directly detected by a proximity terminal device positioned in proximity as a relay terminal device or performing direct communication with the proximity terminal device. The authorization message includes a timer indicating a period of time during which the first service authorization is valid.

Advantageous Effects of Invention

According to the present invention, a valid time during which a relay connection service based on ProSe can be performed can be managed under the control of a network operator.

BRIEF DESCRIPTION OF DRAWINGS

FIGS. 2A and 2B are diagrams illustrating a configuration of an IP mobile communication network, and the like.

FIGS. 4A to 4C are diagrams illustrating an example of each data structure stored in a storage unit.

FIGS. 6A to 6C are diagrams illustrating an example of each data structure stored in a storage unit.

FIGS. 8A and 8B are diagrams illustrating an example of each data structure stored in a storage unit.

FIGS. 10A and 10B are diagrams illustrating an example of each data structure stored in a storage unit.

FIGS. 12A and 12B are diagrams illustrating an example of each data structure stored in a storage unit.

DESCRIPTION OF EMBODIMENTS

Hereinafter, a preferred embodiment for performing the present invention will be described with reference to the drawings. Note that as an example, the present embodiment describes an embodiment of a mobile communication system to which the present invention is applied.

1. First Embodiment

Hereinafter, a radio communication technology according to an embodiment of the present invention will be described in detail with reference to the drawings.

1.1 Overview of Communication System

Figure 1:
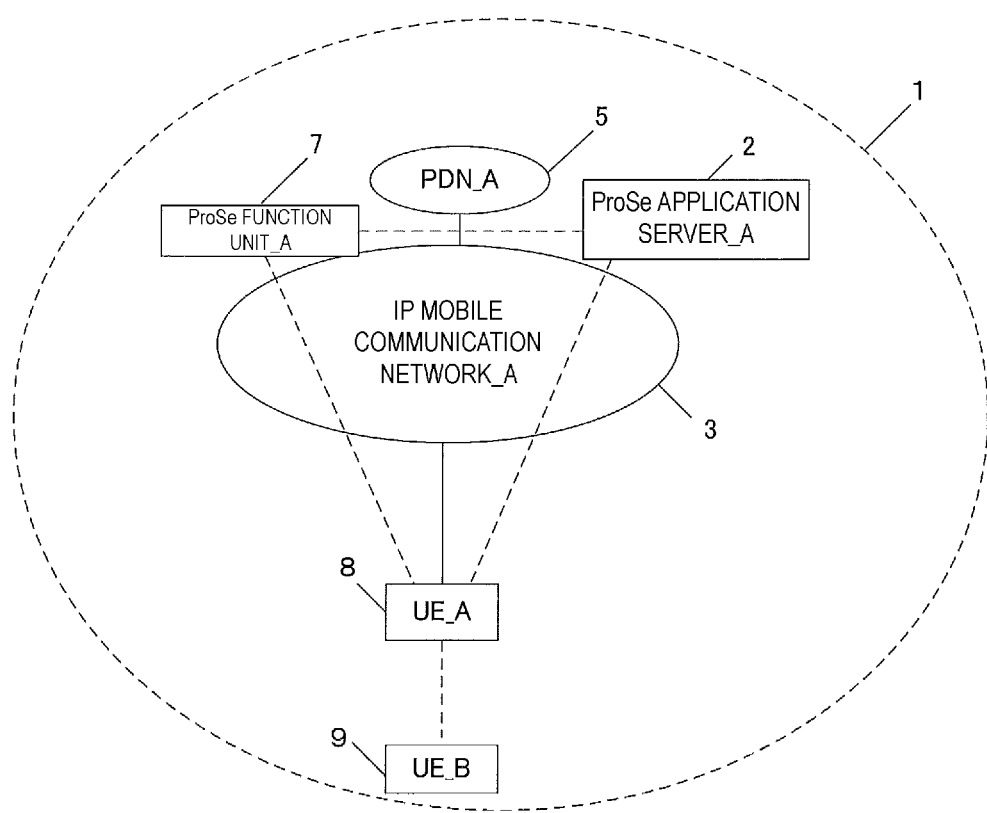
FIG. 1 is a diagram illustrating an overview of a mobile communication system.

FIG. 1 is a function block diagram illustrating an example of a schematic configuration of a communication system 1 according to the embodiment of the present invention.

The communication system 1 illustrated in FIG. 1 is configured of UE_A 8 as a terminal device having a function related to ProSe (ProSe enabled UE), a Packet Data Network (PDN)_A 5, an Internet Protocol (IP) mobile communication network_A 3, a ProSe function unit_A 7, and a ProSe application server_A 2.

Furthermore, the communication system 1 may be configured including a terminal device, like UE_B 9, having functions related to multiple ProSes.

The PDN_A 5 and a terminal device, such as the UE_A 8 or UE_B 9, having a function related to ProSe are connected through the IP mobile communication network_A 3. Further, the UE_A 8 and the UE_B 9 are supplied with a service based on ProSe.

The ProSe function unit_A 7 is a server device configured to manage communication using the ProSe function of the UE_A 8 and/or the UE_B 9, and performs authentication of the terminal device when a ProSe service or the like is provided. Note that the ProSe function unit_A 7 may be included in the PDN_A 5 or may be separated from the PDN_A 5. Alternatively, the ProSe function unit_A 7 may be included in the IP mobile communication network_A 3.

The UE_A 8 and the UE_B 9 may be connected to the same mobile operator network, connected to different mobile operator networks, or connected to a broadband network operated by a fixed network operator.

For example, the UE_A 8 may be connected to an IP mobile communication network operated and managed by a first network operator (Mobile Operator), while the UE_B 9 may be connected to an IP mobile communication network that is operated and managed by a second network operator and is different from the IP mobile communication network operated and managed by the first network operator. In this case, the IP mobile communication network by the second network operator may be connected to the PDN_A 5. Since the internal configuration of the stated network may be the same as that of the IP mobile communication network_A 3, the detailed description thereof will be omitted.

These IP mobile communication networks may be configured of two IP mobile communication networks under a roaming contract with each other, or configured of two IP mobile communication networks provided in the same country.

The ProSe function unit_A 7 configured to manage communications of the UE_A 8 and the UE_B 9 may be a ProSe function unit managed by a network operator with which the UE_A 8 and the UE_B 9 have a contract, may be a ProSe function unit managed by a network operator having a relationship of contract with a network vendor to be under contract, or may be a ProSe function unit managed by network operators in the same country.

Here, the broadband network refers to an IP communication network that is operated by a network operator and that provides high-speed communication using a digital line such as optical fiber over Asymmetric Digital Subscriber Line (ADSL) or the like. Alternatively, the broadband network may be, without being limited to such a network, a network for radio access using Worldwide Interoperability for Microwave Access (WiMAX) or the like.

Each of pieces of UE such as the UE_A 8 and the UE_B 9 is a communication terminal capable of establishing a connection using an access system, such as LTE or WLAN. UE includes a 3GPP LTE communication interface, a WLAN communication interface, or the like and is capable of establishing a connection to the IP mobile communication network_A 3.

Alternatively, each of pieces of UE such as the UE_A 8 and the UE_B 9 may establish, without being limited thereto, a connection using another radio system such as Worldwide Interoperability for Microwave Access (WiMAX).

Note that, in the example of the schematic configuration illustrated in FIG. 1, the UE_A 8 is in a state of being disposed inside a communication range where the UE_A 8 can be connected to the IP mobile communication network_A 3, while the UE_B 9 is in a state of being temporarily disposed outside the communication range where the UE_B 9 cannot be connected to the IP mobile communication network_A 3. To rephrase, the UE_A 8 is present within coverage of the access network, while the UE_B 9 is present outside the coverage of the access network.

The UE_A 8 provides a network connection service to the UE_B 9 using a relay. Such connection service is referred to as a "UE-to-NW Relay service" in the present specification.

The PDN_A 5 refers to a network that provides network services for transmitting and receiving data in the form of packet. For example, the PDN_A 5 is a network that provides a specific communication service such as the Internet and IMS. Note that the PDN_A 5 may be a Packet Data Network (PDN).

The PDN_A 5 is connected to the IP mobile communication network_A 3 with a wired line or the like. Connectivity between the PDN_A 5 and the IP mobile communication network_A 3 is secured by ADSL, optical fiber, or the like, for example.

Figure 2A:
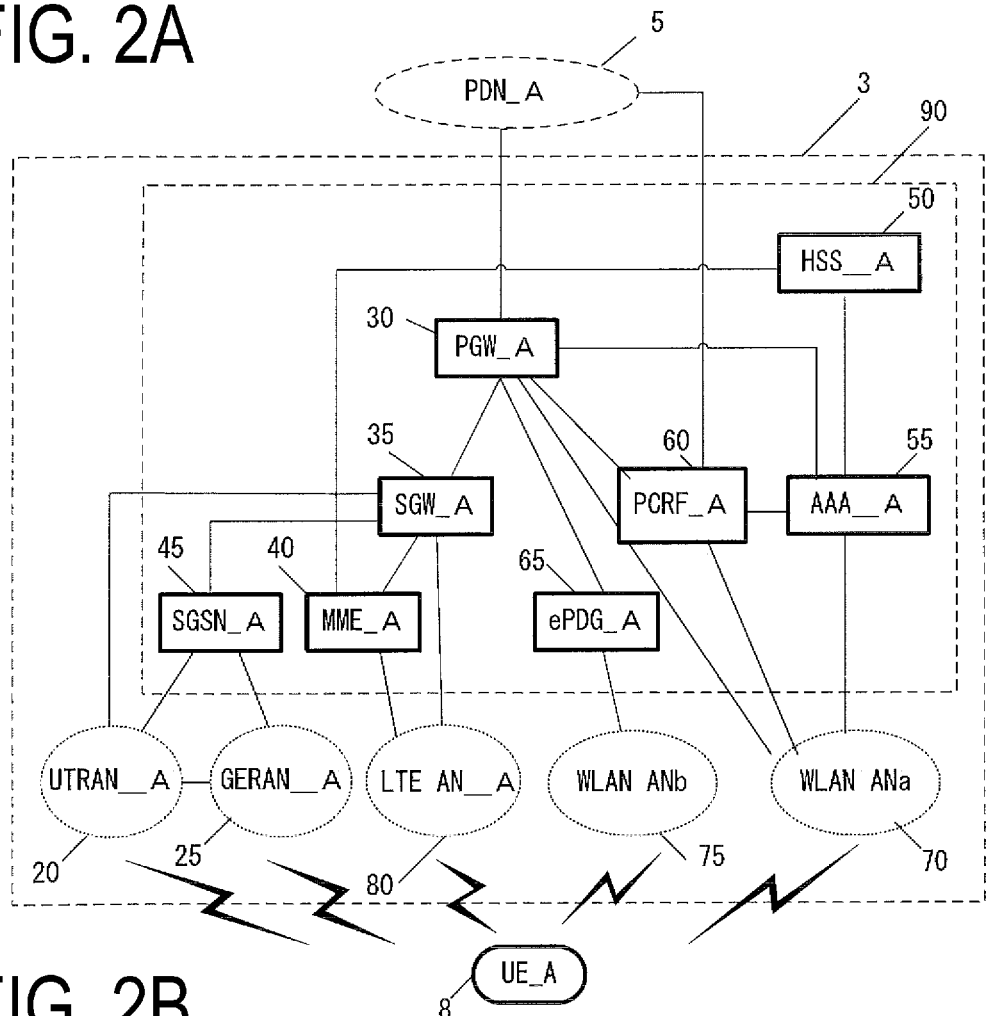
Figure 2B:
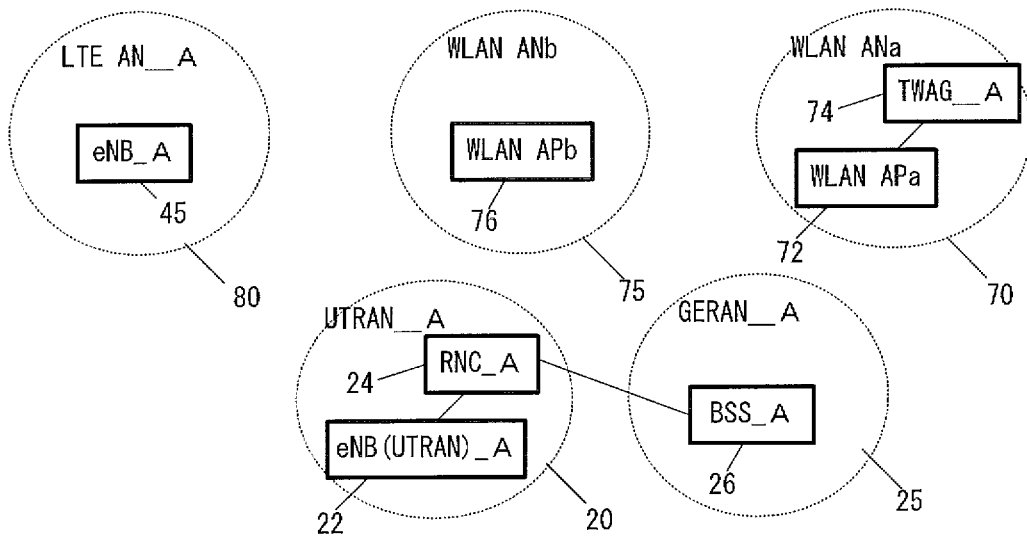

FIGS. 2A and 2B are diagrams illustrating an example of a detailed configuration of the communication system 1 illustrated in FIG. 1. A configuration example illustrated in FIG. 2A is configured of the UE_A 8, the IP mobile communication network_A 3, and the PDN_A 5. Multiple pieces of UE, in addition to the UE_A 8, can be connected to the IP mobile communication network_A 3. Although an example of the UE_A 8 being connected is illustrated in FIG. 2A, the UE_B 9 can also be configured in the same manner as the UE_A 8 in a case that the UE_B 9 is within the network coverage.

The IP mobile communication network 3 is configured of a core network_A 90 and multiple radio access networks (an LTE AN_A 80, a WLAN ANb 75, a WLAN ANa 70, a UTRAN_A 20, and a GERAN_A 25).

The radio access network may be constituted of multiple different access networks, or may be constituted of either one of the access networks. Moreover, the UE_A 8 can wirelessly connect to the radio access network.

Moreover, the WLAN access network b (WLAN ANb 75) that connects to the core network_A 90 via an ePDG_A 65 and the WLAN access network a (WLAN ANa 75) that connects to a PGW_A 30, a PCRF_A 60, and an AAA_A 55 can be configured as access networks connectable in a WLAN access system.

Note that each device has a similar configuration to those of the devices of the related art in a mobile communication system using EPS, and thus detailed descriptions thereof will be omitted. Each device will be described briefly hereinafter.

The PGW_A 30 is connected to the PDN_A 5, an SGW_A 35, the ePDG_A 65, the WLAN ANa 70, the PCRF_A 60, and the AAA_A 55 and is a relay device configured to transfer user data by functioning as a gateway device between the PDN_A 5 and the core network_A 90. The PGW_A 30 may be a Packet Data Network Gateway (PGW) further including a PGW function of the related art.

The SGW_A 35 is connected to the PGW_A 30, an MME_A 40, the LTE AN_A 80, an SGSN_A 45, and a UTRAN_A 20 and is a relay device configured to transfer user data by functioning as a gateway device between the core network_A 90 and the 3GPP access network (the UTRAN_A 20, the GERAN_A 25, and the LTE AN_A 80). The SGW_A 35 may be a Serving Gateway (SGW) further including a SGW function of the related art.

The MME_A 40 is connected to the SGW_A 35, the LTE AN_A 80, and a Home Subscriber Server (HSS) A 50 and is an access control device that performs location information management and access control for the UE_A 8 via the LTE AN_A 80. Furthermore, the core network_A 90 may include multiple location management devices. For example, a location management device different from the MME_A 40 may be constituted. The MME_A 40 may be a Mobility Management Entity (MME) further including a MME function of the related art. As with the MME_A 40, the location management device different from the MME_A 40 may be connected to the SGW_A 35, the LTE ANA 80, and the HSS_A 50.

Furthermore, in a case that multiple MMEs are included in the core network_A 90, the MMEs may be connected to each other. With this configuration, the context of the UE_A 8 may be transmitted/received among the MMEs.

The HSS_A 50 is connected to the MME_A 40 and the AAA_A 55 and is a managing node configured to manage subscriber information. The subscriber information of the HSS_A 50 is referred to during MME_A 40 access control, for example. Moreover, the HSS_A 50 may be connected to the location management device different from the MME_A 40. The HSS_A 50 may be a Home Subscriber Server (HSS) further including a HSS function of the related art.

The AAA_A 55 is connected to the PGW_A 30, the HSS_A 50, the PCRF_A 60, and the WLAN ANa 70 and is configured to perform access control for UE connected via the WLAN ANa 70. The AAA_A 55 may be an Authentication, Authorization and Accounting (AAA) further including an AAA function of the related art.

The PCRF_A 60 is connected to the PGW_A 30, the WLAN ANa 75, the AAA_A 55, and the PDN_A 5 and is configured to perform QoS management on data delivery. For example, the PCRF_A 60 manages QoS of a communication path between the UE_A 8 and the PDN_A 5.

The ePDG_A 65 is connected to the PGW_A 30 and the WLAN ANb 75 and is configured to deliver user data by functioning as a gateway device between the core network_A 90 and the WLAN ANb 75. The PCRF_A 60 may be a Policy and Changing Rule Function (PCRF) further including a PCRF function of the related art.

The SGSN_A 45 is connected to the UTRAN_A 20, the GERAN_A 25, and the SGW_A 35 and is a control device for location management between a 3G/2G access network (UTRAN/GERAN) and an LTE access network (E-UTRAN). In addition, the SGSN_A 45 has functions of: selecting PGW and SGW; managing a time zone of UE; and selecting MME at the time of handover to E-UTRAN. The SGSN_A 45 may be a Serving GPRS Support Node (SGSN) further including a SGSN function of the related art.

Meanwhile, as illustrated in FIG. 2B, each radio access network includes devices to which the UE_A 8 is actually connected (such as a base station device and an access point device), and the like. The devices used in these connections can be thought of as devices adapted to the radio access networks.

In the present embodiment, the LTE AN_A 80 may be E-URAN including an eNB_A 45. The eNB_A 45 is a radio base station to which the UE_A 8 connects in the LTE access system, and the LTE AN_A 80 may be configured to include one or multiple radio base stations.

The WLAN ANa 70 is configured to include a WLAN APa 72 and a TWAG_A 74. The WLAN APa 72 is a radio base station to which the UE_A 8 connects in a WLAN access system trusted by the operator running the core network_A 90, and the WLAN ANa 70 may be configured to include one or multiple radio base stations. The GW 74 is a gateway device between the core network_A 90 and the WLAN ANa 70. Furthermore, the WLAN APa 72 and the GW 74 may be constituted as a single device.

Even in a case where the operator running the core network_A 90 and the operator running the WLAN ANa 70 are different, such a constitution can be implemented through contracts and agreements between the operators.

Furthermore, the WLAN ANb 75 is configured to include a WLAN APb 76. The WLAN APb 76 is a radio base station to which the UE_A 8 connects in the WLAN access system in a case where no trust relationship is established with the operator running the core network_A 90, and the WLAN ANb 75 may be configured to include one or multiple radio base stations.

In this manner, the WLAN ANb 75 is connected to the core network_A 90 via the ePDG_A 65, which is a device included in the core network_A 90, serving as a gateway. The ePDG_A 65 has a security function for ensuring the security of communication.

The UTRAN_A 20 is configured to include a Radio Network Controller (RNC)_A 24 and an eNB (UTRAN)_A 22. The eNB (UTRAN)_A 22 is a radio base station to which the UE_A 8 connects through a UMTS Terrestrial Radio Access (UTRA), and the UTRAN_A 20 may be configured to include one or multiple radio base stations. Furthermore, the RNC_A 24 is a control unit configured to connect the core network_A 90 and the eNB (UTRAN)_A 22, and the UTRAN_A 20 may include one or multiple RNCs. Moreover, the RNC_A 24 may be connected to one or multiple eNBs (UTRANs). In addition, the RNC_A 24 may be connected to a radio base station, that is, a Base Station Subsystem (BSS)_A 26 included in the GERAN_A 25.

The GERAN_A 25 is configured to include a BSS_A 26. The BSS_A 26 is a radio base station to which the UE_A 8 connects through GSM/EDGE Radio Access (GERA), and the GERAN_A 25 may be constituted of one or multiple radio base stations BSSs. Furthermore, the multiple BSSs may be connected to each other. Moreover, the BSS_A 26 may be connected to the RNC_A 24.

Note that, herein, a terminal device being connected to each of the radio access networks refers to a terminal device being connected to a base station device, an access point, or the like included in each of the radio access networks, and data, signals, and the like being transmitted/received by the terminal device also pass through those base station devices, access points, or the like.

1.2 Device Configuration

Device configurations of the UE_A 8 as Relay UE, the UE_B 9 as Remote UE, the ProSe function unit_A 7, the HSS_A, and the ProSe application server_A, illustrated in FIG. 1, will be briefly described with reference to the drawings.

1.2.1 Configuration of Relay UE

The device configuration of the UE_A 8 as Relay UE is described below. It is sufficient that the UE_A 8 is a radio communication terminal including the ProSe function; the UE_A 8 may be a mobile phone terminal configured to transmit/receive data by radio communication using an LTE access scheme, or may be a communication terminal configured to perform information exchange among the devices in a mode so called machine-to-machine (M2M). In addition, the UE_A 8 may be a relay terminal device having a Relay function.

Figure 3:
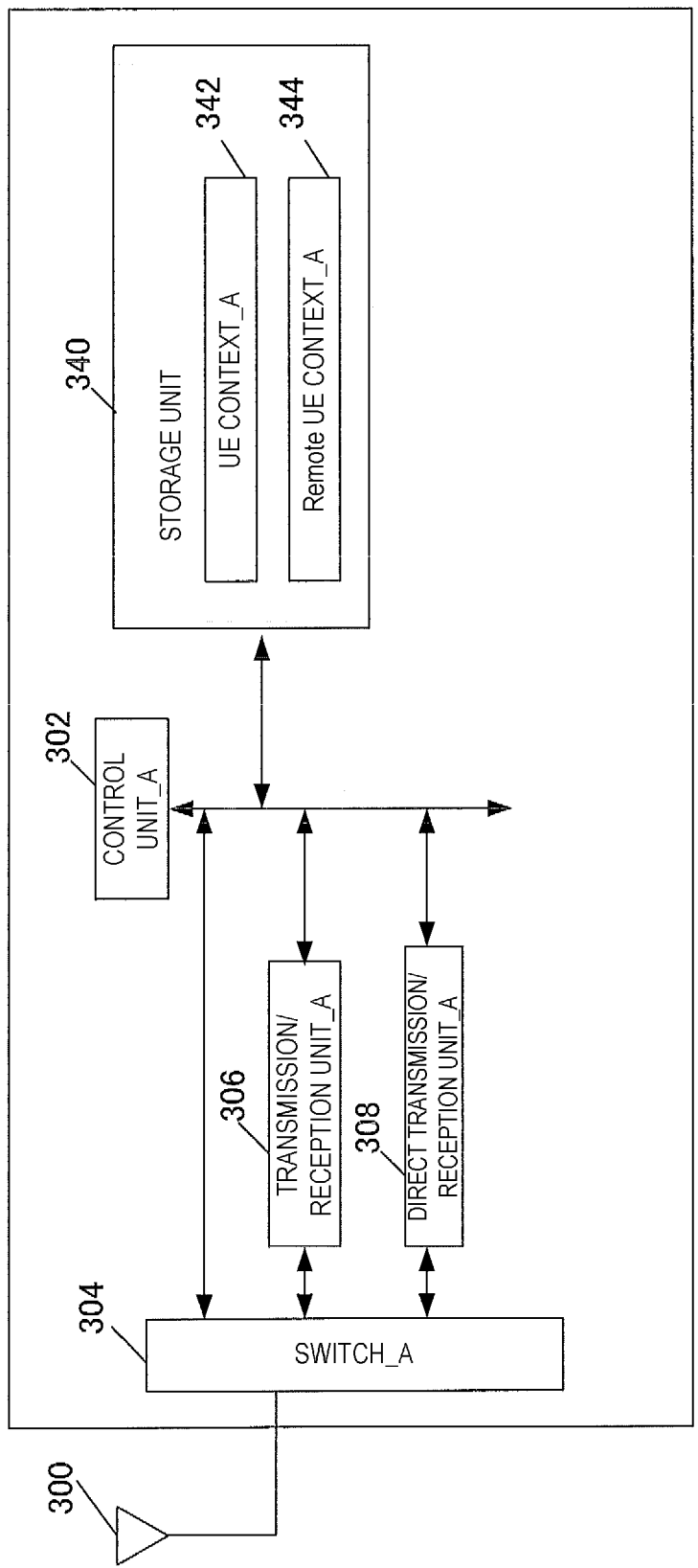
FIG. 3 is a diagram illustrating a device configuration of Relay UE.

FIG. 3 illustrates a device configuration of the UE_A 8 in the present embodiment. The UE_A 8 is constituted of a transmission/reception antenna_A 300, a switch_A 304, a direct transmission/reception unit_A 308, a transmission/reception unit_A 306, a control unit_A 302, and a storage unit_A 340. In the UE_A 8, the direct transmission/reception unit_A 308, the transmission/reception unit_A 306, the switch_A 304, and the storage unit_A 340 are connected to the control unit_A 302 via a bus.

The control unit_A 302 is a function unit to control the UE_A 8. The control unit_A 302 is a function unit configured to read out and execute various kinds of programs stored in the storage unit_A 340.

The switch_A 304 is a function unit configured to, under the control of the control unit_A 302, connect the transmission/reception unit_A 306 and the direct transmission/reception unit_A 308 to the transmission/reception antenna_A 300.

The transmission/reception unit_A 306 is a function unit configured to transmit/receive radio communication data through the LTE access scheme. The transmission/reception unit_A 306 is configured of a transmitter and a receiver; the transmitter can transmit control information through an LTE base station, and the receiver can transmit data or control information through the LTE base station.

The direct transmission/reception unit_A 308 is a function unit capable of directly communicating with another UE without passing through an LTE base station regarding data or control information. The direct transmission/reception unit_A 308 is configured of a direct transmitter and a direct receiver. The direct transmitter can transmit data or control information without passing through an LTE base station, and the direct receiver can receive data or control information without passing through an LTE base station. The transmission/reception unit_A 306 and the direct transmission/reception unit_A 308 may be configured as a single transmission/reception unit.

Note that antennas may be provided to each of the transmission/reception unit_A 306 and the direct transmission/reception unit_A 308, and data may be transmitted/received under the control of the control unit_A 302.

The storage unit_A 340 is a function unit configured to store programs, data, and the like necessary for each operation of the UE_A 8. The storage unit 313 is constituted of, for example, a semiconductor memory, a Hard Disk Drive (HDD), or the like.

Furthermore, a UE context_A 342 and a Remote UE context_A 343 are stored in the storage unit_A 340. The Remote UE context_A 344 may be part of the UE context_A 342.

The UE context_A 342 may be context information associated with a terminal device and context information which a terminal device of the related art stores. The UE context_A 342 at least includes a UE context for each UE.

FIG. 4A illustrates the UE context for each UE. As illustrated in FIG. 4A, the UE context for each UE is at least configured to include IMSI, an EMM State, GUTI, an ME Identity, and a ProSe ability.

IMSI is identification information to be assigned to a user (subscriber) using the UE_A 8. IMSI may be identification information indicating a line contract, and may be stored in a SIM card.

The EMM State indicates a mobility management state of the UE_A 8. For example, the EMM State may be EMM-REGISTERED in which the UE_A 8 is registered with the network (registered state) or EMM-DEREGISTERD in which the UE_A 8 is not registered with the network (deregistered state).

GUTI is an abbreviation of "Globally Unique Temporary Identity," and is temporary identification information on the UE_A 8. GUTI is constituted of the identification information (Globally Unique MME Identifier (GUMMEI)) on MME (e.g. the MME_A 40) and the identification information (M-TMSI) on the UE_A 8 in a specific MME (e.g. the MME_A 40).

The ME identity is an ID of ME, and may be IMEI/IMISV, for example. Here, ME may be UE.

The ProSe ability is identification information indicating the inclusion of a communication function using ProSe. Furthermore, the ProSe ability may be identification information indicating the inclusion of a function to transmit an announcing signal toward proximity UE, or identification information indicating a function capable of becoming a relay terminal between a proximity terminal and the network. Furthermore, there may be different pieces of identification information for each of these capabilities, and the ProSe ability may be identification information in which the above pieces of identification information are combined.

Furthermore, a UE context that is managed for each PDN connection, or a UE context that is managed for each bearer may be stored in the UE context_A 342.

The Remote UE context_A 344 will be described next. The Remote UE context_A 344 is a context to manage the connection between Remote UE and the network in order for the UE_A 8 to become Relay UE.

The Remote UE context_A 344 is configured to include a Remote UE context for each PDN connection and a Remote UE context for each bearer.

FIG. 4B illustrates the Remote UE context for each PDN connection. In the Remote UE context for each PDN connection, there are stored a PDN connection ID, a PDN connection type, an Application ID, a ProSe Application User ID, APN, an IP address, an IP address for remote UE, a Default bearer, a Group ID, a ProSe Relay UE ID, a Relay Service Code, and a Timer.

The PDN connection ID is identification information for identifying a PDN connection. For example, in a case that the UE_A 8 establishes a PDN connection with the PDN_A 5 for Remote UE, the same PDN connection ID as that of the PDN_A 5 may be stored.

The PDN connection type may be information to indicate whether the PDN connection identified by the PDN connection ID is a PDN connection for the terminal itself of the related art or a PDN connection for the Remote UE. To be specific, "Normal" in the case of a PDN connection for the terminal itself, "for Remote UE" in the case of a PDN connection for the Remote UE, or the like may be indicated. Furthermore, the information on the PDN connection type may be included in the PDN connection ID. In such case, the type of PDN connection may be identified based on the PDN connection ID.

The Application ID is information identifying an application that the PDN connection can use. The storage unit may store multiple Application IDs. Furthermore, in the case where Remote UE of a proximity terminal connects to this PDN connection, the storage unit may store the Application ID to identify the application that the proximity terminal uses. To rephrase, the Application ID for identifying the application by which the UE_A 8 establishes a direct communication path with the proximity terminal may be stored in the storage unit.

The ProSe Application User ID is identification information to identify a user that has been assigned from a ProSe application server to perform a Relay function using ProSe of the UE_A 8. The ProSe Application User ID is information that is stored in the ProSe application server while being related to user information in the application layer.

APN indicates a connection destination of the UE_A 8. This APN may be constituted of identification information on the network and identification information on a default operator.

The IP Address is an IP address assigned to the UE_A 8 for the PDN connection, and may be an IPv4 address or an IPv6 prefix.

The IP address for remote UE is an IP address assigned to a proximity terminal used for establishing a direct communication path of ProSe between the proximity terminal and the UE_A 8. Note that the IP address assigned to the proximity terminal may be an address assigned from the IPv6 prefix which is reported to the UE_A 8 from the network, or may be reported from the network.

The Default Bearer is EPS bearer identification information for identifying a default bearer in this PDN connection.

The Group ID is identification information of a group to which the UE_A 8 belongs. The Group ID may be identification information of a group in which a ProSe function is available. The Group ID may be, when the UE_A 8 performs one-to-many communication, a transmission destination address in a layer 2 to which the UE_A 8 transmits.

The ProSe Relay UE ID is identification information identifying the UE_A 8. The ProSe Relay UE ID may be information telling, to the ProSe function unit, that it is authorized to function as a relay terminal.

The Relay Service Code is a code indicating a connection service in which the UE_A 8 provides a network relay with a proximity terminal device.

The ProSe Relay UE ID is not transmitted in direct communication for detecting a proximity terminal, but is used to obtain the Relay Service Code which is used by the UE_B 9 to detect a proximity terminal.

In addition, the Relay Service Code is a code that is used when the UE_A 8 announces the inclusion of a relay function to a proximity terminal in a proximity terminal detection procedure of the Model A. In other words, the UE_A 8 transmits an announcing signal including the Relay Service Code, whereby the UE_A 8 is detected by a proximity terminal which expects to be connected to the network using a rely function of ProSe. The Relay Service Code may be a code reported from the ProSe function unit.

Alternatively, the Relay Service Code is a code that is used when Remote UE announces the inclusion of a relay function to a proximity terminal in a proximity terminal detection procedure of the Model B. In other words, the UE_A 8 receives, from proximity Remote UE, an announcing signal including the Relay Service Code and transmits a Response to the Remote UE, whereby the UE_A 8 is detected by the proximity terminal. The Relay Service Code may be a code reported from the ProSe function unit.

Furthermore, the Relay Service Code may be a connection service of an application for disaster prevention communication (Public Safety), or may be information in which different codes are related to respective applications so that the applications can be identified. The Timer is a timer related to the Relay Service Code and indicates a period of time during which the Relay Service Code is valid.

FIG. 4C illustrates the Remote UE context for each bearer. In the Remote UE context for each bearer, at least transfer path identification information and a Transaction ID may be stored.

The transfer path identification information may be information for identifying a bearer. Specifically, the transfer path identification information may be a bearer ID, for example.

The Transaction ID is information for identifying the communication using a bearer.

1.2.2 Configuration of Remote UE

The device configuration of the UE_B 9 as Remote UE is described below. It is sufficient that the UE_B 9 is a radio communication terminal including the ProSe function; the UE_B 9 may be a mobile phone terminal configured to transmit/receive data by radio communication using the LTE access scheme, or may be a communication terminal configured to perform information exchange among the devices in a mode so called machine-to-machine (M2M).

In addition, the UE_B 9 may be a remote terminal device capable of connecting with a relay terminal device.

Figure 5:
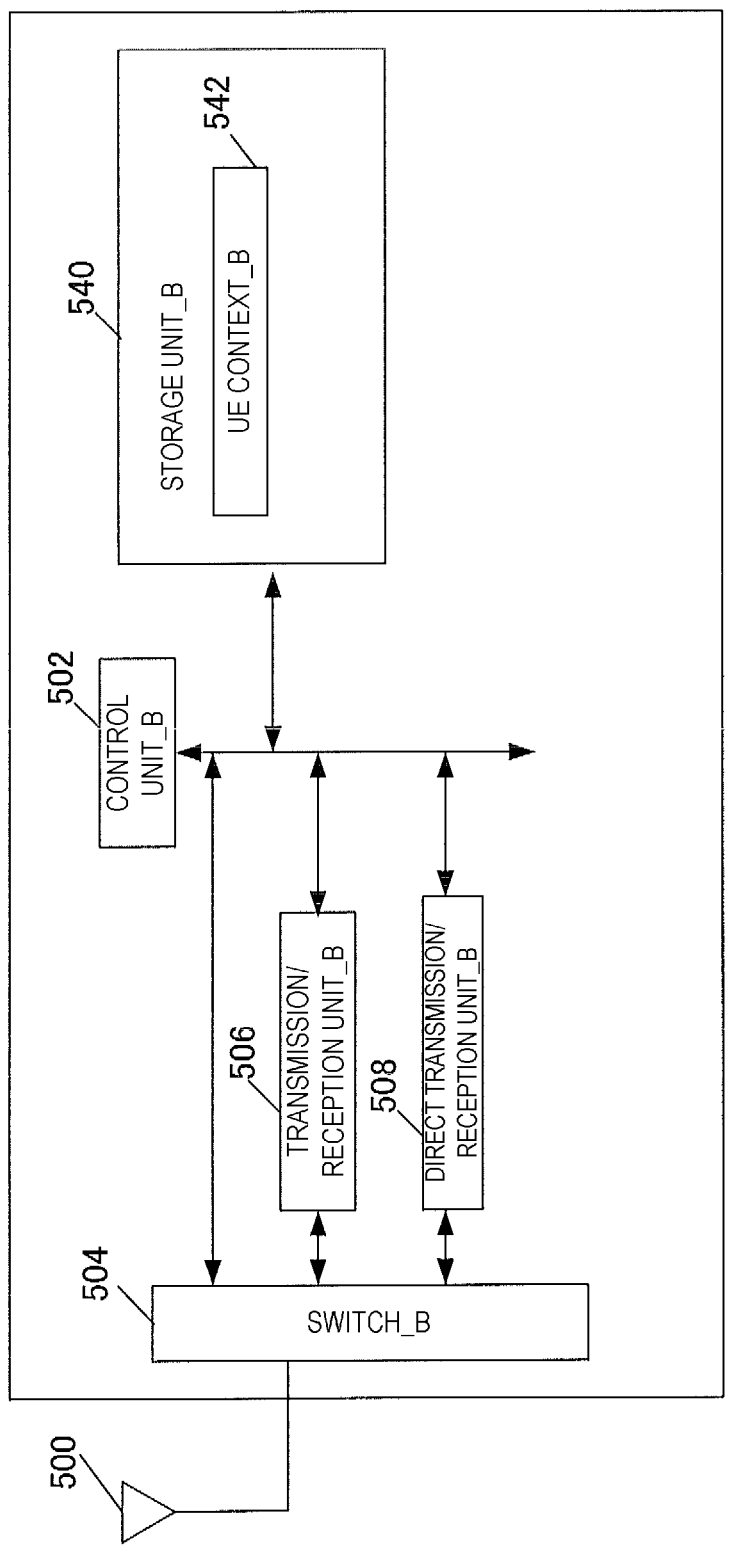
FIG. 5 is a diagram illustrating a device configuration of Remote UE.

FIG. 5 illustrates the device configuration of the UE_B 9 in the present embodiment. The UE_B 9 is constituted of a transmission/reception antenna_B 500, a switch_B 504, a direct transmission/reception unit_B 508, a transmission/reception unit_B 508, a control unit_B 502, and a storage unit_B 540. In the UE_B 9, the direct transmission/reception unit_B 508, the transmission/reception unit_B 506, the switch_B 504, and the storage unit_B 540 are connected to the control unit_B 502 via a bus.

The control unit_B 502 is a function unit to control the UE_A 8. The control unit_B 502 is a function unit configured to read out and execute various kinds of programs stored in the storage unit_B 540.

The switch_B 504 is a function unit configured to, under the control of the control unit_B 502, connect the transmission/reception unit_B 506 and the direct transmission/reception unit_B 508 to the transmission/reception antenna_B 500.

The transmission/reception unit_B 506 is a function unit configured to transmit/receive radio communication data through the LTE access scheme. The transmission/reception unit_B 506 is configured of a transmitter and a receiver; the transmitter can transmit control information through an LTE base station, and the receiver can transmit data or control information through the LTE base station.

The direct transmission/reception unit_B 508 is a function unit capable of directly communicating with another UE without passing through LTE base stations regarding data or control information. The direct transmission/reception unit_B 508 is configured of a direct transmitter and a direct receiver. The direct transmitter can transmit data or control information without passing through an LTE base station, and the direct receiver can receive data or control information without passing through an LTE base station. The transmission/reception unit_B 506 and the direct transmission/reception unit_B 508 may be configured as a single transmission/reception unit.

Note that antennas may be provided to each of the transmission/reception unit_B 506 and the direct transmission/reception unit_B 508, and data may be transmitted/received under the control of the control unit_B 502.

The storage unit_B 540 is a function unit configured to store programs, data, and the like necessary for each operation of the UE_A 8. The storage unit 313 is constituted of, for example, a semiconductor memory, a Hard Disk Drive (HDD), or the like.

Furthermore, the storage unit_B 540 stores a UE context_B 542.

The UE context_B 542 may be configured to include a UE context for each UE, a UE context for each PDN connection, and a UE context for each bearer.

FIG. 6A illustrates the UE context for each UE. The UE context for each UE may be configured to include IMSI, EMM, a State, GUTI, an ME Identity, and a ProSe ability.

IMSI is identification information to be assigned to a user (subscriber) using the UE_A 8. IMSI may be identification information indicating a line contract, and may be stored in a SIM card.

The EMM State indicates a mobility management state of the UE_A 8. For example, the EMM State may be EMM-REGISTERED in which the UE_A 8 is registered with the network (registered state) or EMM-DEREGISTERD in which the UE_A 8 is not registered with the network (deregistered state).

GUTI is an abbreviation of "Globally Unique Temporary Identity," and is temporary identification information on the UE_A 8. GUTI is constituted of the identification information (Globally Unique MME identifier (GUMMEI)) on MME (e.g. the MME_A 40) and the identification information (M-TMSI) on the UE_A 8 in specific MME (e.g. the MME_A 40).

The ME identity is an ID of ME, and may be IMEI/IMISV, for example. Here, ME may be UE.

The ProSe ability is identification information indicating the inclusion of a communication function using ProSe. Furthermore, the ProSe ability may be identification information indicating the inclusion of a function to receive and detect an announcing signal transmitted by proximity UE, or identification information indicating a function capable of becoming Remote UE and establishing a PDN connection to the network via a direct communication path with proximity Relay UE. Furthermore, there may be different pieces of identification information in accordance with these capabilities, and the ProSe ability may be identification information in which the above pieces of identification information are combined.

FIG. 6B illustrates the UE context for each PDN connection. In the UE context for each PDN connection, there are stored a PDN connection ID, a PDN connection type, an Application ID, a ProSe Application User ID, APN, an IP address, a Default bearer, a Group ID, a ProSe Remote UE ID, a Relay Service Code, and a Timer.

The PDN connection ID is identification information for identifying a PDN connection. For example, in a case that the UE_B 9 establishes a PDN connection via a direct communication path of ProSe with the Relay UE, the same information as that of the PDN connection ID stored in the PDN_A 5 may be stored. In addition, the PDN connection ID stored in the UE_B 9 may be the same information as the information stored in the UE_A 8.

The PDN connection type may be information to indicate whether the PDN connection identified by the PDN connection ID is a PDN connection for the terminal itself of the related art or a PDN connection via the Relay UE. To be specific, "Normal" in the case of a PDN connection for the terminal itself, "by Relay UE" in the case of a PDN connection for the Remote UE, or the like may be indicated. Furthermore, the information on the PDN connection type may be included in the PDN connection ID. In such case, the type of PDN connection may be identified based on the PDN connection ID.

The Application ID may be an Application ID for identifying the application that is used when the UE_B 9 establishes a direct communication path with proximity Relay UE.

The ProSe Application User ID is identification information to identify a user that has been assigned from a ProSe application server to perform a Relay function using ProSe of the UE_B 9. The ProSe Application User ID is information that is stored in the ProSe application server while being related to user information in the application layer.

APN indicates a connection destination of the UE_B 9. This APN may be constituted of identification information on the network and identification information on a default operator.

The IP Address is an IP address assigned to the UE_B 9 for the PDN connection, and may be an IPv4 address or an IPv6 prefix.

The Default Bearer is EPS bearer identification information for identifying a default bearer in this PDN connection.

The Group ID is identification information of a group to which the UE_B 9 belongs. The Group ID may be identification information of a group in which a ProSe function is available. The Group ID may be, when the UE_B 9 performs one-to-many communication, a transmission destination address in the layer 2 to which the transmission from the Relay UE is made.

The ProSe Remote UE ID is identification information identifying the UE_B 9. The ProSe Remote UE ID may be information telling, to the ProSe function unit, that it is authorized to function as Remote UE. To rephrase, UE having been assigned the ProSe Remote UE ID, detects the Relay UE as Remote UE from the ProSe function unit and establishes a direct communication path with the Relay UE, whereby stated UE may connect with the network.

Note that a ProSe UE ID in place of the ProSe Remote UE ID may be stored in the storage unit.

The ProSe UE ID is identification information identifying the UE_B 9 in the link layer. The ProSe UE ID may be information indicating that the terminal device has a ProSe function. To rephrase, UE having been assigned the ProSe UE ID can detect a proximity terminal using the ProSe function.

The ProSe Remote UE ID and the ProSe UE ID are not transmitted in direct communication for detecting a proximity terminal, but are used to obtain the Relay Service Code which is used by UE_B 9 to detect a proximity terminal.

The Relay Service Code is a code indicating a connection service in which the UE_B 9 is provided with a network relay with a proximity terminal device from the Relay UE.

In addition, the Relay Service Code is used when the UE_B 9 monitors an announcing signal transmitted from proximity Relay UE in the proximity terminal detection procedure of the Model A. In other words, the UE_B 9 detects the Relay UE by detecting the reception of the announcing signal including the Relay Service Code. The Relay Service Code may be a code reported from the ProSe function unit.

Alternatively, the Relay Service Code is a code that is used when the UE_B 9 announces that a proximity terminal having a relay function is being searched for in the proximity terminal detection procedure of the Model B. In other words, the UE_A 8 transmits, to proximity Relay UE, an announcing signal including the Relay Service Code and receives a Response therefrom, whereby the UE_A 8 detects the proximity terminal. The Relay Service Code may be a code reported from the ProSe function unit.

Further, the Relay Service Code may be a connection service of an application for disaster prevention communication (Public Safety), or may be information in which different codes are related to respective applications so that the applications can be identified.

The Timer is a timer related to the Relay Service Code and indicates a period of time during which the Relay Service Code is valid.

FIG. 6C illustrates the UE context for each bearer. In the UE context for each bearer, at least transfer path identification information and a Transaction ID may be stored.

The transfer path identification information may be information for identifying a bearer. Specifically, the transfer path identification information may be a bearer ID of a dedicated bearer, for example.

The Transaction ID is information for identifying the communication using a bearer.

1.2.3 Configuration of ProSe Function Unit

Figure 7:
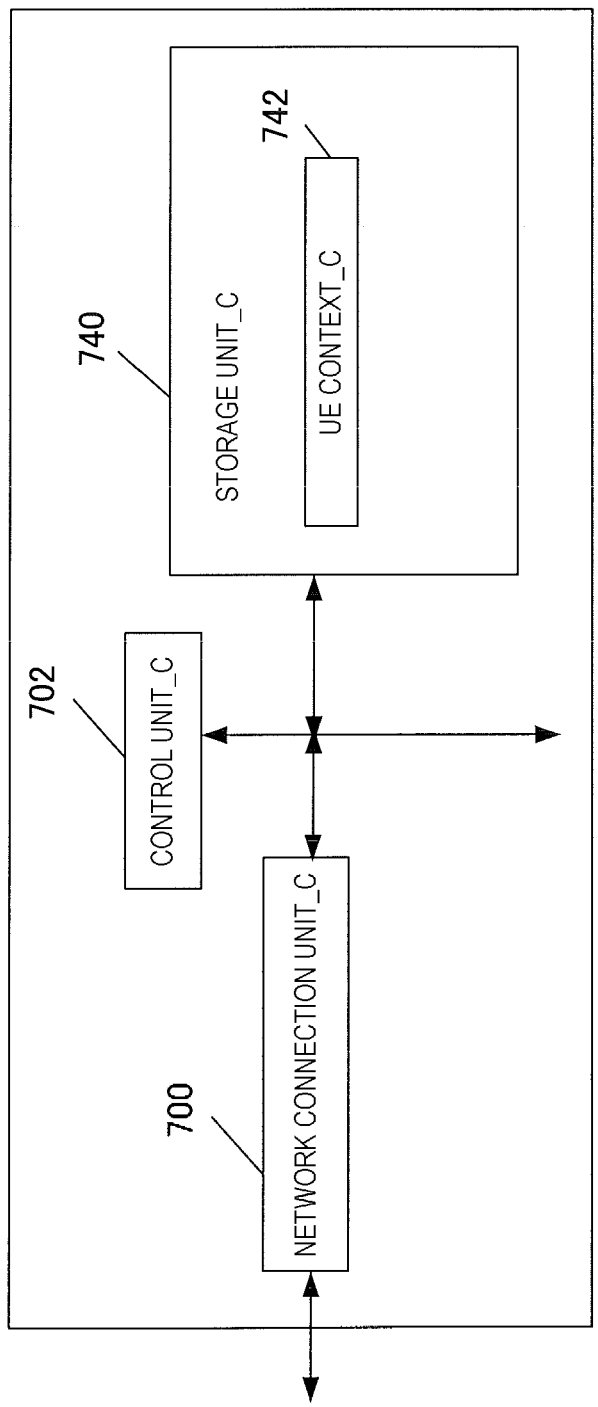
FIG. 7 is a diagram illustrating a device configuration of a ProSe function unit.

FIG. 7 illustrates a device configuration of the ProSe function unit_A 7 in the present embodiment.

The ProSe function unit_A 7 is a server device configured to perform management and authentication of services supplied by ProSe such as proximity terminal detection and direct communication between the terminals, and is a device managed by a mobile network operator.

The ProSe function unit_A 7 is constituted of a network connection unit_C 700, a control unit_C 702, and a storage unit_C 740. The network connection unit_C 700 and the storage unit_C 740 are connected by a bus via the control unit_C 702.

The control unit_C 702 is a function unit for controlling the ProSe function unit_A 7. The control unit_C 702 is a function unit configured to read out and execute various kinds of programs stored in the storage unit_C 740.

The network connection unit_C 700 is a function unit for the ProSe function unit_A 7 to connect to the IP mobile communication network 3. Note that the network connection unit_C 700 may be configured to include a transmission/reception unit for respective function units in the IP mobile communication network 3.

The storage unit_C 740 is a function unit configured to store programs, data, and the like necessary for each operation of the ProSe function unit_A 7. The storage unit_C 740 is constituted of, for example, a semiconductor memory, a Hard Disk Drive (HDD), or the like.

Furthermore, the storage unit_C 740 may store a UE context_C 742. Alternatively, in the storage unit_C 740, it is sufficient that various kinds of information elements, not limited to the UE context_C 742, are stored.

The UE context_C 742 may be configured to include a UE context for each UE and a UE context for each Relay Service.

FIG. 8A illustrates the UE context for each UE. The UE context for each UE is information on the ProSe function obtained from HSS.

Specifically, the UE context for each UE may be configured to include IMSI, GUTI, an ME Identity, and a ProSe ability, for example.

IMSI is identification information to be assigned to a user (subscriber) using the UE_A 8. IMSI may be identification information indicating a line contract, and may be stored in a SIM card.

GUTI is an abbreviation of "Globally Unique Temporary Identity," and is temporary identification information on the UE. GUTI is constituted of the identification information (Globally Unique MME identifier (GUMMED) on MME (e.g. the MME_A 40) and the identification information (M-TMSI) on the UE_A 8 in specific MME (e.g. the MME_A 40).

The ME identity is an ID of ME, and may be IMEI/IMISV, for example. Here, ME may be UE.

The ProSe ability is identification information indicating the inclusion of a communication function using ProSe. In addition, the ProSe ability may be identification information indicating the inclusion of a function to transmit an announcing signal toward proximity UE, identification information indicating a function capable of receiving the announcing signal transmitted from the proximity UE, identification information indicating a function capable of becoming a relay terminal between a proximity terminal and the network, or identification information indicating a function capable of establishing a PDN connection, as Remote UE, via a proximity terminal. Furthermore, there may be different pieces of identification information for each of these capabilities, and the ProSe ability may be identification information in which the above pieces of identification information are combined.

FIG. 8B illustrates the UE context for each Relay service. The UE context for each Relay Service may be configured to include an Application ID, a Discovery authorization info, a Group ID, a Relay Service Code, a Timer, and Relay/Remote UE info.

The Application ID is information identifying an application that the PDN connection can use. In the case where Remote UE of a proximity terminal connects with this PDN connection, the storage unit may store the Application ID for identifying the application to be used by the proximity terminal. To rephrase, the Application ID for identifying the application by which the UE_A 8 establishes a direct communication path with the proximity terminal may be stored in the storage unit. The Application ID may be service identification information identifying the service.

The Discovery authorization info is information on authentication for proximity terminal detection of UE managed by the ProSe function unit_A 7. Specifically, the Discovery authorization info may be authentication information indicating that the ProSe function unit_A 7 has authenticated that UE detects a proximity terminal expected to become Relay UE, authentication information indicating that the ProSe function unit_A 7 has authenticated that UE is detected by a proximity terminal through transmitting announcement to Remote UE, or the like.

The Group ID is identification information of a group to which UE belongs. The Group ID may be identification information of a group in which a ProSe function is available. The Group ID may be, when UE performs one-to-many communication, a transmission destination address in the layer 2 to which the Relay UE transmits.

The Relay Service Code is identification information identifying connectivity that is provided to UE by the service. The Relay Service Code which is the same as the Relay Service Code stored in UE may be stored.

The Timer is a timer related to the Relay Service Code. The Timer indicates a period of time during which the Relay Service Code is valid.

The Relay/Remote UE info is information on UE as a direct communication destination of the UE context. In other words, in the case of the UE context being a context for Relay UE, the Remote UE info is stored in the storage unit; in the case of the UE context being a context for Remote UE, the Relay UE info is stored.

In addition, the above-mentioned information may be a ProSe Remote UE ID, ProSe Relay UE ID, or ProSe UE ID of each terminal device.

1.2.4 Configuration of HSS

Figure 9:
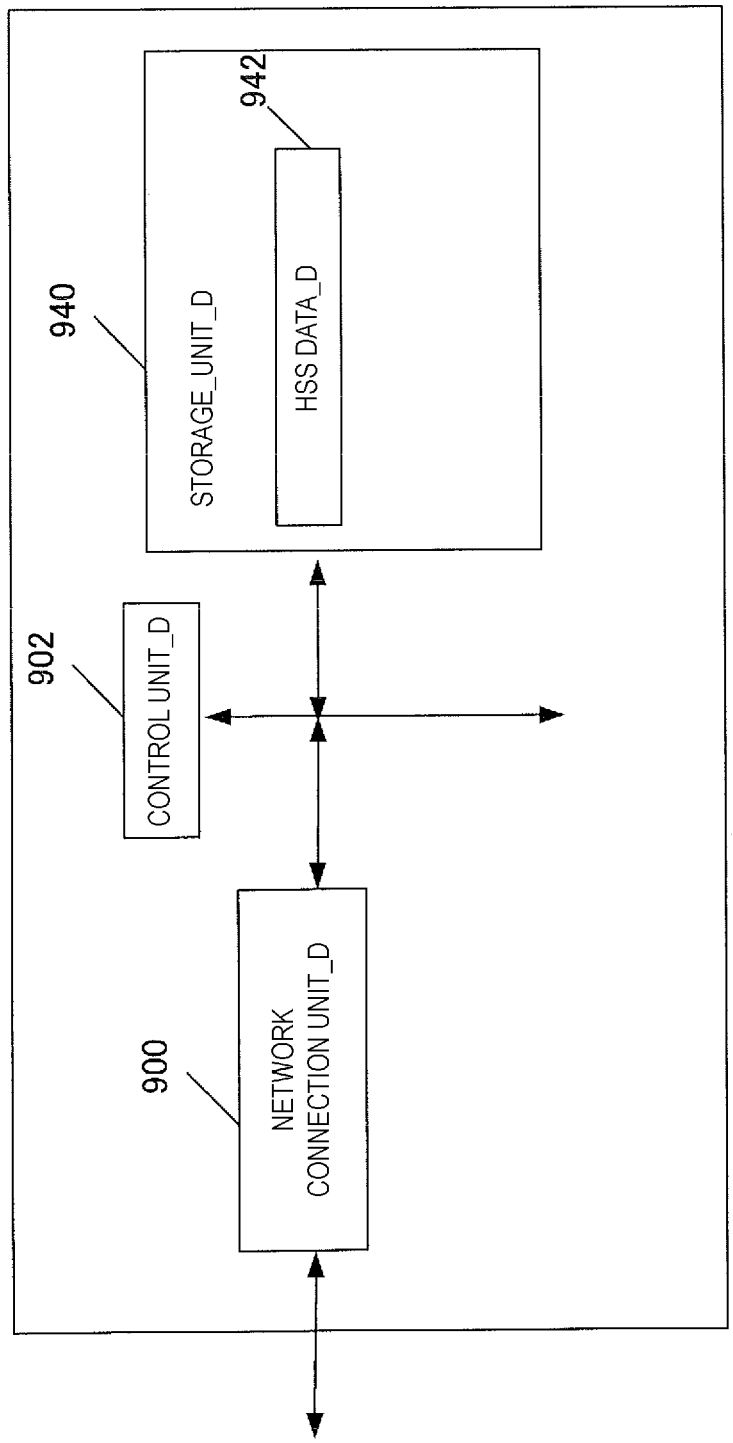
FIG. 9 is a diagram illustrating a device configuration of HSS.

FIG. 9 illustrates a device configuration of the HSS_A 50 in the present embodiment. The HSS_A 50 is a server device configured to manage subscriber information. Furthermore, the HSS_A 50 manages permission information and the like, for service supply of communication services including ProSe, and the like.

The HSS_A 50 is constituted of a network connection unit_D 900, a control unit_D 902, and a storage unit_D 940. The network connection unit_D 900 and the storage unit_D 940 are connected by a bus via the control unit_D 902.

The control unit_D 902 is a function unit for controlling the HSS_A 50. The control unit_D 902 is a function unit configured to read out and execute various kinds of programs stored in the storage unit_D 940.

The network connection unit_D 900 is a function unit for the HSS_A 50 to connect with the IP mobile communication network 3. Note that the network connection unit_D 900 may be configured to include transmission/reception units corresponding to respective function units in the IP mobile communication network 3.

The storage unit_D 940 is a function unit for storing programs, data, and the like necessary for each operation of the HSS_A 50. The storage unit 707 is constituted of, for example, a semiconductor memory, a Hard Disk Drive (HDD), or the like.

Furthermore, the storage unit_D 940 may store HSS data_D 942. The storage unit_D 940 may manage stated HSS data as subscriber information for each UE.

The HSS data_D 942 is configured to include the HSS data for each UE and the HSS data for each PDN connection.

FIG. 10A illustrates the HSS data for each UE. As illustrated in FIG. 10A, the HSS data for each UE may include IMSI, MSISDN, IMEI/IMEISV, an Access Restriction, a ProSe capability, and a PLMN list.

IMSI is identification information to be assigned to a user (subscriber) using the UE_A 8. IMSI may be identification information indicating a line contract, and may be stored in a SIM card. MSISDN represents the phone number of UE. IMEI/IMISV is identification information assigned to UE. The Access Restriction indicates registration information for access restriction.

The ProSe capability indicates whether UE has a ProSe function. Here, the ProSe function refers to proximity terminal detection capability and direct communication capability with a proximity terminal. In other words, in the case where the ProSe capability is included in the HSS data for each UE, UE can detect a proximity terminal or can be detected by the proximity terminal using ProSe, and can perform direct communication with the proximity terminal. In addition, the ProSe capability may be information indicating permission to provide a network connection service to a proximity terminal by performing direct communication with the proximity terminal. Alternatively, the ProSe capability may be information indicating permission to be provided with the network connection service by performing direct communication with the proximity terminal. Alternatively, both pieces of the above-mentioned information may be included.

The PLMN list is a list of PLMNs in which UE is permitted to detect a proximity terminal. In addition, the HSS_A 50 may store authentication information including the PLMN list. The HSS_A 50 may notify the ProSe function unit of a PLMN ID permitted for UE in response to the request from the ProSe function unit.

Although the respective constituent elements of the HSS data for each UE have been discussed so far, the HSS data for each UE is not limited thereto, and the constituent elements including other pieces of information may be stored.

FIG. 10B illustrates the HSS data for each PDN connection. The HSS data for each PDN connection is configured of a Context ID, a PDN address, a PDN Type, a PDN connection Type, APN, and a PDN GW ID.

The Context ID is information identifying a context including the HSS data for each PDN.

The PDN Address indicates an IP address with which UE is registered when establishing a PDN connection.

The PDN Type indicates the type of PDN Address. That is, the PDN Type is identification information for identifying IPv4, IPv6, or IPv4v6, for example.

The PDN connection type may be information indicating whether the PDN connection identified by the PDN connection ID is a PDN connection for the terminal itself of the related art, a PDN connection for Remote UE, or a PDN connection provided by Relay UE. To be specific, "Normal" in the case of a PDN connection for the terminal itself, "for Remote UE" in the case of a PDN connection for the Remote UE, "by Relay UE" in the case of a PDN connection provided by the Relay UE, or the like may be indicated. Furthermore, the information on the PDN connection type may be included in the PDN connection ID. In such case, the type of PDN connection may be identified based on the PDN connection ID.

APN indicates a connection destination of the UE_A 8. This APN may be constituted of identification information on the network and identification information on a default operator.

The PDN GW identity is identification information for identifying PGW utilized in this APN. This identification information may be a Fully Qualified Domain Name (FQDN) or an IP address.

Although the respective constituent elements of the HSS data for each PDN connection have been discussed so far, the HSS data for each PDN connection is not limited thereto, and the constituent elements including other pieces of information may be stored.

1.2.5 Configuration of ProSe Application Server

Figure 11:
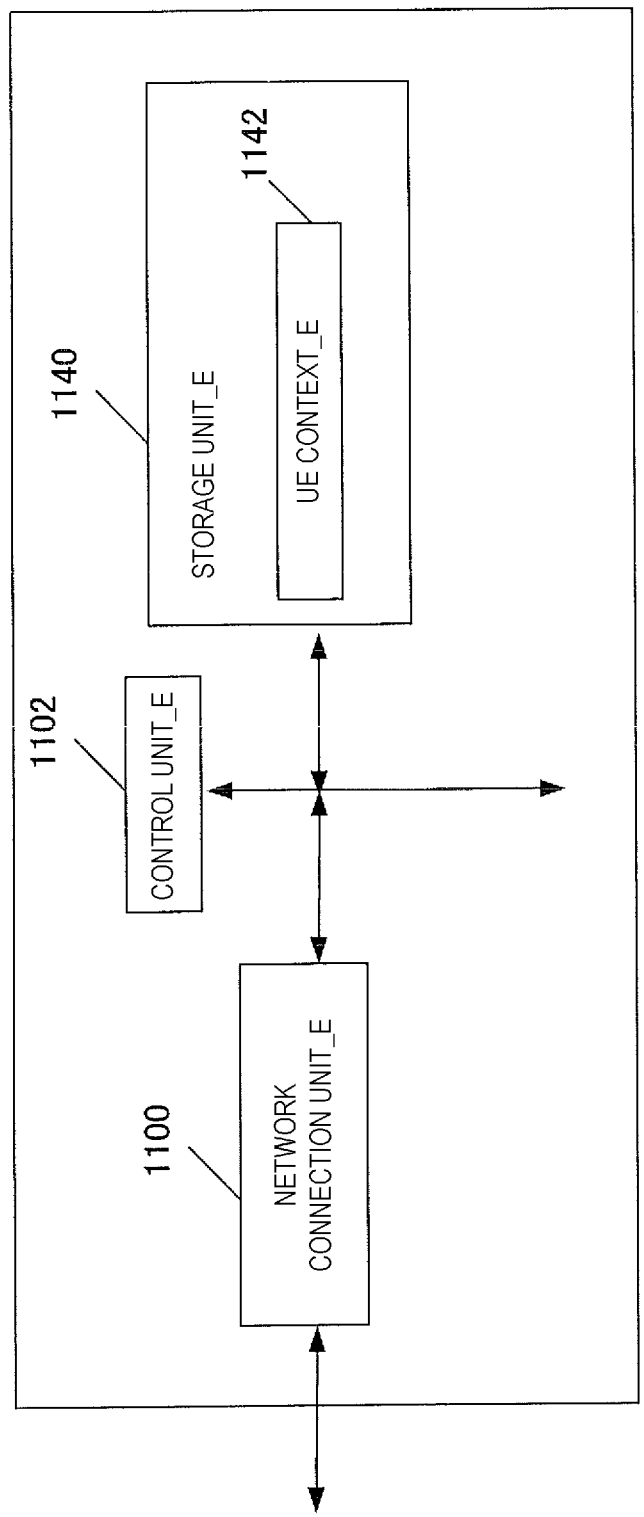
FIG. 11 is a diagram illustrating a device configuration of an application server.

FIG. 11 illustrates a device configuration of the ProSe application server_A 2 in the present embodiment. The ProSe application server_A 2 is an application server related to ProSe, and may be a server device configured to link and manage user information in the application layer and permission information such as Permission info, store the permission information for each user, and the like.

The ProSe application server_A 2 is constituted of a network connection unit_E 1100, a control unit_E 1102, and a storage unit_E 1140. The network connection unit_E 1100 and the storage unit_E 1140 are connected by a bus via the control unit_E 1102.

The control unit_E 1102 is a function unit to control the ProSe application server_A 2. The control unit_E 1102 is a function unit to read out and execute various kinds of programs stored in the storage unit_E 1140.

The network connection unit_E 1100 is a function unit for the ProSe application server_A 2 to connect with the IP mobile communication network 3. Note that the network connection unit_E 1100 may be configured to include transmission/reception units corresponding to respective function units in the IP mobile communication network 3.

The storage unit_E 1140 is a function unit configured to store programs, data, and the like necessary for each operation of the ProSe application server_A 2. The storage unit_E 1140 is constituted of, for example, a semiconductor memory, a Hard Disk Drive (HDD), or the like.

Furthermore, the storage unit_E 1140 may store a UE context_E 1142. Alternatively, in the storage unit_E 1140, it is sufficient that various kinds of information elements, not limited to the UE context_E 1142, are stored.

Note that the UE context_E 1142 at least includes a UE context for each user.

FIG. 12A illustrates the UE context for each user. The UE context_E 1142 for each user is configured to include an Application Layer User ID, a ProSe Function ID, an Application ID, a ProSe Application User ID, and Permission info.

The Application Layer User ID is user identification information in the application layer.

The ProSe Function ID is identification information identifying the ProSe function unit having an authenticated user. The ProSe Function ID may be a Fully Qualified Domain Name (FQDN) or an IP address.

The Application ID is information to identify an application configured to provide the ProSe service to the user.

The ProSe Application User ID (PAUID) is information identifying the user, and is also information that is stored being linked with the Application Layer User ID. This information may be the same as the ProSe Application User ID stored in the ProSe function unit.

The Permission info is information indicating permission information of the ProSe function for each user. Specifically, the Permission info may be managed using a management table as illustrated in FIG. 12B, for example.

In an example illustrated in FIG. 12B, the permission information managed by the Permission info may be managed for a Remote UE function and a ProSe Relay UE function.

Here, the Remote UE function indicates a function that can detect, as Remote UE, a proximity terminal expected to become Relay UE, and can use a PDN connection provided to the Relay UE.

In the example of FIG. 12B, a user assigned PAUID (A) is not permitted the use of the Remote UE function, but is permitted the use of the ProSe Relay UE function. Furthermore, a user assigned PAUID (B) is permitted the use of the Remote UE function, but is not permitted the use of the ProSe Relay UE function.

Furthermore, the ProSe Relay UE function indicates a function that can become Relay UE and provide a network connection service to a proximity terminal.

In addition, the Permission info may include a Discovery Type permitted for the user.

To be specific, information indicating that a Discovery procedure is a method in which Relay UE is detected by Remote UE receiving a signal announced from the Relay UE, may be included in the permission info.

Alternatively, information indicating that the Discovery procedure is a detection method in which the Relay UE is detected by the Remote UE receiving a Response transmitted from the Relay UE based on Solicitation information transmitted from Remote UE, may be included in the permission info. Furthermore, they may be stored corresponding to the respective functions (the Remote UE function and the ProSe Relay UE function).

1.3 Description of Processing

Hereinafter, the overview of processing described in the present embodiment will be described.

1.3.1 Service Authentication Procedure

Each of the UE_A 8 and the UE_B 9 performs an authentication procedure for terminal detection (ProSe Direct Discovery) provided as a ProSe service, communication using a direct communication path (ProSe Direct Communication), and the like.

Furthermore, the UE_A 8 performs an authentication procedure for usage of the ProSe Relay UE function as a ProSe service, and the UE_B 9 performs an authentication procedure for usage of the Remote UE function.

The proximity terminal detection and the communication using a direct communication path may each be authenticated by different procedures, or may be authenticated by a single authentication procedure.

The authentication of the ProSe Relay UE function or the authentication of the Remote UE function may be authenticated along with the proximity terminal detection and the authentication procedure for the communication using a direct communication path, or may be authenticated by a different procedure.

Note that in the following service authentication procedures, the UE_A 8 and the UE_B 9 are positioned within coverage (within a communication range) of a base station.

1.3.1.1 Relay UE Service Authentication Procedure

Figure 13:
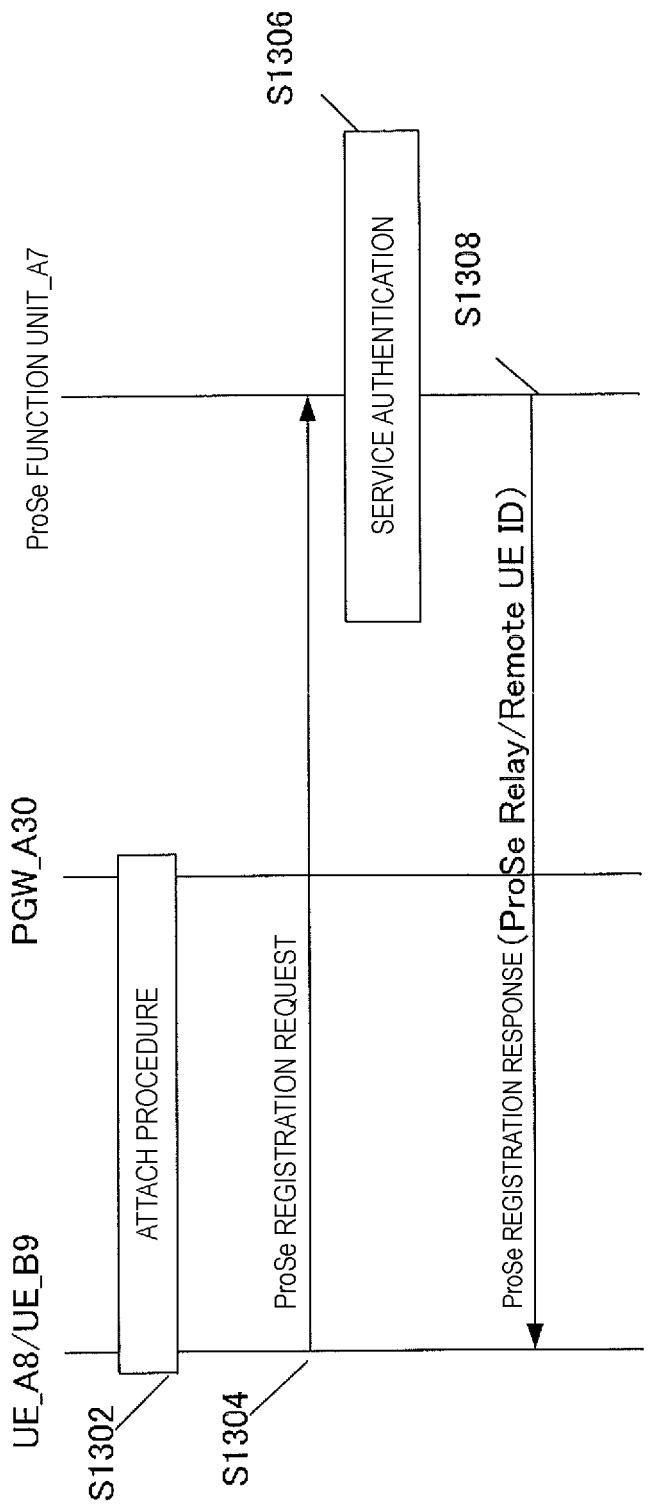
FIG. 13 is a diagram illustrating a service authentication procedure.

A Relay UE authentication procedure in the present embodiment will be described with reference to FIG. 13.

First, the UE_A 8 to become Relay UE performs an attach procedure to connect with a core network (S1302). As a result of performing the attach procedure, the UE_A 8 establishes a PDN connection with the PGW_A 30. The PDN connection refers to a communication path through which data is transmitted/received between the UE_A 8 and the PDN 5. The attach procedure may be performed as an initial procedure at a time when the UE_A 8 powers on, or the like.

More specifically, a description will be given using the attach procedure. The procedure is started by the UE_A 8 transmitting an attach request to the MME_A 40. The attach request may be transmitted including identification information of UE such as APN or IMSI. Note that APN need not be included in the attach request message, and may be reported to the MME_A 40 from the UE_A 8 with a control message in the attach procedure.

Furthermore, the UE_A 8 may request a PDN connection of the related art or may request a PDN connection used in the UE-to-NW Relay. The UE_A 8 may include, in the attach request message, identification information indicating whether the PDN connection of the related art is requested or the PDN connection used in the UE-to-NW Relay is requested.

The MME_A 40 selects the PGW_A 30 based on the received APN, and determines an anchor node of the PDN connection for the UE_A 8. Furthermore, the MME_A 40 permits the establishment of the PDN connection and the connection to the core network, and transmits, to the UE_A 8, an attach accept message as a response to the attach request message. Note that the attach accept message may be transmitted from the MME_A 40 directly to the UE_A 8 or may be transmitted through the eNB_A 45 included in the LTE AN_A 80.

Note that, in a case where the MME_A 40 authenticates that, in a security authentication procedure with the HSS_A 50, the UE_A 8 is Relay UE, the MME_A 40 may permit the establishment of the PDN connection for the UE-to-NW Relay and transmit the attach accept message as the response to the attach request message including the stated permission information.

Alternatively, the MME_A 40 may permit, based on APN included in the attach request transmitted from the UE_A 8, the establishment of the PDN connection for the UE-to-NW Relay and transmit the attach accept message as the response to the attach request message including the stated permission information.

The MME_A 40 may notify the UE_A 8 that the UE_A 8 is permitted connecting to the core network by transmitting the attach accept message. Furthermore, the MME_A 40 may notify the UE_A 8 that the PDN connection is established by transmitting the attach accept message. The attach accept message may be transmitted including the IP address related to the PDN connection or APN.

Furthermore, the MME_A 40 may transmit the attach accept message including the ProSe UE ID. Note that the ProSe UE ID is identification information of a terminal assigned to UE having the ProSe function. For example, the MME_A 40 may transmit the attach accept message including the ProSe UE ID, based on the fact that APN transmitted by the UE_A 8 in the attach procedure is identified as APN related to the ProSe service. At this time, the MME_A 40 may assign the ProSe UE ID to the UE_A 8. Furthermore, this information may be obtained from the HSS_A 50. In this case, the HSS_A 50 or the like may store the ProSe UE ID included in subscriber information in advance.

In addition, the ProSe UE ID may be a ProSe Relay UE ID. That is, the MME_A 40 may include the ProSe Relay UE ID in the attach accept message, based on the fact that the identification information of the UE_A 8 is identified as being related to the Relay UE function.

Next, the UE_A 8 transmits a ProSe registration request to the ProSe function unit_A 7 (S1304). The ProSe registration request may be a ProSe registration request message requesting, to the ProSe function unit_A 7, that the UE_A 8 should be registered as UE having the ProSe function. The UE_A 8, by transmitting the ProSe registration request message, may request permissions for proximity terminal detection and communication using a direct communication path, and may request the usage of the Relay UE function. The UE_A 8 may transmit the ProSe registration request message including pieces of information each identifying permission of the proximity terminal detection, permission of the communication using a direct communication path, and permission of usage of the Relay UE function, and may request the above-mentioned permissions.

The UE_A 8 may transmit the ProSe registration request using the PDN connection established in the attach procedure. In addition, the UE_A 8 may transmit the ProSe registration request message with the IP address obtained in the attach procedure as a transmission source address.

Furthermore, the ProSe function unit_A 7 as a transmission destination of the ProSe registration request message may store, in advance, information of the ProSe function unit_A 7 corresponding to a Home PLMN which is a network operator to make a contract with, and the information may be used as the transmission destination.

Alternatively, a list of network operators capable of providing the ProSe service may be stored as a local PLMN, and information on the ProSe function unit_A 7 corresponding to the local PLMN may also be stored, so as to be used as the transmission destination.

The local PLMN may be a freely-selected network operator determined by a contract relationship with the Home PLMN, or may be a network operator running the network in the same country along with the Home PLMN.

As discussed above, the UE_A 8 may store a PLMN ID for identifying the PLMN and the ProSe function unit_A 7 while making them correspond to each other, and may request authentication using this information as the transmission destination.

Moreover, the PLMN ID and the information of the ProSe function unit_A 7 may be obtained from the Home PLMN. For example, inquiries may be sent to the ProSe function unit_A 7 of the Home PLMN, and desired information may be obtained and stored in accordance with the response to the inquiries.

The ProSe function unit_A 7 may receive the ProSe registration request, and may authenticate the proximity terminal detection, the communication using a direct communication path, and the relay communication using the Relay UE function (S1306). Based on the authentication, the ProSe function unit_A 7 may assign the ProSe Relay UE ID to the UE_A 8.

In addition, the ProSe function unit_A 7 may request, in a case where the UE context is not stored in the ProSe function unit, the registration information of UE associated with ProSe to the HSS_A 50.

In a case where the ProSe function unit_A 7 cannot authenticate, for the UE_A 8, the relay communication using the Relay UE function, the ProSe function unit_A 7 may not assign the ProSe Relay UE ID to the UE_A 8.

The ProSe function unit_A 7 may transmit an authentication request to the ProSe application server_A 2 as needed. Specifically, the ProSe function unit_A 7 may request the ProSe application server_A 2 to authenticate the UE_A 8 based on an operator policy or a network policy. The ProSe function unit_A 7 may transmit an authentication request message including the ProSe Relay UE ID to the ProSe application server_A 2.

The ProSe application server_A 2 may authenticate the proximity terminal detection, the communication using a direct communication path, and the relay communication using the Relay UE function for the UE_A 8, based on receiving the authentication request message or based on receiving the ProSe Relay UE ID.

The ProSe function unit_A 7 may transmit a ProSe registration response based on the authentication (S1308). The ProSe registration response may be a Response message to the ProSe registration request received from the UE_A 8.

The ProSe registration response may be transmitted including the authentication result. The ProSe function unit_A 7 may store information for the authentication while making the stated information correspond to the UE_A 8, and may determine whether the authentication result is successful or unsuccessful based on the information.

The ProSe function unit_A 7 may transmit, to the UE_A 8, the ProSe registration response including the ProSe Relay UE ID based on receiving the ProSe registration request. The ProSe Relay UE ID may be an ID corresponding to the UE_A 8, and the UE_A 8 may use the ProSe Relay UE ID as information for identifying the terminal in the case of performing the proximity terminal detection, notifying the proximity terminal of the presence of the UE_A 8 itself, or the like. To be more specific, the UE_A 8 may transmit the announcing signal including the ProSe Relay UE ID.

The ProSe function unit_A 7 may report the failure of authentication by not including the ProSe Relay UE ID in the Response message.

The UE_A 8 receives the ProSe registration response and obtains the authentication result. In addition, the UE_A 8 may obtain and store the ProSe Relay UE ID included in the ProSe registration response.

The UE_A 8 may also receive, from the ProSe function unit_A 7, a timer corresponding to the service and indicating a period of time during which the authentication of the service is valid. The UE_A 8 may start counting in a case of receiving the timer. Furthermore, in a case where the counting is ended, the service authentication request may be transmitted again to the ProSe function unit_A 7. Alternatively, the service authentication request may be transmitted based on the request from the network during the counting of the timer.

1.3.1.2 Remote UE Service Authentication Procedure

A Remote UE service authentication procedure in the present embodiment will be described with reference to FIG. 13.

First, the UE_B 9 to become Remote UE performs the attach procedure to connect with the core network (S1302). As a result of performing the attach procedure, the UE_B 9 establishes a PDN connection with the PGW_A 30. The PDN connection refers to a communication path through which data is transmitted/received between the UE_B 9 and the PDN 5. The attach procedure may be performed as an initial procedure at a time when the UE_B 9 powers on, or the like.

More specifically, a description will be given using the attach procedure. The procedure is started by the UE_B 9 transmitting an attach request to the MME_A 40. The attach request may be transmitted including identification information of UE such as APN or IMSI. Note that APN need not be included in the attach request message, and may be reported to the MME_A 40 from the UE_B 9 with a control message in the attach procedure.

The MME_A 40 selects the PGW_A 30 based on the received APN, and determines an anchor node of the PDN connection for the UE_B 9. Furthermore, the MME_A 40 permits the establishment of the PDN connection and the connection to the core network, and transmits, to the UE_A 8, an attach accept message as a response to the attach request message. Note that the attach accept message may be transmitted from the MME_A 40 directly to the UE_A 8 or may be transmitted through the eNB_A 45 included in the LTE AN_A 80.

The MME_A 40 may notify the UE_B 9 that the UE_B 9 is permitted connecting to the core network by transmitting the attach accept message. Furthermore, the MME_A 40 may notify the UE_B 9 that the PDN connection is established by transmitting the attach accept message. The attach accept message may be transmitted including the IP address related to the PDN connection or APN, or the like.

Furthermore, the MME_A 40 may transmit the attach accept message including the ProSe UE ID. Note that the ProSe UE ID is identification information of a terminal assigned to UE having the ProSe function. For example, the MME_A 40 may transmit the attach accept message including the ProSe UE ID, based on the fact that APN transmitted by the UE_A 8 in the attach procedure is identified as APN related to the ProSe service. At this time, the MME_A 40 may assign the ProSe UE ID to the UE_B 9. Furthermore, this information may be obtained from the HSS_A 50. In this case, the HSS_A 50 or the like may store the ProSe UE ID included in subscriber information in advance.

In addition, the ProSe UE ID may be a ProSe Remote UE ID. That is, the MME_A 40 may include the ProSe Remote UE ID in the attach accept message, based on the fact that the identification information of the UE_B 9 is identified as being related to the Remote UE function.

Next, the UE_B 9 transmits a ProSe registration request to the ProSe function unit_A 7 (S1304). The ProSe registration request may be a ProSe registration request message requesting, to the ProSe function unit_A 7, that the UE_B 9 should be registered as UE having the ProSe function. The UE_B 9 may request, by transmitting the ProSe registration request message, permissions to perform proximity terminal detection, perform communication using a direct communication path, and access the network using a relay service by the Remote UE function. The UE_B 9 may transmit the ProSe registration request message including pieces of information each identifying permission of the proximity terminal detection, permission of the communication using a direct communication path, and access to the network using the relay service by the Remote UE function, and may request these permissions individually.

The UE_B 9 may transmit the ProSe registration request using the PDN connection established in the attach procedure. In addition, the UE_B 9 may transmit the ProSe registration request message with the IP address obtained in the attach procedure as a transmission source address.

Furthermore, the ProSe function unit_A 7 as a transmission destination of the ProSe registration request message may store, in advance, information of the ProSe function unit_A 7 corresponding to a Home PLMN which is a network operator to make a contract with, and the information may be used as the transmission destination.

Alternatively, a list of network operators capable of providing the ProSe service may be stored as a local PLMN, and information of the ProSe function unit_A 7 corresponding to the local PLMN may also be stored, so as to be used as the transmission destination.

The local PLMN may be a freely-selected network operator determined by a contract relationship with the Home PLMN or the like, or may be a network operator running the network in the same country along with the Home PLMN.

As discussed above, the UE_B 9 may store a PLMN ID for identifying the PLMN and the ProSe function unit_A 7 while making them correspond to each other, and may request authentication using this information as the transmission destination.

Moreover, the PLMN ID and the information of the ProSe function unit_A 7 may be obtained from the Home PLMN. For example, inquiries may be sent to the ProSe function unit_A 7 of the Home PLMN, and desired information may be obtained and stored in accordance with the response to the inquiries.

The ProSe function unit_A 7 may receive the ProSe registration request, and may authenticate the proximity terminal detection, the communication using a direct communication path, and the relay communication using the Remote UE function (S1306). Based on the authentication, the ProSe function unit_A 7 may assign the ProSe Remote UE ID to the UE_A 8.

In addition, the ProSe function unit_A 7 may request, in a case where the UE context is not stored in the ProSe function unit, the registration information of UE associated with ProSe to the HSS_A 50.

In a case where the ProSe function unit_A 7 cannot authenticate, for the UE_B 9, the relay communication using the Remote UE function, the ProSe function unit_A 7 may not assign the ProSe Remote UE ID to the UE_B 9.

The ProSe function unit_A 7 may transmit an authentication request to the ProSe application server_A 2 as needed. The ProSe function unit_A 7 may transmit an authentication request message including the ProSe Application User ID.

The ProSe application server_A 2 may authenticate the proximity terminal detection, the communication using a direct communication path, and the relay communication using the Remote UE function for the user, based on receiving the authentication request message or based on receiving the ProSe Application User ID.

The ProSe function unit_A 7 may transmit a ProSe registration response based on success in the authentication (S1308).

The ProSe registration response may be transmitted including the authentication result. The ProSe function unit_A 7 may store information for the authentication while making the stated information correspond to the UE_B 9, and may determine whether the authentication result is successful or unsuccessful based on the information.

The ProSe function unit_A 7 may transmit, to the UE_B 9, the ProSe registration response including the ProSe Remote UE ID based on receiving the ProSe registration request. The ProSe Remote UE ID may be an ID corresponding to the UE_B 9, and the UE_B 9 may use the ProSe Remote UE ID as information for identifying the terminal in the case of performing the proximity terminal detection, or notifying the proximity terminal of the presence of the UE_B 9 itself. To be more specific, the UE_B 9 may transmit a ProSe direct communication path establishment request with the UE_A 8, including the ProSe Remote UE ID therein.

The ProSe function unit_A 7 may transmit, to the UE_B 9, the ProSe registration response including the ProSe UE ID. The ProSe UE ID is identification information identifying the UE_B 9. The ProSe UE ID may be information indicating that the terminal device has a ProSe function. To rephrase, UE having been assigned the ProSe UE ID can detect a proximity terminal using the ProSe function.

The UE_B 9 receives the ProSe registration response and obtains the authentication result. In addition, the UE_B 9 may obtain and store the ProSe Remote UE ID or the ProSe UE ID included in the ProSe registration response.

The UE_B 9 may also receive, from the ProSe function unit_A 7, a timer corresponding to the service and indicating a period of time during which the authentication of the service is valid. The UE_B 9 may start counting in a case of receiving the timer. Furthermore, in a case where the counting is ended, the service authentication request may be transmitted again to the ProSe function unit_A 7. Alternatively, the service authentication request may be transmitted based on the request from the network during the counting of the timer.

1.3.2 Discovery Request Procedure

An authentication procedure in which respective pieces of UE (Relay UE and Remote UE) start a Discovery procedure by announcing or monitoring will be described next.

The respective pieces of UE may start the following procedure on the assumption that the stated pieces of UE have succeeded in obtaining service authentication in an attach procedure.

1.3.2.1 Announcing Request Procedure

First, a procedure in which the UE_A 8 requests announcing will be described. The "announcing" refers to an action in which a terminal notifies another terminal positioned in close proximity of the presence of the terminal itself.

Figure 14:
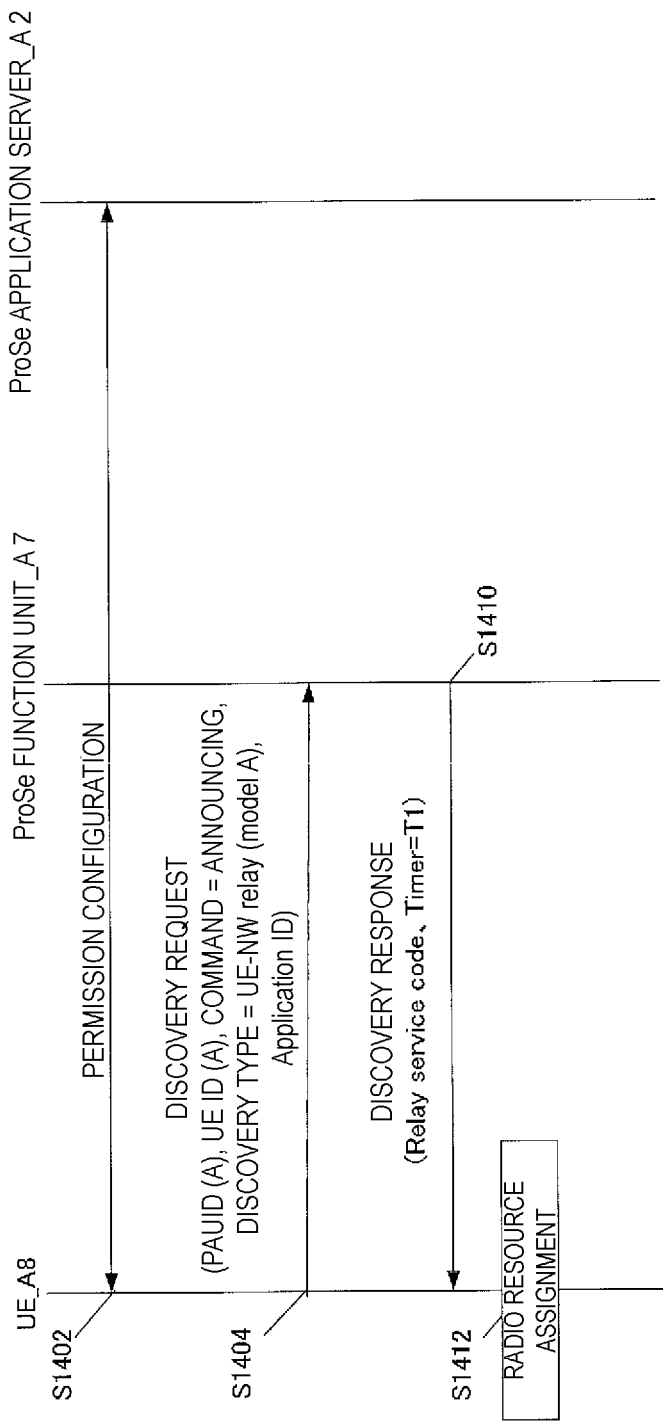
FIG. 14 is a diagram illustrating an announcing request procedure.

Hereinafter, a procedure in which the UE_A 8 performs announcing will be described with reference to FIG. 14.

The UE_A 8 configures permission information of the Relay UE function with the ProSe application server_A 2 (S1402).

In the permission information configuration of the Relay UE function, the UE_A 8 notifies the ProSe application server of information including the ProSe Relay UE ID assigned by the ProSe function unit.

The ProSe application server_A 8, based on receiving the ProSe Relay UE ID, assigns the ProSe Application User ID to the user ID in the application layer.

Note that the ProSe Application User ID assigned to the UE_A 8 by the ProSe application server_A 2 may be a Restricted ProSe Application User ID for restricted discovery.

Note that the restricted discovery refers to a procedure in which proximity terminal detection is performed with definite permission from UE to be detected.

The ProSe application server_A 2 notifies the UE_A 8 of the ProSe Application User ID assigned to the UE_A 8. Note that the permission information configuration may be performed before the service authentication procedure or may be performed after that.

Next, the UE_A 8 transmits a discovery request to the ProSe function unit_A 7 (S1404). The discovery request may be a discovery request message with which the UE_A 8 requests to start the announcing procedure. Here, the transmission of the discovery request by the UE_A 8 may be performed under the condition that the service authentication procedure has been completed. More specifically, the transmission may be performed under the condition that the UE_A 8 has been authenticated to perform announcing by the ProSe function unit_A 7 of a Home PLMN which is a network operator to make a contract with. In addition, the transmission may be performed under the condition that the UE_A 8, in a case of the completion of the authentication, obtains the authentication information from the ProSe function unit_A 7 and stores the stated authentication information.

The discovery request may include the ProSe Application User ID, UE ID, a command indicating the announcing, a discovery type indicating that the discovery is aimed to achieve a UE-to-NW Relay service, and an Application ID.

Note that the ProSe Application User ID is information reported from the ProSe application server_A 2 in the permission configuration procedure.

UE ID is identification information of the UE_A 8, and may be, for example, IMSI. Alternatively, UE ID may be the ME Identity.

The information indicating the request of announcing may be requested, not only by an identifying method by the command, but also by transmitting an announcing request message while defining the announcing request message and the like. To be more specific, a message type requesting the announcing may be defined, and the request message including the message type may be transmitted.

The discovery type may be information indicating that the requested Discovery procedure is aimed to achieve the UE-to-NW Relay service and further indicating that it is the discovery made by announcing and monitoring (Model A).

Note that the command and/or the discovery type may be capability information indicating that the UE_A 8 has a relay function for a proximity terminal device and the network. Alternatively, separate from the above-discussed information, the UE_A 8 may indicate the inclusion of the relay function for a proximity terminal device and the network.

Note that the UE_A 8 may transmit the discovery request including multiple combinations of discovery types and Application IDs.

Specifically, the UE_A 8 may transmit the discovery request including a combination of an Application ID A and a discovery type of "UE-to-NW Relay", and a combination of an Application ID B and "restricted discovery".

Furthermore, the ProSe function unit_A 7 as a transmission destination of the discovery request may store, in advance, information on the ProSe function unit_A 7 of a Home PLMN as a network operator with which the UE_A 8 makes a contract, and the ProSe function unit_A 7 of the Home PLMN may be set as the transmission destination.

The UE_A 8 may include APN in the discovery request. APN indicates the network to which the UE_A 8 requests access.

The ProSe function unit_A 7 confirms whether the UE_A 8 is allowed to use a UE-to-NW Relay announcing function, based on the Application ID or UE ID.

Furthermore, the ProSe function unit_A 7 confirms whether the UE_A 8 has already been assigned a Relay Service Code and a timer.

The ProSe function unit_A 7 may transmit a discovery request to the application server_A 2 based on a network policy or an operator policy.

In this case, the ProSe function unit_A 7 may transmit the discovery request including the ProSe Application User ID and the discovery type.

The ProSe application server_A 2, based on receiving the discovery request from the ProSe function unit_A 7, confirms the permission information by the permission info of the user identified by the ProSe Application User ID or the like.

When the ProSe application server_A 2 confirms the permission information, the ProSe application server_A 2 may transmit a discovery response, as a response to the discovery request, to the ProSe function unit_A 7. The discovery response may be a Response message to the discovery request. The discovery response may include the ProSe Application User ID that is allowed to use the service. Furthermore, the discovery response may include identification information indicating that the service is allowed to be used.

The ProSe function unit_A 7 assigns a Relay Service Code and a timer to the UE_A 8, based on the discovery response from the ProSe application server_A 2 or the service permission by the ProSe function unit_A 7.

The Relay Service Code is identification information corresponding to the UE-to-NW Relay service. Furthermore, the Relay Service Code may be temporary identification information which is assigned to the service by the ProSe function unit_A 7.

Furthermore, the timer is made to correspond to the Relay Service Code, and is a timer configured to indicate a period of time during which the Relay Service Code is valid. That is, the announcing using the Relay Service Code is permitted until the counting of the timer is ended.

Note that, in a case where the discovery type included in the discovery request is only "UE-to-NW Relay", the ProSe function unit_A 7 may further assign a ProSe Restricted Code (ProSe Restricted Code A) corresponding to the same Application ID to the UE_A 8 based on the operator policy or network policy. Moreover, the ProSe function unit_A 7 may also assign a timer corresponding to the ProSe Restricted Code and indicating a period of time during which the ProSe Restricted Code is valid.

Note that the ProSe Restricted Code is a code used by the ProSe function unit for a ProSe restricted Discovery service, and may correspond to one or multiple ProSe Application User IDs.

The ProSe Restricted Discovery service is a service of detection supported by a terminal device based on explicit permission from the detected terminal device. For example, the service is such that UE having the monitoring function obtains the ProSe Restricted Code from proximity UE having the announcing function so as to confirm the explicit detection permission, and receives the announcing including the ProSe Restricted Code, thereby detecting the proximity UE.

Accordingly, the ProSe Restricted Code A is a code assigned to the ProSe Application User ID of the user of the UE_A 8.

Note that a timer value corresponding to the ProSe Restricted Code and indicating a period of time during which the ProSe Restricted Code is valid and a timer value corresponding to the Relay Service Code and indicating a period of time during which the Relay Service Code is valid may be different from each other or may be the same.

In a case where a combination of the Application IDA and the discovery type of "UE-to-NW Relay" and a combination of the Application 1D B and "restricted discovery" are included in the discovery request, the ProSe function unit_A 7 may further assign the ProSe Restricted Code (ProSe Restricted Code B) to the UE_A 8. Moreover, the ProSe function unit_A 7 may also assign a timer corresponding to the ProSe Restricted Code and indicating a period of time during which the ProSe Restricted Code is valid.

Note that the ProSe Restricted Code B is a code assigned to the ProSe Application User ID of the user of the UE_A 8.

The ProSe Restricted Code (ProSe Restricted Code B) assigned to the UE_A 8 by the ProSe function unit_A 7 in response to the discovery request from the UE_A 8 and the ProSe Restricted Code (ProSe Restricted Code A) assigned to the UE_A 8 not based on the discovery request from the UE_A 8, may be the same or may be different from each other.

Furthermore, the timer corresponding to the ProSe Restricted Code B and the timer corresponding to the ProSe Restricted Code A may be the same or may be different from each other.

Based on the service permission and the Relay Service Code configuration, the ProSe function unit_A 7 transmits a discovery response to the UE_A 8 (S1410).

A Relay Service Code and a timer corresponding to the code may be included in the discovery response.

In addition, in the case where the ProSe function unit_A 7 assigns the ProSe Restricted Code to the UE_A 8, the ProSe function unit_A 7 may include the ProSe Restricted Code and a timer corresponding to the ProSe Restricted Code in the discovery response.

In other words, the ProSe function unit_A 7 transmits, to the UE_A 8, the discovery response including a Relay Service Code "C1" and a timer "T1" corresponding to "C1".

Furthermore, the ProSe function unit_A 7 may transmit the discovery response including a ProSe Restricted Code "Cr1" corresponding to the same Application ID as the Application ID corresponding to the Relay Service Code "C1" and a timer "Tr1" corresponding to "Cr1".

Furthermore, the ProSe function unit_A 7 may transmit the discovery response including a ProSe Restricted Code "Cr2" corresponding to a different Application ID from the Application ID corresponding to the Relay Service Code "C1" and a timer "Tr2" corresponding to "Cr2".

The timers "T1", "Tr1", and "Tr2" may have the same value or may have different values.

Next, the UE_A 8 receives the discovery response. Furthermore, the UE_A 8 may obtain the ProSe Relay Service Code and a value of the timer.

In addition, the UE_A 8 may obtain, in a case of receiving the discovery response, the ProSe Restricted Code and the timer corresponding to the ProSe Restricted Code.

Furthermore, the UE_A 8 determines whether the announcing is permitted based on the information included in the discovery response.

In a case where the announcing is permitted, the UE_A 8 may assign radio resources (S1412) and transmit a signal including the obtained ProSe Relay Service Code to its proximity. Radio resource information such as frequency and time may be obtained from the ProSe function unit_A 7, or the resources for the announcing may be stored in advance and then assigned.

In addition, the UE_A 8 may start counting of the timer based on receiving the discovery response. The UE_A 8 may transmit a signal for the announcing until the timer expires. The announcing is stopped in a case that the timer is ended (the timer expires) like a case in which the value of the timer becomes zero. Note that the signal for the announcing may be transmitted while including the ProSe Relay Service Code. Furthermore, the signal for the announcing may be transmitted while including UE ID and/or the ProSe Relay UE ID. Furthermore, the signal for the announcing may include information for identifying communication capability such as communication capacity of the PDN connection provided to Remote UE by the UE_A 8.

In a case where the UE_A 8 is notified that the authentication is unsuccessful in the discovery response, the UE_A 8 does not perform assigning of the radio resources or announcing.

Through the above-discussed procedure, the UE_A 8 can perform the authentication procedure for performing the announcing.

1.3.2.2 Monitoring Request Procedure

A procedure in which the UE_B 9 requests monitoring will be described next. The "monitoring" refers to an action in which a terminal notifies another terminal positioned in close proximity of the presence of the terminal itself.

The UE_B 9, in a case where the UE_B 9 has connectivity to a base station, may beforehand perform a monitoring request procedure described below, and may obtain authentication for the monitoring from a server device.

Figure 15:
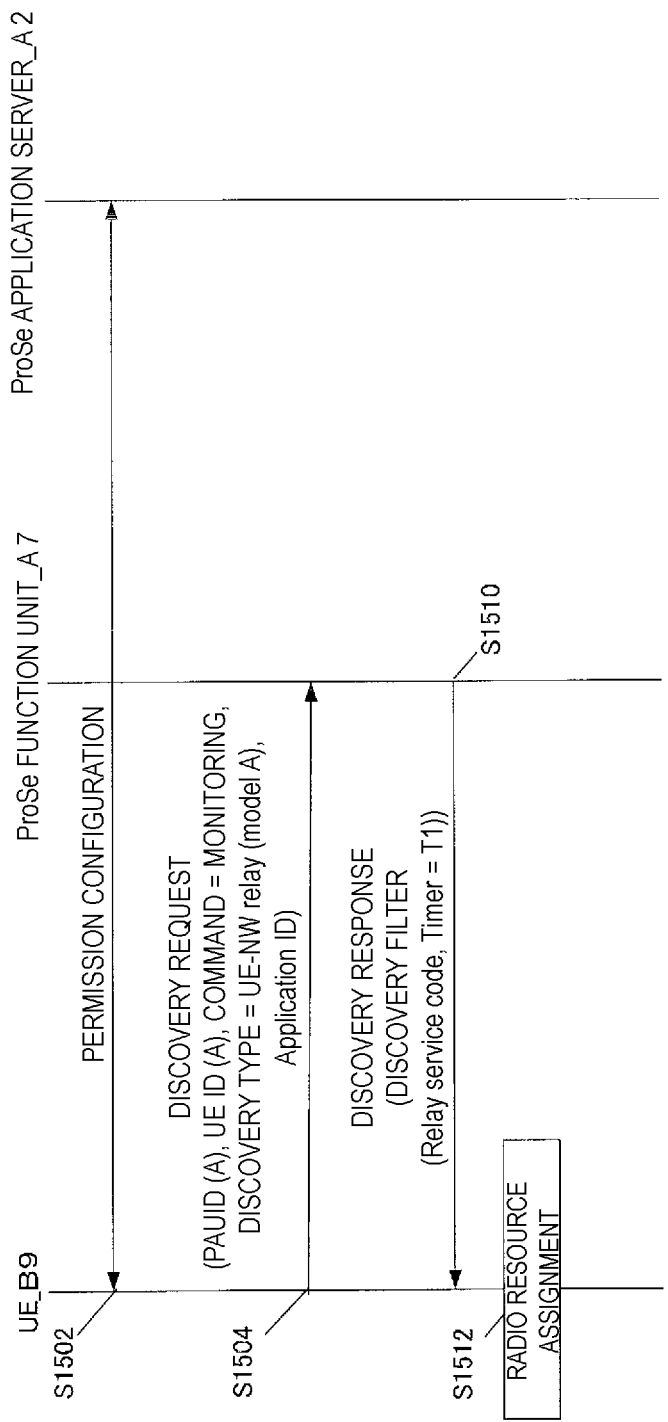
FIG. 15 is a diagram illustrating a monitoring request procedure.

Hereinafter, a procedure in which the UE_B 9 performs monitoring will be described with reference to FIG. 15.

The UE_B 9 configures permission information of the Remote UE function with ProSe application server_A 2 (S1502).

In the permission information configuration of the Remote UE function, the UE_B 9 may notify the ProSe application server_A 2 of information including the ProSe Remote UE ID or the ProSe UE ID assigned by the ProSe function unit_A 7.

The ProSe application server_A 2, based on receiving the ProSe Remote UE ID or the ProSe UE ID, may assign the ProSe Application User ID to the user ID in the application layer.

Note that the ProSe Application User ID assigned to the UE_A 8 by the ProSe application server_A 2 may be a Restricted ProSe Application User ID for restricted discovery.

The ProSe application server_A 2 notifies the UE_B 9 of the ProSe Application User ID assigned to the UE_B 9.

Furthermore, in the permission configuration procedure, the UE_B 9 may obtain the ProSe Application User ID of UE on which the monitoring can be performed. Specifically, the ProSe Application User ID of the UE_A 8 may be obtained.

Note that the permission information configuration may be performed before the service authentication procedure or may be performed after that.

Next, the UE_B 9 transmits a discovery request to the ProSe function unit_A 7 (S1504). The discovery request may be a discovery request message with which the UE_B 9 requests to start the monitoring procedure. Here, the transmission of the discovery request by the UE_B 9 may be performed under the condition that the service authentication procedure has been completed. More specifically, the transmission may be performed under the condition that the UE_B 9 has been authenticated to perform announcing by the ProSe function unit_A 7 of a Home PLMN which is a network operator to make a contract with. In addition, the transmission may be performed under the condition that the UE_B 9, in a case of the completion of the authentication, obtains the authentication information from the ProSe function unit_A 7 and stores the stated authentication information.

The discovery request may include the ProSe Application User ID, UE ID, a command indicating the monitoring, a discovery type indicating that the discovery is aimed to achieve a UE-to-NW Relay service, and an Application ID.

Note that the ProSe Application User ID is information reported from the ProSe application server_A 2 in the permission configuration procedure.

UE ID is identification information of the UE_B 9, and may be, for example, IMSI. Alternatively, UE ID may be the ME Identity.

The information indicating the request of monitoring may be requested, not only by an identifying method by the command, but also by transmitting a monitoring request message while defining the monitoring request message and the like. To be more specific, a message type requesting the monitoring is defined, and the request message including the message type may be transmitted.

The discovery type may be information indicating that the requested Discovery procedure is aimed to achieve the UE-to-NW Relay service and further indicating that it is the discovery made by announcing and monitoring (Model A).

Note that the command and/or the discovery type may be capability information indicating that the UE_B 9 has a relay function for a proximity terminal device and the network. Alternatively, separate from the above-discussed information, the UE_B 9 may indicate the inclusion of the relay function for a proximity terminal device and the network.

Note that the UE_B 9 may transmit the discovery request including multiple combinations of discovery types and the Application IDs.

Specifically, the UE_B 9 may transmit the discovery request including a combination of the Application ID A and the discovery type of "UE-to-NW Relay", and a combination of the Application ID B and "restricted discovery".

Furthermore, the ProSe function unit_A 7 as a transmission destination of the discovery request may store, in advance, information on the ProSe function unit_A 7 of a Home PLMN as a network operator with which the UE_B 9 makes a contract, and the ProSe function unit_A 7 of the Home PLMN may be set as the transmission destination.

The UE_B 9 may include APN in the discovery request. APN indicates the network to which the UE_A 8 requests access.

Furthermore, the UE_B 9 may include, in the discovery request, the ProSe Application User ID of UE on which the monitoring is requested to be performed. For example, the UE_B 9 may indicate the intention of detecting the UE_A 8 by including, in the discovery request, the ProSe Application User ID of the UE_A 8. Note that, the UE_B 9 may include, in the discovery request, multiple ProSe Application User IDs.

The ProSe function unit_A 7 confirms whether the UE_B 9 is allowed to use a UE-to-NW Relay monitoring function, based on the Application ID or UE ID.

Furthermore, the ProSe function unit_A 7 confirms whether the UE_B 9 has already been assigned a Relay Service Code and a timer.

The ProSe function unit_A 7 may transmit a discovery request to the application server_A 2 based on a network policy or an operator policy.

In this case, the ProSe function unit_A 7 may transmit the discovery request including the ProSe Application User ID of the UE_B 9 and the discovery type.

Note that, in a case where the ProSe Application User ID of UE on which the monitoring needs to be performed is included in the received discovery request message, the ProSe function unit_A 7 may transmit, to the ProSe application server_A 2, the discovery request including the ProSe Application User ID of the UE on which the monitoring needed to be performed.

The ProSe application server_A 2, based on receiving the discovery request from the ProSe function unit_A 7, confirms the permission information of the user identified by the ProSe Application User ID.

When the ProSe application server_A 2 confirms the permission information, the ProSe application server_A 2 may transmit a discovery response, as a response to the discovery request, to the ProSe function unit_A 7. The discovery response may include the ProSe Application User ID that is allowed to use the service. Furthermore, the discovery response may include identification information indicating that the service is allowed to be used.

Furthermore, in a case where a list of the ProSe Application User IDs of UE which the UE_B 9 wants to monitor has been obtained, the ProSe application server_A 2 may transmit the discovery response including the ProSe Relay UE ID corresponding to the ProSe Application User ID.

The ProSe function unit_A 7 assigns a Relay Service Code and a timer to the UE_B 9, based on the discovery response from the ProSe application server_A 2 or the service permission by the ProSe function unit_A 7.

The Relay Service Code is identification information corresponding to the UE-to-NW Relay service. Furthermore, the Relay Service Code may be temporary identification information which is assigned to the service by the ProSe function unit_A 7. In addition, the Relay Service Code may be the same as the value assigned to the UE_A 8.

The ProSe function unit_A 7 may assign a Relay Service Code based on the ProSe Relay UE ID reported from the ProSe application server_A 2. Specifically, in a case where the ProSe Relay UE ID of the UE_A 8 is reported from the ProSe application server_A 2, the Relay Service Code assigned to the UE_A 8 in a storage unit may be assigned to the UE_B 9 as well.

Furthermore, the timer is made to correspond to the Relay Service Code, and is a timer configured to indicate a period of time during which the Relay Service Code is valid. That is, the announcing using the Relay Service Code is permitted until the counting of the timer is ended.

Furthermore, the ProSe function unit_A 7 may assign, to the UE_B 9, multiple combinations of Relay Service Codes and timers.

Note that, in the case where the discovery type included in the discovery request is only "UE-to-NW Relay", the ProSe function unit_A 7 may further assign a ProSe Restricted Code (ProSe Restricted Code A) corresponding to the same Application ID to the UE_B 9 based on the operator policy or network policy. Moreover, the ProSe function unit_A 7 may also assign a timer corresponding to the ProSe Restricted Code and indicating a period of time during which the ProSe Restricted Code is valid.

Note that a timer value corresponding to the ProSe Restricted Code and indicating a period of time during which the ProSe Restricted Code is valid and a timer value corresponding to the Relay Service Code and indicating a period of time during which the Relay Service Code is valid may be different from each other or may be the same. A timer corresponding to the ProSe Restricted Code and indicating a period of time during which the ProSe Restricted Code is valid, may also be a timer corresponding to the Relay Service Code and indicating a period of time during which the Relay Service Code is valid. That is, the timer may be a timer corresponding to the ProSe Restricted Code and the Relay Service Code.

In the case where a combination of the Application ID A and the discovery type of "UE-to-NW Relay" and a combination of the Application ID B and "restricted discovery" are included in the discovery request, the ProSe function unit_A 7 may further assign the ProSe Restricted Code (ProSe Restricted Code B) to the UE_B 9. Moreover, the ProSe function unit_A 7 may also assign a timer corresponding to the ProSe Restricted Code and indicating a period of time during which the ProSe Restricted Code is valid.

The ProSe Restricted Code (ProSe Restricted Code B) assigned to the UE_B 9 by the ProSe function unit_A 7 in response to the discovery request from the UE_B 9 and the ProSe Restricted Code (ProSe Restricted Code A) assigned to the UE_B 9 not based on the discovery request from the UE_B 9, may be the same or may be different from each other.

Furthermore, the timer value corresponding to the ProSe Restricted Code B and the timer value corresponding to the ProSe Restricted Code A may be the same or may be different from each other.

Moreover, in a case where multiple ProSe Restricted Codes assigned to the UE_B 9 by the ProSe function unit_A 7 are the same, the timer values may also be the same.

Based on the service permission and the Relay Service Code configuration, the ProSe function unit_A 7 transmits a discovery response to the UE_B 9 (S1510). The discovery response may be a Response message to the discovery request. The discovery response may include a discovery filter.

The discovery filter may include the Relay Service Code and a timer corresponding to the Relay Service Code and indicating a period of time during which the Relay Service Code is valid.

In addition, in the case where the ProSe function unit_A 7 assigns the ProSe Restricted Code to the UE_B 9, the ProSe function unit_A 7 may add a combination of the ProSe Restricted Code and a timer corresponding to the ProSe Restricted Code to the discovery response and the discovery filter.

In other words, the ProSe function unit_A 7 transmits, to the UE_B 9, the discovery filter including the Relay Service Code "C1" and the timer "T1" corresponding to "C1".

Furthermore, the ProSe function unit_A 7 may transmit the discovery filter including the ProSe Restricted Code "Cr1" corresponding to the same Application ID as the Application ID corresponding to the Relay Service Code "C1" and the timer "Tr1" corresponding to "Cr1". Cr1 may be C1, and furthermore Tr1 may be T1. In this case, it is sufficient for the ProSe function unit_A 7 to transmit the discovery filter including "C1" and "T1".

Furthermore, the ProSe function unit_A 7 may transmit the discovery filter including the ProSe Restricted Code "Cr2" corresponding to a different Application ID from the Application ID corresponding to the Relay Service Code "C1" and the timer "Tr2" corresponding to "Cr2".

The timers "T1", "Tr1", and "Tr2" may have the same value or may have different values. In the case where these timer values have the same value, it is sufficient for the ProSe function unit_A 7 to include "T1" in the discovery filter.

Combinations of these codes and timers may be included in mutually different discovery filters or included in a single discovery filter.

In other words, the ProSe function unit_A 7 may transmit the discovery response including multiple discovery filters.

Next, the UE_B 9 receives the discovery response. Furthermore, the UE_B 9 may obtain the ProSe Relay Service Code and a value of the timer.

In addition, the UE_A 8 may obtain, in a case of receiving the discovery response, the ProSe Restricted Code and the timer corresponding to the ProSe Restricted Code.

Furthermore, the UE_A 8 determines whether the monitoring is permitted based on the information included in the discovery response.

In a case where the monitoring is permitted, radio resources are assigned (S1512) and the monitoring is performed on the announcing signal transmitted by the proximity terminal device using the obtained discovery filter. The radio resource information such as frequency and time may be obtained from the ProSe function unit_A 7, or the resources for the monitoring may be stored in advance and then assigned.

The UE_B 9 may start counting of the timer based on receiving the discovery response. The UE_A 8 may perform the monitoring until the timer expires. The monitoring is stopped in a case that the timer is ended (the timer expires) like a case in which the timer value becomes zero. Note that the Relay Service Code may be included in a signal being monitored. Furthermore, the signal being monitored may include UE ID and/or the ProSe Relay UE ID. Furthermore, the signal for the monitoring may include the information for identifying communication capability such as communication capacity of the PDN connection provided to the Remote UE by the proximity Relay UE.

In a case where the ProSe function unit_A 7 notifies the UE_B 9 that the authentication is unsuccessful in the discovery response, the UE_B 9 does not perform assigning of the radio resources or announcing.

Through the above-discussed procedure, the UE_B 9 can perform the authentication procedure for performing the monitoring.

Note that, in a case where the UE_B 9 is positioned outside the coverage, the UE_B 9 may perform the monitoring request procedure through another procedure.

For example, the UE_B 9 outside the coverage and the UE_A 8 inside the coverage may store a freely-selected code for the monitoring service in advance, the UE_A 8 may perform, based on the freely-selected code, the monitoring authentication in accordance with the service authentication and/or the permission configuration and/or the discovery request of the UE_B 9.

A specific example in which the UE_B 9 outside the coverage transmits a monitoring request will be described below. The UE_B 9 outside the coverage has a Monitoring Service Code for the monitoring in advance as discussed above, and the UE_B 9 broadcasts a discovery request including the Monitoring Service code.

The UE_B 9 may include, in the discovery request, the ProSe Application User ID, UE ID, a command indicating the monitoring, a discovery type indicating that the discovery is aimed to achieve the UE-to-NW Relay service, and the Application ID.

The discovery type may be information indicating that the requested Discovery procedure is aimed to achieve the UE-to-NW Relay service and further indicating that it is the discovery made by announcing and monitoring (Model A).

In addition, the discovery request may include identification information indicating a request to transfer the discovery request. Alternatively, in a case where the Monitoring Service Code is included in the discovery request, the UE_B 9 may request the transfer of the discovery request.

The UE_A 8 having received the discovery request transmitted by the UE_B 9 may transfer, to the ProSe function unit_A 7, the discovery request having received from the UE_B 9 based on the Monitoring Service Code included in the discovery request, Note that the UE_A 8, before the transfer of the discovery request, may perform service authentication on the ProSe function unit_A 7 and permission configuration on the ProSe application.

The ProSe function unit_A 7 confirms whether the UE_B 9 is allowed to use the UE-to-NW Relay monitoring function, based on the discovery request received from the UE_A 8, the Application ID, or UE ID having been obtained.

Furthermore, the ProSe function unit_A 7 confirms whether the UE_B 9 has already been assigned a Relay Service Code and a timer.

The ProSe function unit_A 7 may transmit a discovery request to the application server_A 2 based on a network policy or an operator policy.

Because the discovery request procedure to the application server_A is similar to that discussed above, the description thereof is omitted herein.

The ProSe function unit_A 7 further assigns the Relay Service Code and a timer to the UE_B 9, based on the monitoring procedure authentication of the UE_B 9. Moreover, like in a case of the UE_B 9 being inside the coverage, the ProSe function unit_A 7 may assign the ProSe Restricted Code and a timer to the UE_B 9.

Because a method for assigning the Codes and timers is also similar to the method in the case of the UE_B 9 being inside the coverage, the detailed description thereof is omitted herein.

Based on the monitoring procedure authentication and the Relay Service Code assignment for the UE_B 9, the ProSe function unit_A 7 transmits a discovery response to the UE_B 9 via the UE_A 8.

The ProSe function unit_A 7 may transmit the discovery response including the discovery filter.

The discovery filter may include the Relay Service Code and a timer corresponding to the Relay Service Code and indicating a period of time during which the Relay Service Code is valid.

As discussed above, the UE_B 9 may obtain the Relay Service Code and the timer used for the monitoring by transmitting the discovery request even in the case of the UE_B 9 being outside the coverage.

1.3.2.3 Procedure of Direct Communication Path Establishment and Relay Connection Establishment Hereinafter, described is a procedure in which, after the completion of the announcing request and monitoring request discussed in 1.3.2.1 and 1.3.2.2, Remote UE detects Relay UE, establishes a direct communication path of ProSe, and connects to the network using a relay.

The UE_B 9, when positioned outside the coverage, detects proximity Relay UE using the monitoring. As such, the UE_B 9 stores one or multiple Relay Service Codes in advance through the monitoring request procedure of 1.3.2.2 before performing the Discovery procedure, and monitors the announcing signal transmitted from the proximity terminal.

The UE_B 9 monitors the announcing signal, transmitted by the UE_A 8, including the Relay Service Code. Furthermore, the UE_A 8 may transmit the announcing signal including the ProSe Relay UE ID, information on a user of the UE_A 8, or a state of the physical layer.

The state of the physical layer may refer to transmission speed, communication capacity, or the like which the UE_A 8 can provide to the Remote UE by the relay service.

Furthermore, the UE_A 8 may transmit the announcing signal including position information of the UE_A 8.

In a case where the Relay Service Code stored in the UE_B 9 is the same as the Relay Service Code transmitted from the UE_A 8, the UE_B 9 can detect the UE_A 8.

At this time, the UE_B 9 may detect multiple pieces of Relay UE. In the case where the UE_B 9 detects the multiple pieces of Relay UE, the UE_B 9 may select the Relay UE in consideration of remaining time of the timer corresponding to the Relay Service Code, Relay UE capability, or Relay UE position information.

In a case where the UE_B 9 selects the UE_A 8 as Relay UE, or in a case where the announcing signal is received only from the UE_A 8, the UE_B 9 establishes direct communication with the UE_A 8.

Specifically, the UE_B 9 transmits a direct-communication establishment request message to the UE_A 8. The UE_B 9 may transmit the direct-communication establishment request including the ProSe Relay UE ID of the UE_A 8.

The UE_A 8, in a case of receiving the request message from the UE_B 9, authenticates the UE_B 9 and establishes the direct communication connection.

The UE_B 9, after the establishment of the direct communication path with the UE_A 8, requests the UE_A 8 to assign an IP address. When the UE_B 9 requests IPv6, the UE_B 9 transmits a Router Solicitation message (RS signal) to the UE_A 8. The UE_A 8, in a case of receiving the RS signal, may configure, for the UE_B 9, an IP address to be assigned to the UE_B 9 from IPv6 prefix.

The UE_A 8 transmits a Router Advertisement message (RA signal) to the UE_B 9. The assigned IP address is included in the RA signal.

Alternatively, when the UE_B 9 requests the assignment of IPv4, the UE_B 9 transmits a DHCPv4 discover to the UE_A 8. The UE_A 8, based on receiving the detection message, selects an IP address from the pooled IP addresses and assigns the IP address to the UE_B 9. Furthermore, the UE_A 8 transmits a DHCPv4 offer message to the UE_B 9. The UE_A 8 includes the IP address assigned to the UE_B 9 in the DHCPv4 offer.

The UE_B 9 having received the DHCP offer from the UE_A 8 transmits a DHSCP request including the received IP address.

The UE_A 8 having received the DHCP request from the UE_B 9 replies DHCP Ack as a response.

As discussed above, the IP address of IPv6 or IPv4 is assigned to the UE_B 9, and connection to the PDN connection is provided to the UE_B 9.

1.3.3 Relay Service Code Update Procedure

Next, a Relay Service Code update procedure will be described below. The Relay Service Code needs to be regularly updated from the standpoint of security.

1.3.3 1 Relay Service Code Update Procedure of Relay UE

Hereinafter, an update procedure of the Relay Service Code stored in the UE_A 8 as Relay UE will be described.

The UE_A 8 can update the Relay Service Code in accordance with notification from the ProSe function unit_A 7, and continue the announcing.

In the following description, the UE_A 8 that has obtained a Relay Service Code and a timer and has started counting of the timer for a connection service using the UE-to-NW Relay function, obtains a new ProSe Relay Service Code and a timer for the same connection service such as a connection service for an application identified by the same Application ID and makes the old Relay Service Code and timer invalid so as to use the new ProSe Relay Service code and timer.

An initial state of the present procedure may be a state in which the announcing request procedure discussed in 1.3.2.1 has been completed.

In other words, by the announcing request procedure as discussed in 1.3.2.1, the UE_A 8 may be in a state in which the UE_A 8 has obtained "C1" as the Relay Service Code and "T1" as the timer from the ProSe function unit_A 7.

Figure 16:
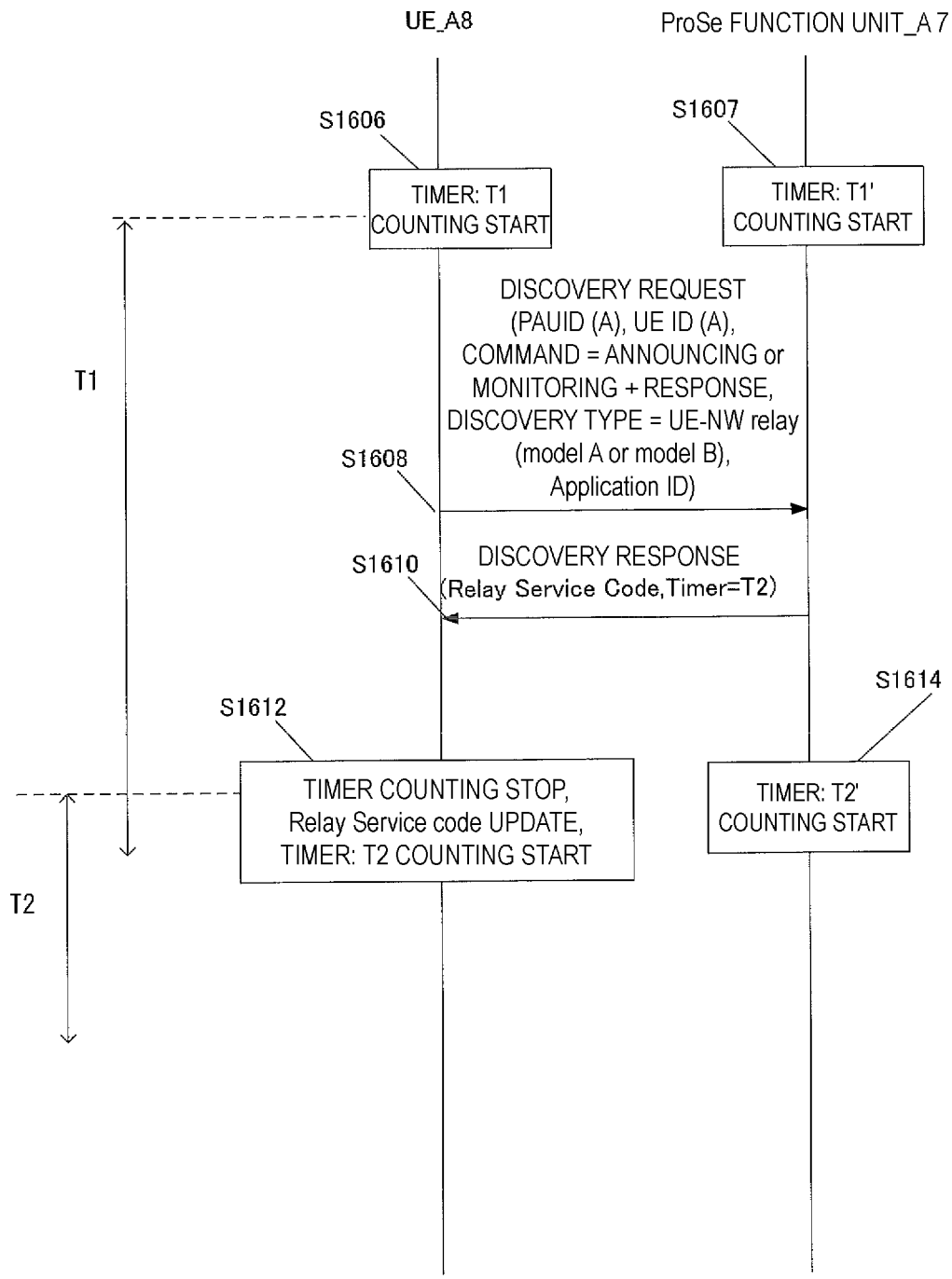
FIG. 16 is a diagram illustrating a Relay Service Code update procedure.

A detailed description will be given below with reference to FIG. 16. First, UE_A 8 starts counting of the timer "T1" based on the announcing request procedure or the reception of the discovery response, and makes the Relay Server Code "C1" valid (S1606). In addition, the ProSe function unit_A 7 starts counting of a timer "T1" corresponding to the timer "T1" after the transmission of the discovery response, and makes the Relay Server Code "C1" valid (S1607).

As discussed in the announcing procedure of 1.3.2.1, the UE_A 8 may transmit the announcing signal to perform the announcing during the counting of the timer "T1" being executed.

The UE_A 8 may request the Relay Service Code and a timer for the same relay connection service to the ProSe function unit_A 7 during the counting of the timer "T1" being executed. To rephrase, the UE_A 8 may newly request the Relay Service Code and timer to the ProSe function unit_A 7 before the timer "T1" expires.

The above re-request by the UE_A 8 may be performed when remaining time of the timer has become short. To be more specific, the UE_A 8 may store a threshold in advance, and may perform the re-request in the case where the remaining time of the timer becomes equal to the threshold or becomes shorter than the threshold. Furthermore, a trigger of the re-request is not limited thereto; the re-request may be performed under another condition, or may be performed at a freely-selected timing.

The UE_A 8 may transmit a discovery request to the ProSe function unit_A 7 in order to re-request the Relay Service Code and a timer for the same relay connection service (S1608).

The discovery request may be a discovery request message requesting the announcing. The discovery request message for the announcing may be the discovery request message transmitted by the UE_A 8 as discussed in the announcing request procedure of 1.3.2 (S1404). Because it is sufficient that the processing with regard to the transmission by the UE_A 8, the discovery request message configuration, information elements included in the discovery request message, and the like are similar to those discussed above, the detailed description thereof is omitted herein.

Note that, by including, in the discovery request, the same APN as APN having been included in the previous discovery request, the UE_A 8 may indicate that the request message is a message for the same service.

Next, the ProSe function unit_A 7 receives the discovery request. Furthermore, the ProSe function unit_A 7 transmits a discovery response as a Response message to the UE_A 8 (S1610). The ProSe function unit_A 7 may transmit the Response message including the Relay Service Code and the timer.

This discovery response may be a discovery response message requesting the announcing as discussed in 1.3.2.1 (S1410).

Here, a condition where the discovery response is transmitted may be such that the response is transmitted based on receiving the discovery request, or is transmitted based on the authentication. A specific method for the authentication may be performed using a method described in the announcing request procedure of 1.3.2.

Alternatively, the ProSe function unit_A 7 may update the ProSe Relay Service Code based on a network connection state or the operator policy without re-receiving the discovery request from the UE_A 8. The ProSe function unit_A 7 may notify the UE_A 8 of a notification message including the Relay Service Code updated by the ProSe function unit_A 7.

The notification message, like the discovery response, includes a timer value corresponding to the updated Relay Service Code and indicating a period of time during which the Relay Service Code is valid.

Furthermore, the Relay Service Code and the timer included in the discovery response or the notification message may include the old Relay Service Code "C1" having already been assigned and the remaining time of the timer "T1" corresponding to the old Relay Service Code "C I".

Alternatively, the Relay Service Code and the timer included in the discovery response or the notification message may include a new Relay Service Code "C2" different from the Relay Service Code "C1" and a timer "T2" corresponding to the new Relay Service Code "C2".

Here, the old Relay Service Code "C1" and the new Relay Service Code "C2" may correspond to a single application 1D.

Whether to transmit the old Relay Service Code or transmit the new Relay Service Code may be determined based on the following conditions or processing.

In a case that the remaining time of the timer T1 is short, the ProSe function unit_A 7 may transmit the information including the new Relay Service Code "C2" and the timer "T2". To be more specific, the ProSe function unit_A 7 may store a threshold in advance, and may transmit the information including the new Relay Service Code "C2" and timer "T2" in the case where the remaining time of the timer becomes equal to the threshold or becomes shorter than the threshold.

Meanwhile, in the case where the remaining time of the timer T1 is long enough, the ProSe function unit_A 7 may transmit the information including the old Relay Service Code "C1" and the remaining time of the timer "T1". To be more specific, the ProSe function unit_A 7 may store a threshold in advance, and may transmit the information including the new Relay Service Code "C1" and the remaining time of the timer "T1" in the case where the remaining time of the timer is longer than the threshold or is equal to the threshold.

Alternatively, the ProSe function unit_A 7 may determine the above in accordance with the received discovery request.

The UE_A 8 may transmit the discovery request including identification information, for example.

This identification information may be such identification information that indicates whether the UE_A 8 requests the old Relay Service Code or the new Relay Service Code.

The ProSe function unit_A 7 may transmit the information including the new Relay Service Code "C2" and timer "T2" based on the identification information. Alternatively, the ProSe function unit_A 7 may transmit the information including the old Relay Service Code "C1" and the remaining time of the timer "T1" based on the identification information.

Furthermore, the ProSe function unit_A 7 may determine the above based on the presence/absence of the identification information. That is, the identification information may be such identification information that indicates a request for a new Relay Service Code. For example, the UE_A 8 may transmit a discovery request without including identification information and request the old Relay Service Code. Alternatively, the UE_A 8 may transmit the discovery request including the identification information and request a new Relay Service Code.

Meanwhile, based on the fact that the identification information is not included in the discovery request, the ProSe function unit_A 7 may transmit the information including the old Relay Service Code "C1" and the remaining time of the timer "T1". The ProSe function unit_A 7 may transmit the information including the new Relay Service Code "C2" and the timer "T2" based on the fact that the identification information is included in the discovery request.

Alternatively, the identification information may be such identification information that indicates a request for the old Relay Service Code. For example, the UE_A 8 may transmit the discovery request without including the identification information and request a new Relay Service Code. Alternatively, the UE_A 8 may transmit the discovery request including the identification information and request the old Relay Service Code.

The ProSe function unit_A 7 may transmit the information including the new Relay Service Code "C2" and the timer "T2" based on the fact that the identification information is not included in the discovery request. Meanwhile, based on the fact that the identification information is included in the discovery request, the ProSe function unit_A 7 may transmit the information including the old Relay Service Code "C1" and the remaining time of the timer "T1".

The above-mentioned identification information may be an information element such as a flag included in the discovery request, or may be an information element indicating a message type of control message.

As discussed above, the ProSe function unit_A 7 may transmit the information including the remaining time of the timer "T1" and may synchronize the timers of multiple pieces of UE.

This discovery request may be the discovery request requesting the announcing as discussed in 1.3.2. Accordingly, the above-mentioned identification information may be included in the discovery request requesting the announcing as discussed in 1.3.2.

Whether the ProSe function unit_A 7 transmits the old Relay Service Code or the new Relay Service Code may also be determined based on the configuration of the ProSe function unit_A 7 or the like. For example, the configuration of the ProSe function unit_A 7 may be determined in accordance with a Mobile Operator Policy of a network operator running the ProSe function unit_A 7, or an application operator policy, and then the determined configuration may be performed.

Note that the configuration may be determined while combining the conditions and processing having been discussed thus far, or may be determined based on other methods.

Next, the UE_A 8 receives the discovery response. Furthermore, the UE_A 8 obtains a Relay Service Code and a timer included in the discovery response.

When the UE_A 8 obtains the new Relay Service Code "C2", the UE_A 8 may stop using the old "C1" and may start using the new Relay Service Code "C2" (S1612).

Specifically, the UE_A 8 may perform an action in which the old Relay Service Code "C1" is made invalid while the new Relay Service Code "C2" is made valid, for example.

Furthermore, the UE_A 8 may stop the counting of the timer "T1" corresponding to the old Relay Service Code "C1" and may start the counting of the timer "T2" corresponding to the new Relay Service Code "C2".

In addition, the UE_A 8 may delete the old Relay Service Code "C1" and the timer "T1" from the storage unit.

The UE_A 8 may stop transmitting the announcing signal using the old Relay Service Code "C1", and may set such a configuration in which the announcing using the Relay Service Code "C1" is not performed after the UE_A 8 has stopped the announcing using the old Code "C1".

Furthermore, the ProSe function unit_A 7, in a case of transmitting the discovery response, may stop counting of "T1" and start counting of "T2" corresponding to the timer "T2" (S1614).

The UE_A 8 may transmit the announcing signal using the new Relay Service Code "C2" until the timer "T2" corresponding to the new Relay Service Code "C2" expires.

Furthermore, the UE_A 8 may determine whether to perform the update procedure of the Relay Service Code, based on the configuration of the UE_A 8 or the like. For example, the configuration of the UE_A 8 may be determined in accordance with a user policy, a Mobile Operator Policy of a network operator running the ProSe function unit_A 7, or an application operator policy, and then the determined configuration may be performed.

Note that the configuration may be determined while combining the conditions and processing having been discussed thus far, or may be determined based on other methods.

In addition, in the case where the UE_A 8 does not perform the update procedure of the Relay Service Code, the UE_A 8 may continue the announcing using the old Relay Service Code. For example, when the UE_A 8, in a case of having received the Response message, has obtained the old Relay Service Code "C1", the UE_A 8 may continue the announcing using the old Relay Service Code "C1" until the timer "T1" being counted expires. Note that the UE_A 8 may update the timer value indicating the remaining time of the timer "T1" to the received timer value, and continue the counting.

Alternatively, in the case where the UE_A 8 does not perform the update procedure of the Relay Service Code, the UE_A 8 may stop all the announcing using the old Relay Service Code and the new Relay Service Code.

Through the above-discussed procedure, the UE_A 8 can continue the announcing corresponding to the connection service by a relay.

Note that, in the procedure of assigning the old Relay Service Code "C1" and the timer "T1", when the ProSe Restricted Code "Cr1" and the timer "Tr1" have been assigned to the same Application ID, the UE_A 8 may update the ProSe Restricted Code and the timer during the Relay Service Code update procedure. Alternatively, only the Relay Service Code and the timer may be updated.

1.3.3.2 Relay Service Code Update Procedure of Remote UE

A Relay Service Code update procedure of Remote UE will be described next. As illustrated in FIG. 1, in the case where the Remote UE has already obtained the Relay Service Code, the Remote UE may be outside the coverage.

In a case of the update of the Relay Service Code of the Relay UE, it is necessary that the Relay Service Code of the Remote UE can be updated.

Specifically, for example, when the UE_A 8 is providing a PDN connection service using a relay by ProSe direct communication to a proximity terminal, the UE_A 8 may notify the proximity terminal of the update of the Relay Service Code using the ProSe direct communication, based on the Relay Service Code and the timer having been updated.

To be specific, in the case where the UE_A 8 obtains the new Relay Service Code and the timer during providing the PDN connection by rely to the UE_B 9, the UE_A 8 may update the Relay Service Code and the timer, and notify the UE_B 9 of a notification message telling the update of the Relay Service Code over the ProSe direct communication.

The UE_A 8 may include, in the notification message, identification information for identifying that the notification message is a message telling the update of the Relay Service Code.

Alternatively, the UE_A 8 may implicitly stop, upon receiving the new Relay Service Code, providing the PDN connection to the UE_B 9.

The UE_B 9 receives the notification message from the UE_A 8. In a case of receiving the notification message from the UE_A 8 or in a case of the PDN connection service being implicitly stopped, the UE_B 9 transmits a discovery request message in order to update the Relay Service Code and/or the timer.

Because the discovery request message transmitted from the UE_B 9 is similar to the discovery request message discussed in 1.3.2.2, the detailed description thereof is omitted herein.

Like in the description of 1.3.2.2, when the UE_B 9 is present outside the coverage, the UE_A 8 as Relay UE may transfer the discovery request to the ProSe function unit_A 7.

The ProSe function unit_A 7 may assign, to the UE_B 9, a new Relay Service Code and a timer based on receiving the discovery request.

Furthermore, the ProSe function unit_A 7 may transmit a discovery response to the UE_B 9 via the UE_A 8.

The discovery response message may include a discovery filter. The discovery filter included in the discovery response message may include a new Relay Service Code and a new timer.

In a case that the UE_B 9 obtains the new discovery filter or the new Relay Service Code and the new timer, the UE_B 9 may stop the timer corresponding to the old Relay Service Code and update the Relay Service Code and the timer.

In the manner discussed above, the Relay Service Code update procedure of Remote UE may be performed. To rephrase, in a case of receiving the notification from the Relay UE and in a case of the provision of the service being stopped, the Remote UE may obtain, by re-requesting a new Relay Service Code to the ProSe function unit, the new Relay Service Code and timer, and may update the Code.

1.3.4 Modification on Relay Service Code Update Procedure

Although, in 1.3.3, an example of the procedure in which the UE_A 8 updates the Relay Service Code is described, a specific procedure is not limited to the present embodiment; it is to be noted that design, combinations, and the like within a scope that does not depart from the spirit of the present invention are also included in the present invention.

Although, in the Relay Service Code update procedure of 1.3.3, an example is described in which the UE_A 8, in a case of receiving the discovery response, stops the announcing using the old ProSe Relay Service Code, the monitoring may be continued.

To be specific, the identification information indicating a request for the Relay Service Code update procedure and included in the discovery response by the ProSe function unit_A 7, may be identification information requesting to continue the monitoring using the old Relay Service Code. At this time, the UE_A 8 may continue, in addition to the processing discussed in 1.3.3, the monitoring using the old Relay Service Code "C1" based on the identification information included in the discovery response until the timer "T1" corresponding to the old Relay Service Code "C1" expires.

The procedure in which the Remote UE obtains and updates the Relay Service Code for detecting the Relay UE using the Model A detection has been described thus far.

Moreover, the procedure in which the Remote UE, based on the detection, establishes a direct connection with the Relay UE and then establishes a PDN connection has also been described.

2. Second Embodiment

In the first embodiment, the procedure in which Relay UE transmits an announcing signal and Remote UE performs monitoring so that the Remote UE obtains and updates a Relay Service Code for detecting the proximity Relay UE (Model A) is described. Meanwhile, in the present embodiment, a method in which Relay UE monitors an announcing signal transmitted from Remote UE and replies a Response message so that the Remote UE obtains and updates the Relay Service Code for detecting the proximity Relay UE (Model B) will be described.

Hereinafter, a radio communication technology according to an embodiment of the present invention will be described in detail with reference to the drawings.

2.1 Overview of Communication System

Because it is sufficient that the overview and device configurations of the communication system are the same as those of the communication system discussed in 1.1 and 1.2, the detailed description thereof will be omitted.

2.2 Description of Processing

Hereinafter, the overview of processing described in the present embodiment will be described.

2.2.1 Service Authentication Procedure

Each of the UE_A 8 and the UE_B 9 performs an authentication procedure for proximity terminal detection (ProSe Direct Discovery) provided as a ProSe service, and communication using a direct communication path (ProSe Direct Communication).

Furthermore, the UE_A 8 performs an authentication procedure for usage of the ProSe Relay UE function as a ProSe service, and the UE_B 9 performs an authentication procedure for usage of the Remote UE function.

The proximity terminal detection and the communication using a direct communication path may each be authenticated by different procedures, or may be authenticated by a single authentication procedure. Because the service authentication procedures are the same as those of the first embodiment, the detailed description thereof will be omitted.

2.2.2 Discovery Request Procedure

An authentication procedure in which respective pieces of UE (Relay UE and Remote UE) start a Discovery procedure by Solicitation and Response will be described next.

The respective pieces of UE may start the following procedure on the assumption that the stated pieces of UE have succeeded in obtaining service authentication in an attach procedure.

Alternatively, when the Remote UE is present outside the coverage, a discovery request procedure may be started even in a case where the Remote UE is not service-authenticated.

2.2.2.1 Discovery Request Procedure of Relay UE

First, a procedure in which the UE_A 8 monitors Solicitation to be received from the UE_B 9 and requests to transmit a Response message for the Solicitation will be described.

Figure 17:
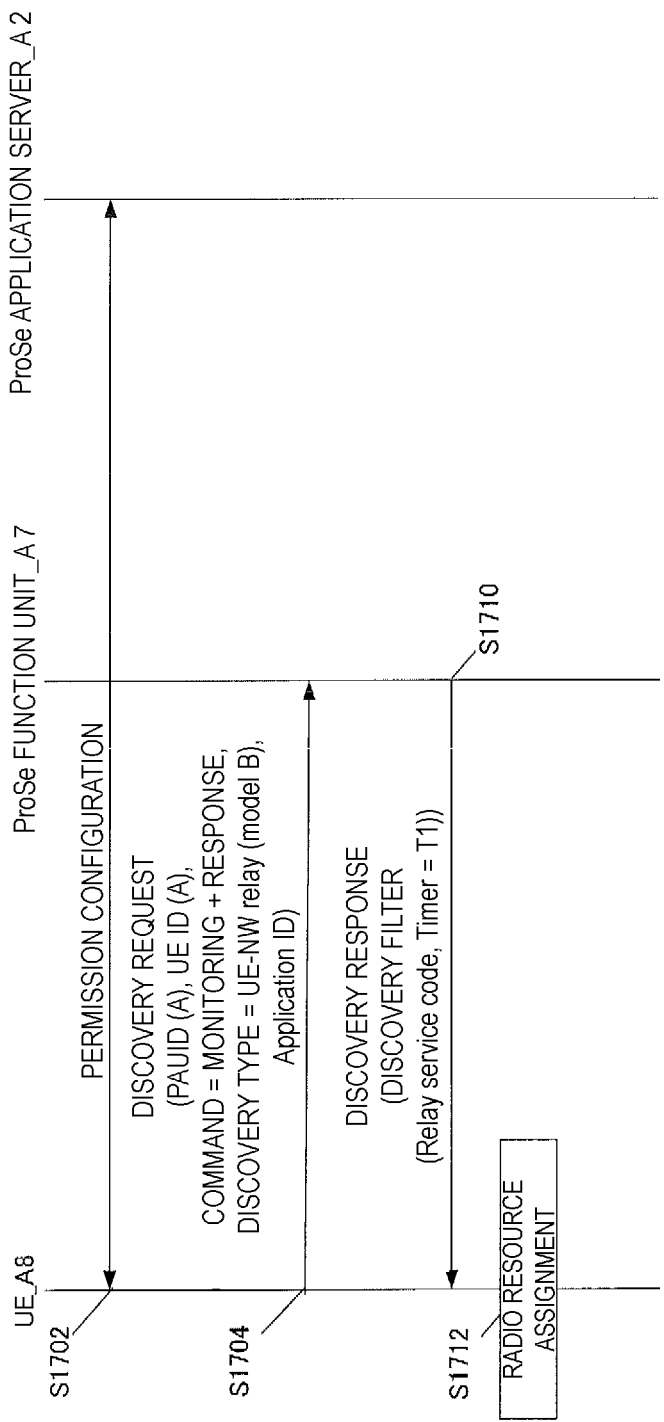
FIG. 17 is a diagram illustrating a discovery request procedure of Relay UE.

Hereinafter, a discovery request procedure in which the UE_A 8 performs monitoring and transmits a Response message will be described based on FIG. 17.

The UE_A 8 configures permission information of the Relay UE function with the ProSe application server_A 2 (S1702). Note that the permission information configuration may be performed before the service authentication procedure or may be performed after that.

In the permission information configuration of the Relay UE function, the UE_A 8 notifies the ProSe application server of information including the ProSe Relay UE ID assigned by the ProSe function unit.

The ProSe application server_A 8, based on receiving the ProSe Relay UE ID, assigns the ProSe Application User ID to the user ID in the application layer.

The ProSe Application User ID assigned to the UE_A 8 by the ProSe application server_A 2 may be a Restricted ProSe Application User ID for restricted discovery.

The restricted discovery refers to a procedure in which proximity terminal detection is performed with definite permission from UE to be detected.

The ProSe application server_A 2 notifies the UE_A 8 of the ProSe Application User ID assigned to the UE_A 8.

The UE_A 8 obtains the ProSe Application User ID from the ProSe application server_A 2.

Next, the UE_A 8 transmits a discovery request to the ProSe function unit_A 7 (S1704). The discovery request may be a discovery request message with which the UE_A 8 requests to perform monitoring and start a transmission procedure of a Response message based on the monitoring. Here, the transmission of the discovery request by the UE_A 8 may be performed under the condition that the service authentication procedure has been completed. More specifically, the transmission may be performed under the condition that the UE_A 8 has been authenticated to perform monitoring by the ProSe function unit_A 7 of a Home PLMN which is a network operator to make a contract with. In addition, the transmission may be performed under the condition that the UE_A 8, in a case of the completion of the authentication, obtains the authentication information from the ProSe function unit_A 7 and stores the stated authentication information.

The discovery request may include the ProSe Application User ID, UE ID, a command indicating the monitoring and the Response message transmission (e.g. "monitoring+Response"), a discovery type indicating that the discovery is aimed to achieve a UE-to-NW Relay service, and an Application ID.

Note that the ProSe Application User ID is information reported from the ProSe application server_A 2 in the permission configuration procedure.

UE ID is identification information of the UE_A 8, and may be, for example, IMSI. Alternatively, UE ID may be the ME Identity.

The information indicating the request for the monitoring and the Response message transmission may be requested, not only by an identifying method by the command, but also by transmitting a monitoring request message while defining the monitoring request message or the like. To be more specific, a message type requesting the monitoring is defined, and the request message including the message type may be transmitted.

The discovery type may be information indicating that the requested Discovery procedure is aimed to achieve the UE-to-NW Relay service and also indicating that it is the discovery by a Solicitation message and a Response message (Model B).

The command and/or the discovery type may be capability information indicating that the UE_A 8 has a relay function for a proximity terminal device and the network. Alternatively, separate from the above-discussed information, the UE_A 8 may indicate the inclusion of the relay function for a proximity terminal device and the network.

The UE_A 8 may transmit the discovery request including multiple combinations of discovery types and Application IDs.

Specifically, the UE_A 8 may transmit the discovery request including a combination of an Application ID A and a discovery type of "UE-to-NW Relay", and a combination of an Application ID B and "restricted discovery".

Furthermore, the ProSe function unit_A 7 as a transmission destination of the discovery request may store, in advance, information on the ProSe function unit_A 7 of a Home PLMN as a network operator with which the UE_A 8 makes a contract, and the ProSe function unit_A 7 of the Home PLMN may be set as the transmission destination.

The UE_A 8 may include APN in the discovery request. APN indicates the network to which the UE_A 8 requests access.

The ProSe function unit_A 7 confirms whether the UE_A 8 is allowed to use a UE-to-NW Relay monitoring function and a Response message transmission function, based on the Application ID or UE ID.

Furthermore, the ProSe function unit_A 7 confirms whether the UE_A 8 has already been assigned a Relay Service Code and a timer.

The ProSe function unit_A 7 may transmit a discovery request to the application server_A 2 based on a network policy or an operator policy.

In this case, the ProSe function unit_A 7 may transmit the discovery request including the ProSe Application User ID and the discovery type.

The ProSe application server_A 2, based on receiving the discovery request from the ProSe function unit_A 7, confirms the permission information of the user identified by the ProSe Application User ID.

When the ProSe application server_A 2 confirms the permission information, the ProSe application server_A 2 may transmit a discovery response, as a response to the discovery request, to the ProSe function unit_A 7. The discovery response may include the ProSe Application User ID that is allowed to use the service. Furthermore, the discovery response may include identification information indicating that the service is allowed to be used.

The ProSe function unit_A 7 assigns a Relay Service Code and a timer to the UE_A 8, based on the discovery response from the ProSe application server_A 2 or the service permission by the ProSe function unit_A 7.

The Relay Service Code is identification information corresponding to the UE-to-NW Relay service. Furthermore, the Relay Service Code may be temporary identification information which is assigned to the service by the ProSe function unit_A 7.

Furthermore, the timer is made to correspond to the Relay Service Code, and is a timer configured to indicate a period of time during which the Relay Service Code is valid. That is, the announcing using the Relay Service Code is permitted until the counting of the timer is ended.

Note that, in a case where the discovery type included in the discovery request is only "UE-to-NW Relay", the ProSe function unit_A 7 may further assign a ProSe Restricted Code (ProSe Restricted Code A) corresponding to the same Application ID to the UE_A 8 based on the operator policy or network policy. Moreover, the ProSe function unit_A 7 may also assign a timer corresponding to the ProSe Restricted Code and indicating a period of time during which the ProSe Restricted Code is valid.

The ProSe Restricted Code is a code used by the ProSe function unit for a ProSe restricted Discovery service, and may correspond to one or multiple ProSe Application User IDs.

The ProSe Restricted Discovery service is a procedure of detection performed by a terminal device based on explicit permission from the detected terminal device. For example, the service is such that UE configured to perform the detection obtains the ProSe Restricted Code from proximity UE to be detected so as to confirm the explicit detection permission, and receives the announcing including the ProSe Restriction Code, thereby detecting the proximity UE.

A timer value corresponding to the ProSe Restricted Code and indicating a period of time during which the ProSe Restricted Code is valid and a timer value corresponding to the Relay Service Code and indicating a period of time during which the Relay Service Code is valid may be different from each other or may be the same.

In a case where a combination of the Application ID A and the discovery type of "UE-to-NW Relay" and a combination of the Application ID B and "restricted discovery" are included in the discovery request, the ProSe function unit_A 7 may further assign the ProSe Restricted Code (ProSe Restricted Code B) to the UE_A 8. Moreover, the ProSe function unit_A 7 may also assign a timer corresponding to the ProSe Restricted Code and indicating a period of time during which the ProSe Restricted Code is valid.

The ProSe Restricted Code (ProSe Restricted Code B) assigned to the UE_A by the ProSe function unit_A 7 in response to the discovery request from the UE_A 8 and the ProSe Restricted Code (ProSe Restricted Code A) assigned to the UE_A not based on the discovery request from the UE_A 8, may be the same or may be different from each other.

Furthermore, the timer corresponding to the ProSe Restricted Code B and the timer corresponding to the ProSe Restricted Code A may be the same or may be different from each other.

Based on the service permission and the Relay Service Code configuration, the ProSe function unit_A 7 transmits a discovery response to the UE_A 8 (S1710). The discovery response may be a Response message to the discovery request having been received from the UE_A 8.

The discovery response may include a discovery filter. A Relay Service Code and a timer corresponding to the Code may be included in the discovery filter.

In the case where the ProSe function unit_A 7 assigns the ProSe Restricted Code to the UE_A 8, the ProSe function unit_A 7 may transmit the discovery response further including the discovery filter encompassing the ProSe Restricted Code and a timer corresponding to the ProSe Restricted Code.

In other words, the ProSe function unit_A 7 transmits, to the UE_A 8, the discovery response including the discovery filter encompassing the Relay Service Code "C1" and the timer "T1" corresponding to "C1".

Furthermore, the ProSe function unit_A 7 may transmit the discovery response including the discovery filter encompassing the ProSe Restricted Code "Cr1" corresponding to the same Application ID as the Application ID corresponding to the Relay Service Code "C1" and the timer "Tr1" corresponding to "Cr1".

Furthermore, the ProSe function unit_A 7 may transmit the discovery response including the discovery filter encompassing the ProSe Restricted Code "Cr2" corresponding to a different Application ID from the Application ID corresponding to the Relay Service Code "C1" and the timer "Tr2" corresponding to "Cr2".

The timers "T1", "Tr1", and "Tr2" may have the same value or may have different values.

In addition, some of "C1", "Cr1", and "Cr2" may be the same information; in a case where this is the case, the timers corresponding to the Codes may also be the same. Specifically, in a case that "Cr1" equals "C1", "Tr1" may be "T1"; in this case, it is sufficient that the discovery filter encompassing "T1" and "C1" is included in the discovery response.

Next, the UE_A 8 receives the discovery response. Furthermore, the UE_A 8 may obtain the ProSe Relay Service Code and a value of the timer.

In addition, the UE_A 8 may obtain, in a case of receiving the discovery response or receiving the discovery filter, the ProSe Restricted Code and the timer corresponding to the ProSe Restricted Code.

Furthermore, the UE_A 8 determines whether the monitoring and the Response message transmission are permitted based on the information included in the discovery response.

In a case where the monitoring and the Response message transmission are permitted, the UE_A 8 may assign radio resources (S1712) and transmit a signal including the obtained Relay Service Code to its proximity. The radio resource information such as frequency and time may be obtained from the ProSe function unit_A 7, or the resources for the monitoring and the Response message may be stored in advance and then assigned.

In addition, the UE_A 8 may start counting of the timer based on receiving the discovery response. The UE_A 8 may monitor the Solicitation message until the timer expires. The monitoring is stopped in a case that the timer is ended (the timer expires) like a case in which the timer value becomes zero. The Relay Service Code may be included in the Solicitation message received by monitoring. Furthermore, the signal being monitored may include UE ID and/or the ProSe Remote UE ID or the ProSe UE ID.

In a case where the UE_A 8 is notified that the authentication is unsuccessful in the discovery response, the UE_A 8 does not perform assigning of the radio resources or announcing.

Through the above-discussed procedure, the UE_A 8 can perform the authentication procedure for the monitoring and the Response message transmission.

2.2.2.2 Discovery Request Procedure of Remote UE

Next, a procedure in which the UE_B 9 requests to detect a proximity terminal by transmitting a Solicitation message will be described next.

In a case where the UE_B 9 has connectivity to a base station, the UE_B 9 may beforehand perform a discovery request procedure described below, and may obtain authentication for the transmission of a Solicitation message from a server device.

Figure 18:
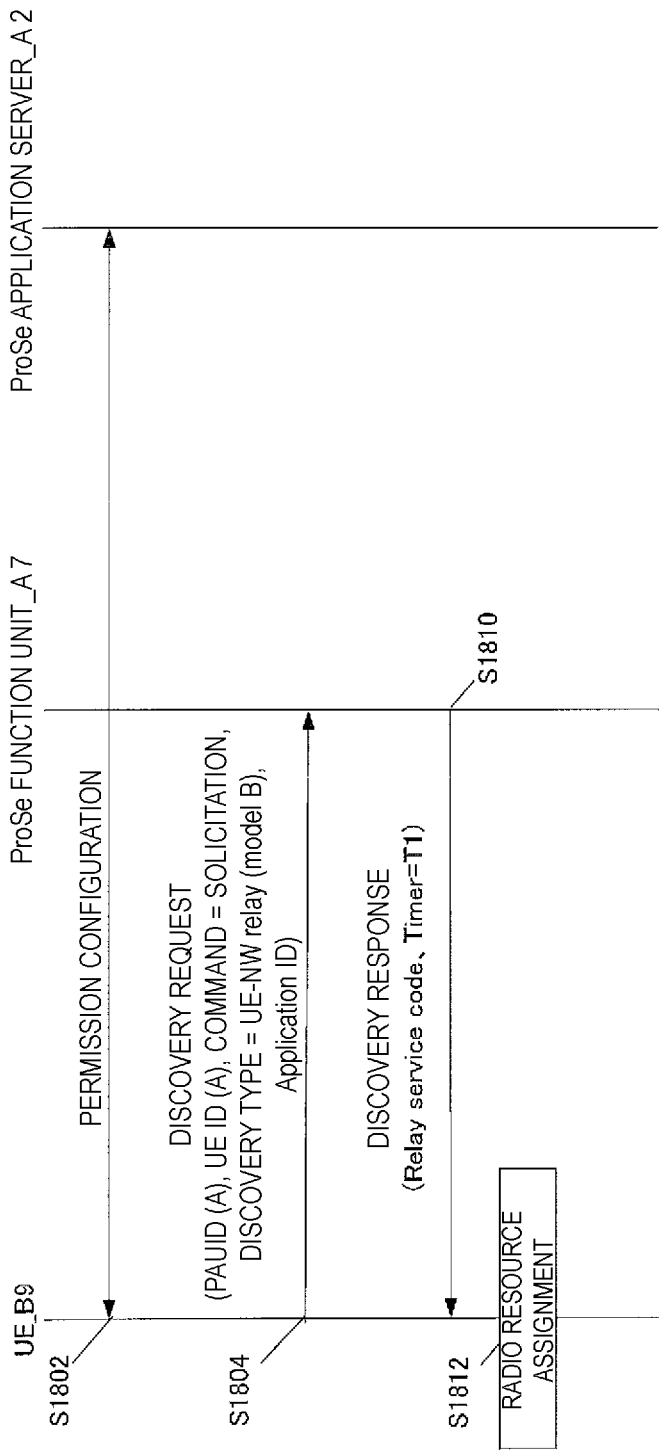
FIG. 18 is a diagram illustrating a discovery request procedure of Remote UE.

Hereinafter, a Discovery procedure in which the UE_B 9 transmits a Solicitation message will be described based on FIG. 18.

The UE_B 9 configures permission information of the Remote UE function with the ProSe application server_A 2 (S1802).

In the permission information configuration of the Remote UE function, the UE_B 9 notifies the ProSe application server of information including the ProSe Remote UE ID or the ProSe UE ID assigned by the ProSe function unit.

The ProSe application server_A 8, based on receiving the ProSe Remote UE ID or the ProSe UE ID, assigns the ProSe Application User ID to the user ID in the application layer.

The ProSe Application User ID assigned to the UE_B 9 by the ProSe application server_A 2 may be a Restricted ProSe Application User ID for restricted discovery.

The ProSe application server_A 2 notifies the UE_B 9 of the ProSe Application User ID assigned to the UE_B 9. The permission information configuration may be performed before the service authentication procedure or may be performed after that.

Next, the UE_B 9 transmits a discovery request to the ProSe function unit_A 7 (S1804). The discovery request may be a discovery request message with which the UE_B 9 requests to start an announcing procedure of the Solicitation message. Here, the transmission of the discovery request by the UE_B 9 may be performed under the condition that the service authentication procedure has been completed. More specifically, the transmission may be performed under the condition that the UE_B 9 has been authenticated to perform announcing by the ProSe function unit_A 7 of a Home PLMN which is a network operator to make a contract with. In addition, the transmission may be performed under the condition that the UE_B 9, in a case of the completion of the authentication, obtains the authentication information from the ProSe function unit_A 7 and stores the stated authentication information.

The discovery request may include the ProSe Application User ID, UE 1D, a command indicating a request to transmit the Solicitation message or perform the announcing (e.g. "Solicitation" or "announcing"), a discovery type indicating that the discovery is aimed to achieve the UE-to-NW Relay service, and an Application ID.

Note that the ProSe Application User ID is information reported from the ProSe application server_A 2 in the permission configuration procedure.

UE ID is identification information of the UE_B 9, and may be, for example, IMSI. Alternatively, UE ID may be the ME Identity.

The information indicating the request to transmit the Solicitation message may be requested, not only by an identifying method by the command, but also by transmitting a request message while defining the request message of the Solicitation procedure or the like. To be more specific, a message type requesting the Solicitation procedure may be defined, and the request message including the message type may be transmitted.

The discovery type may be information indicating that the requested Discovery procedure is aimed to achieve the UE-to-NW Relay service and also indicating that it is the discovery by a Solicitation message and a Response message (Model B).

Note that the command and/or the discovery type may be capability information indicating that the UE_B 9 has a relay function for a proximity terminal device and the network. Alternatively, separate from the above-discussed information, the UE_B 9 may indicate the inclusion of the relay function for a proximity terminal device and the network.

The UE_B 9 may transmit the discovery request including multiple combinations of discovery types and the Application IDs.

Specifically, the UE_B 9 may transmit the discovery request including a combination of the Application ID A and the discovery type of "UE-to-NW Relay", and a combination of the Application ID B and "restricted discovery".

Furthermore, the ProSe function unit_A 7 as a transmission destination of the discovery request may store, in advance, information on the ProSe function unit_A 7 of a Home PLMN as a network operator with which the UE_B 9 makes a contract, and the ProSe function unit_A 7 of the Home PLMN may be set as the transmission destination.

The UE_B 9 may include APN in the discovery request. APN indicates the network to which the UE_A 8 requests access.

The ProSe function unit_A 7 confirms whether the UE_B 9 is allowed to transmit a Solicitation message for the UE-to-NW Relay and use a Response message reception function, based on the Application ID or UE ID.

Furthermore, the ProSe function unit_A 7 confirms whether the UE_B 9 has already been assigned a Relay Service Code and a timer.

The ProSe function unit_A 7 may transmit a discovery request to the application server_A 2 based on a network policy or an operator policy.

In this case, the ProSe function unit_A 7 may transmit the discovery request including the ProSe Application User ID of the UE_B 9 and the discovery type.

The ProSe application server_A 2, based on receiving the discovery request from the ProSe function unit_A 7, confirms the permission information of the user identified by the ProSe Application User ID.

When the ProSe application server_A 2 confirms the permission information, the ProSe application server_A 2 may transmit a discovery response, as a response to the discovery request, to the ProSe function unit_A 7. The discovery response may include the ProSe Application User ID that is allowed to use the service. Furthermore, the discovery response may include identification information indicating that the service is allowed to be used.

The ProSe function unit_A 7 assigns a Relay Service Code and a timer to the UE_B 9, based on the discovery response from the ProSe application server_A 2 or the service permission by the ProSe function unit_A 7.

The Relay Service Code is identification information corresponding to the UE-to-NW Relay service. Furthermore, the Relay Service Code may be temporary identification information which is assigned to the service by the ProSe function unit_A 7. In addition, the Relay Service Code may be the same as the value assigned to the UE_A 8.

The ProSe function unit_A 7 may assign a Relay Service Code based on the ProSe Relay UE ID reported from the ProSe application server_A 2. Specifically, in a case where the ProSe Relay UE ID of the UE_A 8 is reported from the ProSe application server_A 2, the Relay Service Code assigned to the UE_A 8 in a storage unit may be assigned to the UE_B 9 as well.

Furthermore, the timer is made to correspond to the Relay Service Code, and is a timer configured to indicate a period of time during which the Relay Service Code is valid. That is, the announcing using the Relay Service Code is permitted until the counting of the timer is ended.

Furthermore, the ProSe function unit_A 7 may assign, to the UE_B 9, multiple combinations of Relay Service Codes and timers.

Note that, in the case where the discovery type included in the discovery request is only "UE-to-NW Relay", the ProSe function unit_A 7 may further assign a ProSe Restricted Code (ProSe Restricted Code A) corresponding to the same Application ID to the UE_B 9 based on the operator policy or network policy. Moreover, the ProSe function unit_A 7 may also assign a timer corresponding to the ProSe Restricted Code and indicating a period of time during which the ProSe Restricted Code is valid.

A timer value corresponding to the ProSe Restricted Code and indicating a period of time during which the ProSe Restricted Code is valid and a timer value corresponding to the Relay Service Code and indicating a period of time during which the Relay Service Code is valid may be different from each other or may be the same. A timer corresponding to the ProSe Restricted Code and indicating a period of time during which the ProSe Restricted Code is valid, may be a timer corresponding to the Relay Service Code and indicating a period of time during which the Relay Service Code is valid. That is, the timer may be a timer corresponding to the ProSe Restricted Code and the Relay Service Code.

In the case where a combination of the Application ID A and the discovery type of "UE-to-NW Relay" and a combination of the Application ID B and "restricted discovery" are included in the discovery request, the ProSe function unit_A 7 may further assign the ProSe Restricted Code (ProSe Restricted Code B) to the UE_B 9. Moreover, the ProSe function unit_A 7 may also assign a timer corresponding to the ProSe Restricted Code and indicating a period of time during which the ProSe Restricted Code is valid.

The ProSe Restricted Code (ProSe Restricted Code B) assigned to the UE_B 9 by the ProSe function unit_A 7 in response to the discovery request from the UE_B 9 and the ProSe Restricted Code (ProSe Restricted Code A) assigned to the UE_B 9 not based on the discovery request from the UE_B 9, may be the same or may be different from each other.

Furthermore, the timer value corresponding to the ProSe Restricted Code B and the timer value corresponding to the ProSe Restricted Code A may be the same or may be different from each other.

Moreover, in a case where multiple ProSe Restricted Codes assigned to the UE_B 9 by the ProSe function unit_A 7 are the same, the timers may also be the same.

Based on the service permission and the Relay Service Code configuration, the ProSe function unit_A 7 transmits a discovery response to the UE_B 9 (S1810). The discovery response may be a Response message to the discovery request having been received from the UE_B 9.

The discovery response may include the Relay Service Code and a timer corresponding to the Relay Service Code and indicating a period of time during which the Relay Service Code is valid.

In addition, in the case where the ProSe function unit_A 7 assigns the ProSe Restricted Code to the UE_B 9, the ProSe function unit_A 7 may add a combination of the ProSe Restricted Code and a timer corresponding to the ProSe Restricted Code to the discovery response.

In other words, the ProSe function unit_A 7 transmits, to the UE_B 9, the Relay Service Code "C1" and the timer "T1" corresponding to "C1".

Furthermore, the ProSe function unit_A 7 may transmit the ProSe Restricted Code "Cr1" corresponding to the same Application ID as the Application ID corresponding to the Relay Service Code "C1" and the timer "Tr1" corresponding to "Cr1". Cr1 may be C1, and furthermore Tr1 may be T1. In this case, it is sufficient for the ProSe function unit_A 7 to transmit "C1" and "T1".

Furthermore, the ProSe function unit_A 7 may transmit the ProSe Restricted Code "Cr2" corresponding to a different Application ID from the Application ID corresponding to the Relay Service Code "C1" and the timer "Tr2" corresponding to "Cr2".

The timers "T1", "Tr1", and "Tr2" may have the same value or may have different values. In the case where these timers have the same value, it is sufficient for the ProSe function unit_A 7 to transmit "T1".

Combinations of these Codes and timers may be included in the same discovery response message, or included in each different discovery response for each combination.

In other words, the ProSe function unit_A 7 may transmit the discovery response including multiple combinations of ProSe connection services and timers.

Next, the UE_B 9 receives the discovery response. Furthermore, the UE_B 9 may obtain the ProSe Relay Service Code and a value of the timer.

In addition, the UE_A 8 may obtain, in a case of receiving the discovery response, the ProSe Restricted Code and the timer corresponding to the ProSe Restricted Code.

Furthermore, the UE_A 8 determines whether the Discovery procedure by the Solicitation message transmission is permitted, based on the information included in the discovery response.

In a case where the Discovery procedure by the Solicitation message transmission is permitted, radio resources are assigned (S1812) and the Solicitation message is broadcast toward a proximity terminal using the obtained Relay Service Code. The radio resource information such as frequency and time may be obtained from the ProSe function unit_A 7, or the resources to be transmitted may be stored in advance and then assigned.

The UE_B 9 may start counting of the timer based on receiving the discovery response. The UE_A 8 may broadcast the Solicitation message at an appropriate timing before the timer expires. The broadcast is stopped in a case that the timer is ended (the timer expires) like a case in which the timer value becomes zero. The Relay Service Code may be included in the Solicitation message transmitted by the UE_B 9. Furthermore, the Solicitation message may include UE ID and/or the ProSe Remote UE ID or the ProSe UE ID.

In a case where the ProSe function unit_A 7 notifies the UE_B 9 that the authentication is unsuccessful in the discovery response, the UE_B 9 does not perform assigning of the radio resources or announcing.

Through the above-discussed procedure, the UE_B 9 can perform the authentication procedure for the Discovery procedure by the Solicitation message transmission.

In a case where the UE_B 9 is positioned outside the coverage, the UE_B 9 may perform the discovery request procedure through another procedure.

For example, in a situation in which the UE_B 9 outside the coverage and the UE_A 8 inside the coverage store a freely-selected code for the discovery in advance, the UE_A 8 may perform, based on the freely-selected code, the service authentication of the UE_B 9 and/or the permission configuration and/or the Solicitation message transmission authentication in accordance with the discovery request.

A specific example will be given below. The UE_B 9 outside the coverage has a Discovery Service Code for the monitoring in advance as discussed above, and the UE_B 9 broadcasts a discovery request including the Discovery Service Code.

The UE_B 9 may include, in the discovery request, the ProSe Application User ID, UE ID, a command indicating the request for the Discovery procedure by the Solicitation message transmission, a discovery type indicating that the discovery is aimed to achieve the UE-to-NW Relay service, and the Application ID.

In addition, the discovery request may include identification information indicating a request to transfer the discovery request. Alternatively, the UE_B 9 may request the transfer of the discovery request by the Discovery Service Code being included.

The UE_A 8 having received the discovery request transmitted by the UE_B 9 may transfer, to the ProSe function unit_A 7, the discovery request having received from the UE_B 9 based on the Discovery Service Code included in the discovery request. Note that the UE_A 8, before the transfer of the discovery request, may perform service authentication on the ProSe function unit_A 7 and permission configuration on the ProSe application.

The ProSe function unit_A 7 confirms whether the UE_B 9 is allowed to transmit a Solicitation message for the UE-to-NW Relay and use the Response message reception function, based on the discovery request received from the UE_A 8, or based on the Application ID or UE ID having been obtained.

Furthermore, the ProSe function unit_A 7 confirms whether the UE_B 9 has already been assigned a Relay Service Code and a timer.

The ProSe function unit_A 7 may transmit a discovery request to the application server_A 2 based on a network policy or an operator policy.

Because the discovery request procedure to the application server_A is similar to that discussed above, the description thereof is omitted herein.

The ProSe function unit_A 7 further assigns the Relay Service Code and a timer to the UE_B 9, based on the monitoring procedure authentication of the UE_B 9. Moreover, like in a case of the UE_B 9 being inside the coverage, the ProSe function unit_A 7 may assign the ProSe Restricted Code and a timer to the UE_B 9.

Because a method for assigning the Codes and timers is also similar to the method in the case of the UE_B 9 being inside the coverage, the detailed description thereof is omitted herein.

Based on the Discovery procedure authentication by the Solicitation message transmission and the Relay Service Code assignment for the UE_B 9, the ProSe function unit_A 7 transmits a discovery response to the UE_B 9 via the UE_A 8.

The ProSe function unit_A 7 may transmit the discovery response including the Relay Service Code and a timer corresponding to the Relay Service Code and indicating a period of time during which the Relay Service Code is valid.

As discussed above, the UE_B 9 may obtain the Relay Service Code and the timer used for transmitting the Solicitation message, even in the case of the UE_B 9 being outside the coverage, by transmitting the discovery request.

2.2.2.3 Procedure of Direct Communication Path Establishment and Relay Connection Establishment Hereinafter, described is a procedure in which, after the completion of the discovery request procedure discussed in 2.2.2.1 and 2.2.2.2, Remote UE detects Relay UE, establishes a direct communication path of ProSe, and connects with the network using a relay.

The UE_B 9 in which the discovery procedure by the Solicitation message transmission is authenticated broadcasts a Solicitation message so as to detect a proximity terminal.

The stated Solicitation message may include at least the Relay Service Code, and the ProSe Remote UE ID or the ProSe UE ID obtained from the ProSe function unit_A 7.

Furthermore, the Solicitation message may include user information on the UE_B 9 user or information indicating QoS required by UE. The user information may be, for example, information of a group to which the user belongs.

The UE_A 8 that is authenticated to receive the Solicitation message and use the Response message transmission function receives the Solicitation message announced from the UE_B 9. To rephrase, the UE_A 8 monitors an announcing signal from the UE_B 9.

The UE_A 8, based on receiving the Solicitation message, considers that the UE_A 8 functions as Relay UE for the UE_B 9.

The UE_A 8 may determine whether to permit the UE_A 8 itself to function as Relay UE based on the information on the user included in the Solicitation message or based on the QoS.

In a case where the UE_A 8 permits the UE_A 8 itself to function as Relay UE for the UE_B 9, the UE_A 8 may transmit a Response message to the UE_B 9.

The Relay Service Code and the ProSe Relay UE ID may be included in the Response message.

Furthermore, the information on the UE_A 8 user may be included in the Response message. The information on the user may specifically be identification information of a group to which the UE_A 8 user belongs.

Furthermore, the Response message may include information for identifying communication capability such as communication capacity of the PDN connection provided to the Remote UE by the UE_A 8. Alternatively, the UE_A 8 may respond by including position information in the Response message.

The UE_B 9 detects proximity Relay UE by receiving the Response message from the UE_A 8.

At this time, the UE_B 9 may detect multiple pieces of Relay UE. To rephrase, the UE_B 9 may receive the Response message from the multiple pieces of Relay UE.

In a case where the UE_B 9 detects the multiple pieces of Relay UE, the UE_B 9 may select the multiple pieces of Relay UE in consideration of remaining time of the timer corresponding to the Relay Service Code, Relay UE capability, a PDN connection communication state, or Relay UE position information.

In a case where the UE_B 9 selects the UE_A 8 as Relay UE, or in a case where the UE_B 9 receives the announcing signal only from the UE_A 8, the UE_B 9 establishes direct communication with the UE_A 8.

Specifically, the UE_B 9 transmits a direct-communication establishment request message to the UE_A 8. The UE_B 9 may transmit the direct-communication establishment request including the ProSe Relay UE ID of the UE_A 8.

The UE_A 8, in a case of receiving the request message from the UE_B 9, authenticates the UE_B 9 and establishes the direct communication connection.

The UE_B 9, after the establishment of the direct communication path with the UE_A 8, requests the UE_A 8 to assign an IP address. When the UE_B 9 requests IPv6, the UE_B 9 transmits a Router Solicitation message (RS signal) to the UE_A 8. The UE_A 8, in a case of receiving the RS signal, may configure, for the UE_B 9, an IP address to be assigned to the UE_B 9 from IPv6 prefix.

The UE_A 8 transmits a Router Advertisement message (RA signal) to the UE_B 9. The assigned IP address is included in the RA signal.

Alternatively, when the UE_B 9 requests the assignment of IPv4, the UE_B 9 transmits a DHCPv4 discover to the UE_A 8. The UE_A 8, based on receiving the detection message, selects an IP address from the pooled IP addresses and assigns the IP address to the UE_B 9. Furthermore, the UE_A 8 transmits a DHCPv4 offer message to the UE_B 9. The UE_A 8 includes the IP address assigned to the UE_B 9 in the DHCPv4 offer.

The UE_B 9 having received the DHCP offer from the UE_A 8 transmits a DHSCP request including the received IP address.

The UE_A 8 having received the DHCP request from the UE_B 9 replies DHCP Ack as a response.

As discussed above, the IP address of IPv6 or IPv4 is assigned to the UE_B 9, and connection to the PDN connection is provided to the UE_B 9.

2.2.3 Relay Service Code Update Procedure

Next, a Relay Service Code update procedure will be described below. The Relay Service Code needs to be regularly updated from the standpoint of security.

2.2.3.1 Relay Service Code Update Procedure of Relay UE

Hereinafter, an update procedure of the Relay Service Code stored in the UE_A 8 as Relay UE will be described.

The UE_A 8 can update the Relay Service Code in accordance with notification from the ProSe function unit_A 7, and continue the monitoring.

In the following description, the UE_A 8 that has obtained a Relay Service Code and a timer and has started counting of the timer for a connection service using the UE-to-NW Relay function, obtains a new ProSe Relay Service Code and a timer for the same connection service and makes the old Relay Service Code and timer invalid so as to use the new ProSe Relay Service code and timer.

An initial state of the present procedure may be a state in which the discovery request procedure discussed in 2.2.2.1 has been completed.

In other words, by the discovery request procedure as discussed in 2.2.2.1, the UE_A 8 may be in a state in which the UE_A 8 has obtained "C1" as the Relay Service Code and "T1" as the timer from the ProSe function unit_A 7.

A detailed description will be given below with reference to FIG. 16. First, the UE_A 8 starts counting of the timer "T1" based on the discovery request procedure or the reception of the discovery response, and makes the Relay Server Code "C1" valid (S1606). In addition, the ProSe function unit_A 7 starts counting of a timer "T1" corresponding to the timer "T1" after the transmission of the discovery response, and makes the Relay Server Code "C1" valid (S1607).

As discussed in the discovery request procedure of 2.2.2.1, the UE_A 8 may perform the monitoring and the transmission procedure of the Response message based on the monitoring, during the counting of the timer "T1" being executed.

The UE_A 8 may request the Relay Service Code and a timer for the same relay connection service to the ProSe function unit_A 7 during the counting of the timer "T1" being executed. To rephrase, the UE_A 8 may newly request the Relay Service Code and timer to the ProSe function unit_A 7 before the timer "T1" expires.

The above re-request by the UE_A 8 may be performed when remaining time of the timer has become short. To be more specific, the UE_A 8 may store a threshold in advance, and may perform the re-request in the case where the remaining time of the timer becomes equal to the threshold or becomes shorter than the threshold. Furthermore, a trigger of the re-request is not limited thereto; the re-request may be performed under another condition, or may be performed at a freely-selected timing.

The UE_A 8 may transmit a discovery request to the ProSe function unit_A 7 in order to re-request the Relay Service Code and a timer for the same relay connection service (S1608).

Here, the discovery request may be a discovery request message for the discovery procedure by the monitoring and the Response message transmission. The discovery request message may be the discovery request message transmitted by the UE_A 8 as discussed in the discovery request procedure of 2.2.2.1 (S1704). Because it is sufficient that the processing with regard to the transmission by the UE_A 8, the discovery request message configuration, information elements included in the discovery request message, and the like are similar to those discussed above, the detailed description thereof is omitted herein.

Note that, by including, in the discovery request, the same APN as APN having been included in the previous discovery request, the UE_A 8 may indicate that the request message is a message for the same service.

Next, the ProSe function unit_A 7 receives the discovery request. Furthermore, the Prose function unit_A 7 transmits a discovery response as a Response message to the UE_A 8 (S1610). The ProSe function unit_A 7 may transmit the Response message including the Relay Service Code and the timer.

This discovery response may be the discovery response message as discussed in 2.2.2.1 (S1710).

That is, the ProSe function unit_A 7 may transmit the discovery response including a discovery filter. A Relay Service Code and a timer may be included in the discovery filter.

Here, a condition where the discovery response is transmitted may be such that the response is transmitted based on receiving the discovery request, or is transmitted based on the authentication. A specific method for the authentication to be performed here may be the method discussed in the discovery request procedure of 2.2.2.

Alternatively, the ProSe function unit_A 7 may update the ProSe Relay Service Code based on a network connection state or the operator policy without re-receiving the discovery request from the UE_A 8. The ProSe function unit_A 7 may notify the UE_A 8 of a notification message including the Relay Service Code updated by the ProSe function unit_A 7.

The notification message, like the discovery response, may include a discovery filter in which a timer value corresponding to the updated Relay Service Code and indicating a period of time during which the Relay Service Code is valid.

Furthermore, the Relay Service Code and the timer included in the discovery response or the discovery filter of the notification message may include the old Relay Service Code "C1" having already been assigned and the remaining time of the timer "T1" corresponding to the old Relay Service Code "C1".

Alternatively, the Relay Service Code and the timer included in the discovery response or the discovery filter of the notification message may include the new Relay Service Code "C2" different from the Relay Service Code "C1" and the timer "T2" corresponding to the new Relay Service Code "C2".

Here, the old Relay Service Code "C1" and the new Relay Service Code "C2" may correspond to a single application ID.

Whether to transmit the old Relay Service Code or transmit the new Relay Service Code may be determined based on the following conditions or processing.

In a case that the remaining time of the timer T1 is short, the ProSe function unit_A 7 may transmit the information including the new Relay Service Code "C2" and the timer "T2". To be more specific, the ProSe function unit_A 7 may store a threshold in advance, and may transmit the information including the new Relay Service Code "C2" and timer "T2" in the case where the remaining time of the timer becomes equal to the threshold or becomes shorter than the threshold.

Meanwhile, in the case where the remaining time of the timer "T1" is large enough, the ProSe function unit_A 7 may transmit the information including the old Relay Service Code "C1" and the remaining time of the timer "T1". To be more specific, the ProSe function unit_A 7 may store a threshold in advance, and may transmit the information including the new Relay Service Code "C1" and the remaining time of the timer "T1" in the case where the remaining time of the timer is longer than the threshold or is equal to the threshold.

Alternatively, the ProSe function unit_A 7 may determine the above in accordance with the received discovery request. The UE_A 8 may transmit the discovery request including identification information, for example.

This identification information may be such identification information that indicates whether the UE_A 8 requests the old Relay Service Code or the new Relay Service Code.

The ProSe function unit_A 7 may transmit the information including the new Relay Service Code "C2" and timer "T2" based on the identification information. Alternatively, the ProSe function unit_A 7 may transmit the information including the old Relay Service Code "C1" and the remaining time of the timer "T1" based on the identification information.

Furthermore, the ProSe function unit_A 7 may determine the above based on the presence/absence of the identification information. That is, the identification information may be such identification information that indicates a request for a new Relay Service Code. For example, the UE_A 8 may transmit a discovery request without including identification information and request the old Relay Service Code. Alternatively, the UE_A 8 may transmit the discovery request including the identification information and request a new Relay Service Code.

Meanwhile, based on the fact that the identification information is not included in the discovery request, the ProSe function unit_A 7 may transmit the information including the old Relay Service Code "C1" and the remaining time of the timer "T1". The ProSe function unit_A 7 may transmit the information including the new Relay Service Code "C2" and the timer "T2" based on the fact that the identification information is included in the discovery request.

Alternatively, the identification information may be such identification information that indicates a request for the old Relay Service Code. For example, the UE_A 8 may transmit the discovery request without including the identification information and request a new Relay Service Code. Alternatively, the UE_A 8 may transmit the discovery request including the identification information and request the old Relay Service Code.

The ProSe function unit_A 7 may transmit the information including the new Relay Service Code "C2" and the timer "T2" based on the fact that the identification information is not included in the discovery request. Meanwhile, based on the fact that the identification information is included in the discovery request, the ProSe function unit_A 7 may transmit the information including the old Relay Service Code "C1" and the remaining time of the timer "T1".

The above-mentioned identification information may be an information element such as a flag included in the discovery request, or may be an information element indicating a message type of control message.

As discussed above, the ProSe function unit_A 7 may transmit the information including the remaining time of the timer "T1" and may synchronize the timers of multiple pieces of UE.

This discovery request may be the discovery request discussed in 2.2.2.1. Accordingly, the above-mentioned identification information may be included in the discovery request discussed in 2.2.2.1.

Whether the ProSe function unit_A 7 transmits the old Relay Service Code or the new Relay Service Code may also be determined based on the configuration of the ProSe function unit_A 7 or the like. For example, the configuration of the ProSe function unit_A 7 may be determined in accordance with a Mobile Operator Policy of a network operator running the ProSe function unit_A 7 or an application operator policy, and then the determined configuration may be performed.

Note that the configuration may be determined while combining the conditions or processing having been discussed thus far, or may be determined based on other methods.

Next, the UE_A 8 receives the discovery response. Furthermore, the UE_A 8 obtains a Relay Service Code and a timer included in the discovery response.

The UE_A 8 may obtain the Relay Service Code and the timer by acquiring the discovery response including the discovery filter.

In a case that the UE_A 8 obtains the new Relay Service Code "C2", or the UE_A 8 obtains a new discovery filter, the UE_A 8 may stop using of the old "C1" and may start using of the new Relay Service Code "C2" (S1612).

Specifically, the UE_A 8 may perform an action in which the old Relay Service Code "C1" is made invalid while the new Relay Service Code "C2" is made valid, for example.

Furthermore, the UE_A 8 may stop the counting of the timer "T1" corresponding to the old Relay Service Code "C1" and may start the counting of the timer "T2" corresponding to the new Relay Service Code "C2".

In addition, the UE_A 8 may delete the old Relay Service Code "C1" and the timer "T1" from the storage unit.

The UE_A 8 may stop the monitoring using the old Relay Service Code "C1", and may set such a configuration that does not allow to perform the monitoring using the Relay Service Code "C1" after having stopped the monitoring using the Code "C1".

Furthermore, the ProSe function unit_A 7, in a case of transmitting the discovery response, may stop counting of "T1" and start counting of "T2" corresponding to the timer "T2" (S1614).

The UE_A 8 may transmit the announcing signal using the new Relay Service Code "C2" until the timer "T2" corresponding to the new Relay Service Code "C2" expires.

Furthermore, the UE_A 8 may determine whether to perform the update procedure of the Relay Service Code, based on the configuration of the UE_A 8 or the like. For example, the configuration of the UE_A 8 may be determined in accordance with a user policy, a Mobile Operator Policy of a network operator running the ProSe function unit_A 7, or an application operator policy, and then the determined configuration may be performed.

Note that the configuration may be determined while combining the conditions and processing having been discussed thus far, or may be determined based on other methods.

In addition, in the case where the UE_A 8 does not perform the update procedure of the Relay Service Code, the UE_A 8 may continue the monitoring using the old Relay Service Code. For example, when the UE_A 8, in a case of receiving the Response message, has obtained the old Relay Service Code "C1", the UE_A 8 may continue the monitoring using the old Relay Service Code "C1" until the timer "T1" being counted expires. Note that the UE_A 8 may update the timer value from the remaining time of the timer "T1" to the received timer value, and continue the counting.

Alternatively, in the case where the UE_A 8 does not perform the update procedure of the Relay Service Code, the UE_A 8 may stop the monitoring using the old Relay Service Code and the new Relay Service Code.

Through the above-discussed procedure, the UE_A 8 can continue the monitoring corresponding to the connection service by a relay.

Note that, in the procedure of assigning the old Relay Service Code "C1" and the timer "T1", when the ProSe Restricted Code "Cr1" and the timer "Tr1" have been assigned to the same Application ID, the UE_A 8 may update the ProSe Restricted Code and the timer during the Relay Service Code update procedure.

Alternatively, only the Relay Service Code and the timer may be updated.

2.2.3 2 Relay Service Code Update Procedure of Remote UE

A Relay Service Code update procedure of Remote UE will be described next. As illustrated in FIG. 1, in the case where the Remote UE has already obtained the Relay Service Code, the Remote UE may be outside the coverage.

In a case of the update of the Relay Service Code of the Relay UE, it is necessary that the Relay Service Code of the Remote UE can be updated.

Specifically, for example, when the UE_A 8 is providing a PDN connection service using a relay by ProSe direct communication to a proximity terminal, the UE_A 8 may notify the proximity terminal of the update of the Relay Service Code using the ProSe direct communication, based on the Relay Service Code and the timer having been updated.

To be specific, in the case where the UE_A 8 obtains the new Relay Service Code and the timer during providing the PDN connection by rely to the UE_B 9, the UE_A 8 may update the Relay Service Code and the timer, and notify the UE_B 9 of a notification message telling the update of the Relay Service Code over the ProSe direct communication.

The UE_A 8 may include, in the notification message, identification information for identifying that the notification message is a message telling the update of the Relay Service Code.

Alternatively, the UE_A 8 may implicitly stop, in a case of receiving the new Relay Service Code, providing the PDN connection to the UE_B 9.

The UE_B 9 receives the notification message from the UE_A 8. In a case of receiving the notification message from the UE_A 8 or in a case of the PDN connection service being implicitly stopped, the UE_B 9 transmits a discovery request message in order to update the Relay Service Code and/or the timer.

Because the discovery request message transmitted from the UE_B 9 is similar to the discovery request message discussed in 2.2.2.2, the detailed description thereof is omitted herein.

Like in the description of 2.2.2.2, when the UE_B 9 is present outside the coverage, the UE_A 8 as Relay UE may transfer the discovery request to the ProSe function unit_A 7.

The ProSe function unit_A 7 may assign, to the UE_B 9, a new Relay Service Code and a timer based on receiving the discovery request.

Furthermore, the ProSe function unit_A 7 may transmit a discovery response to the UE_B 9 via the UE_A 8.

The discovery response message may include a new Relay Service Code and a new timer.

In a case that the UE_B 9 obtains a new Relay Service Code and a new timer, the UE_B 9 may stop the timer corresponding to the old Relay Service Code and update the Relay Service Code and the tinier.

The UE_B 9 may stop transmitting of the Solicitation message in a case of having stopped the timer.

The UE_B 9 may transmit a Solicitation message in a case of receiving the new Relay Service Code and timer.

In the manner discussed above, the Relay Service Code update procedure of Remote UE may be performed. To rephrase, in a case of receiving the notification from the Relay UE and in a case of the provision of the service being stopped, the Remote UE may obtain, by re-requesting a new Relay Service Code to the ProSe function unit, the new Relay Service Code and timer, and may update the Code.

2.2.4 Modification on Relay Service Code Update Procedure

Although, in 2.2.3, an example of the procedure in which the UE_A 8 updates the Relay Service Code is described, a specific procedure is not limited to the present embodiment; it is to be noted that design, combinations, and the like within a scope that does not depart from the spirit of the present invention are also included in the present invention.

The procedure in which the Remote UE obtains and updates the Relay Service Code for detecting the Relay UE using the Model B detection has been described thus far.

Moreover, the procedure in which the Remote UE, based on the detection, establishes a direct connection with the Relay UE and then establishes a PDN connection has also been described.

3. Modification

The embodiments of the invention have been described in detail thus far with reference to the drawings, but the specific configuration is not limited to the embodiments. Other designs and the like that do not depart from the essential spirit of the invention also fall within the scope of the present invention.

Additionally, the programs run on the devices in the embodiments are each configured to control a CPU (program causing a computer to function) so as to realize the functions of the above-described embodiments. The information handled by these devices is temporarily held in a transitory storage device (RAM, for example) at the time of processing, and is then stored in various storage devices such as a ROM and an HDD, read out by the CPU as necessary, and edited and written.

Here, a semiconductor medium (a ROM, a non-volatile memory card, or the like, for example), an optical recording medium/magneto-optical recording medium (a Digital Versatile Disc (DVD), a Magneto Optical Disc (MO), a Mini Disc (MD), a Compact Disc (CD), a BD, or the like, for example), a magnetic recording medium (magnetic tape, a flexible disk, or the like, for example), and the like can be given as examples of recording media for storing the programs. In addition to realizing the functions of the above-described embodiments by executing loaded programs, the functions of the present invention are realized by the programs running cooperatively with an operating system, other application programs, or the like in accordance with instructions included in those programs.

When delivering these programs to market, the programs can be stored in a portable recording medium, or transferred to a server computer connected over a network such as the Internet. In this case, the storage device serving as the server computer is of course also included in the present invention.

Additionally, each device in the above-described embodiments may be partially or completely realized as a Large Scale Integration (LSI) circuit, which is a typical integrated circuit. The functional blocks of each device may be individually realized as chips, or may be partially or completely integrated into a chip. The circuit integration technique is not limited to LSI, and the integrated circuits for the functional blocks may be realized as dedicated circuits or a general-purpose processor. Furthermore, in a case where advances in semiconductor technology produce circuit integration technology capable of replacing the LSI, it is of course possible to use integrated circuits based on the technology.

Additionally, although, for the above-described embodiments, the LTE and the WLAN (IEEE 802.11a/b/n, for example) have been described as examples of the radio access network, the connections may be made with WiMAX instead of the WLAN.

REFERENCE SIGNS LIST

1 Communication system
2 Core network
3 IP mobile communication network_A
5 PDN_A
7 ProSe function unit_A
8 UE_A
9 UE_B
50 HSS_A
60 PCRF_A
55 AAA_A
30 PGW_A
65 ePDG_A
35 SGW_A
40 MME_A
80 LTE AN_A
75 WLAN ANb
70 WLAN ANa
45 eNB_A 76 WLAN APb
72 WLAN APa

The invention claimed is:

1. A User Equipment (UE) comprising:
transmission/reception circuitry configured to:
  transmit, to a device equipped with a ProSe function, a first service authorization request message, to request authorization for the UE to be directly detected as a relay User Equipment (UE) by a proximity User Equipment (UE) positioned in proximity to the UE, or to request authorization for the UE to perform direct communication with the proximity UE; and
  receive, from the device equipped with the ProSe function, an authorization message for the first service authorization request message, wherein
    the authorization message includes a Relay Service Code and a timer value,
    the Relay Service Code is identification information of a connectivity service provided by the UE, and
    the timer value indicates a period of time during which a first service authorization for the connectivity service corresponding to the Relay Service Code is valid, and
a controller configured to start a timer with the timer value included in the authorization message, in a case of receiving the timer value.

2. The UE according to claim 1,
wherein the transmission/reception circuitry is further configured to transmit a second service authorization request message in a case where the timer expires.

3. A communication control method for a User Equipment (UE), the communication control method comprising:
  transmitting, to a device equipped with a ProSe function, a first service authorization request message, to request authorization for the UE to be directly detected as a relay User Equipment (UE) by a proximity User Equipment (UE) positioned in proximity to the UE, or to request authorization for the UE to perform direct communication with the proximity UE;
  receiving, from the device equipped with the ProSe function, an authorization message for the first service authorization request; message, wherein
    the authorization message includes a Relay Service Code and a timer value,
    the Relay Service Code is identification information of a connectivity service provided by the UE; and
    the timer value indicates a period of time during which a first service authorization for the connectivity service corresponding to the Relay Service Code is valid; and
  starting a timer with the timer value included in the authorization message, in a case of receiving the timer value.

4. The communication control method for the UE according to claim 3, further comprising:
  transmitting a second service authorization request message in a case that the timer expires.

* * * * *